United States Patent [19]
Silverbrook et al.

[11] Patent Number: 5,844,532
[45] Date of Patent: Dec. 1, 1998

[54] COLOR DISPLAY SYSTEM

[75] Inventors: Kia Silverbrook, Leichhardt; William Clark Naylor, Jr., Mount Kuring-gai; Michael Webb, Lane Cove; David Ross Brown, East Roseville; Natalie Lisa Kershaw, Glebe; Mark Pulver, Enmore; Rodney James Whitby, Ermington, all of Australia

[73] Assignee: Canon Inc., Tokyo, Japan

[21] Appl. No.: 583,531

[22] Filed: Jan. 5, 1996

Related U.S. Application Data

[63] Continuation of Ser. No. 177,605, Jan. 4, 1994, abandoned.

[30] Foreign Application Priority Data

Jan. 11, 1993 [AU] Australia .................... PL6765

[51] Int. Cl.$^6$ ..................... G09G 3/36
[52] U.S. Cl. ............... 345/89; 345/97; 345/147
[58] Field of Search ............... 345/98, 89, 88, 345/147, 87, 97, 3, 208, 204, 199

[56] References Cited

U.S. PATENT DOCUMENTS

| | | | |
|---|---|---|---|
| 4,760,387 | 7/1988 | Ishii et al. ................... | 345/3 |
| 4,958,378 | 9/1990 | Bell ................... | 345/118 |
| 5,119,086 | 6/1992 | Nishioka et al. ................... | 845/147 |
| 5,153,568 | 10/1992 | Shaw ................... | 345/147 |

FOREIGN PATENT DOCUMENTS

| | | | |
|---|---|---|---|
| 0183539 | 6/1986 | European Pat. Off. . | |
| 0368117 | 5/1990 | European Pat. Off. ........... | 345/89 |
| 0435701 | 7/1991 | European Pat. Off. . | |
| 0464620 | 1/1992 | European Pat. Off. . | |
| 01519744 | 12/1992 | European Pat. Off. . | |

OTHER PUBLICATIONS

S. Dixit, "Quantization of Color Images for Display/Printing on Limited Color Output Devcies", Computer & Graphics, vol. 15, No. 4, pp. 561–567, (1991).

*Primary Examiner*—Regina Liang
*Attorney, Agent, or Firm*—Fitzpatrick, Cella, Harper & Scinto

[57] ABSTRACT

A color display system that is capable of taking input intended to be displayed on a full color display (e.g. VDU) having a high refresh rate and displaying the image on a display having a much reduced number of displayable colors and a lower refresh rate. 24-bit RGB data is input and converted into bi-level RGBW data and halftoned in a render unit for storage before display. Motion detection is used to ensure that only those pixels that have change in value are updated on the display.

30 Claims, 66 Drawing Sheets

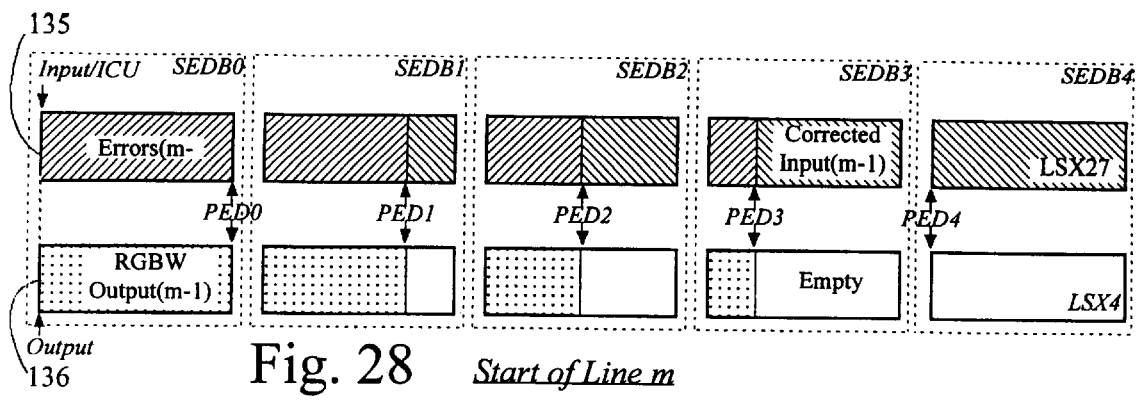
Fig. 28  Start of Line m
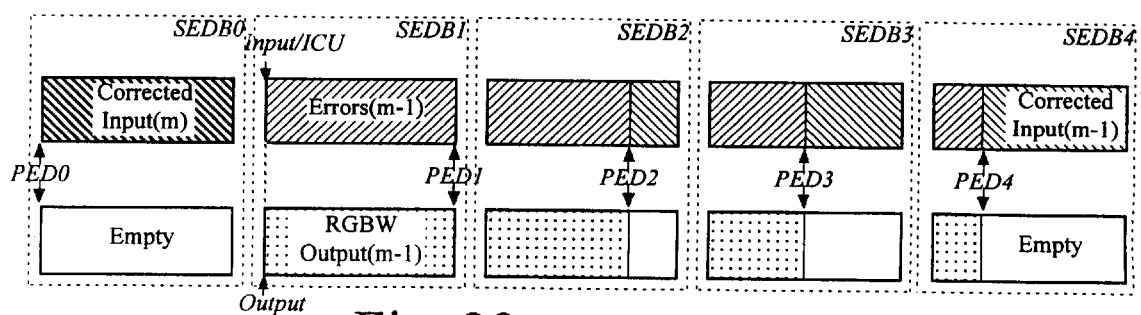
Fig. 29  20% Through Line m
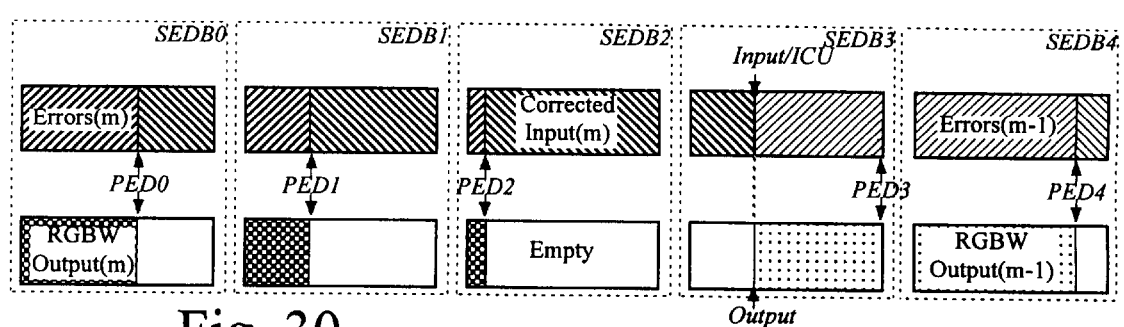
Fig. 30  70% Through Line m
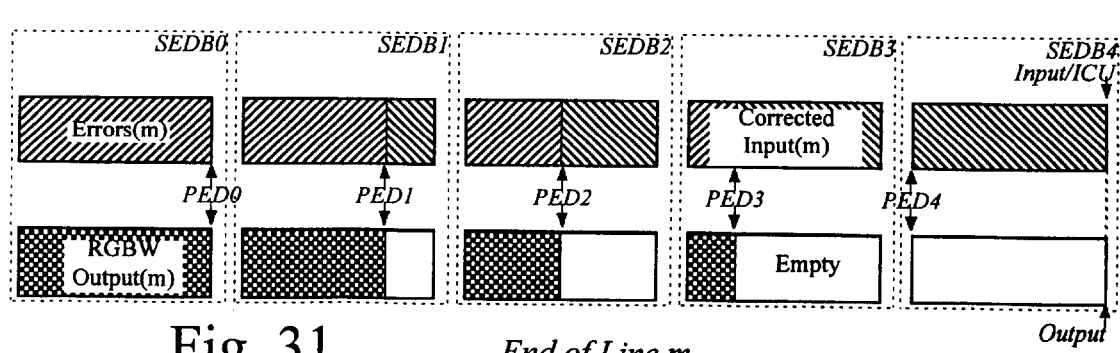
Fig. 31  End of Line m

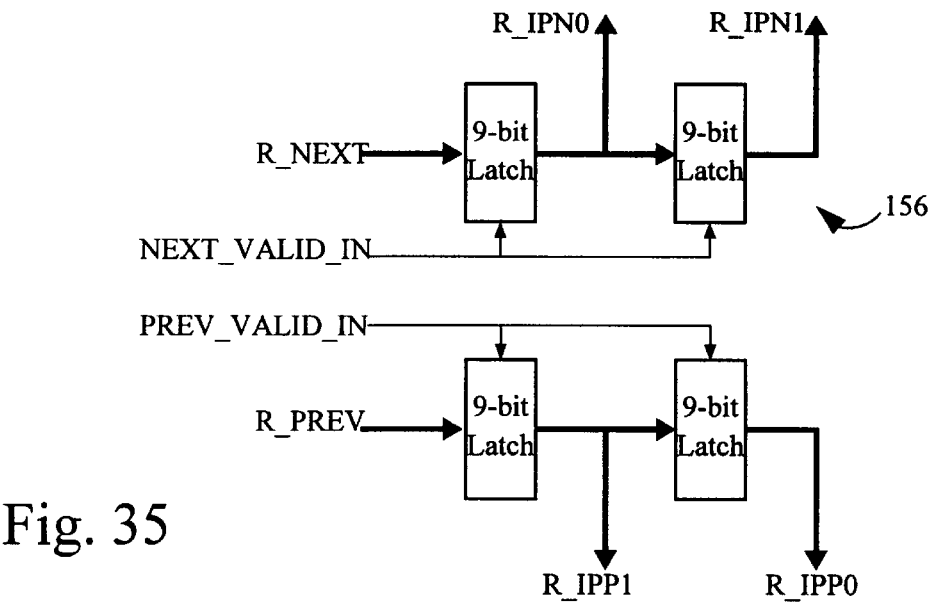
Fig. 35  (Only Red Channel shown; Blue and Green channels are identical)
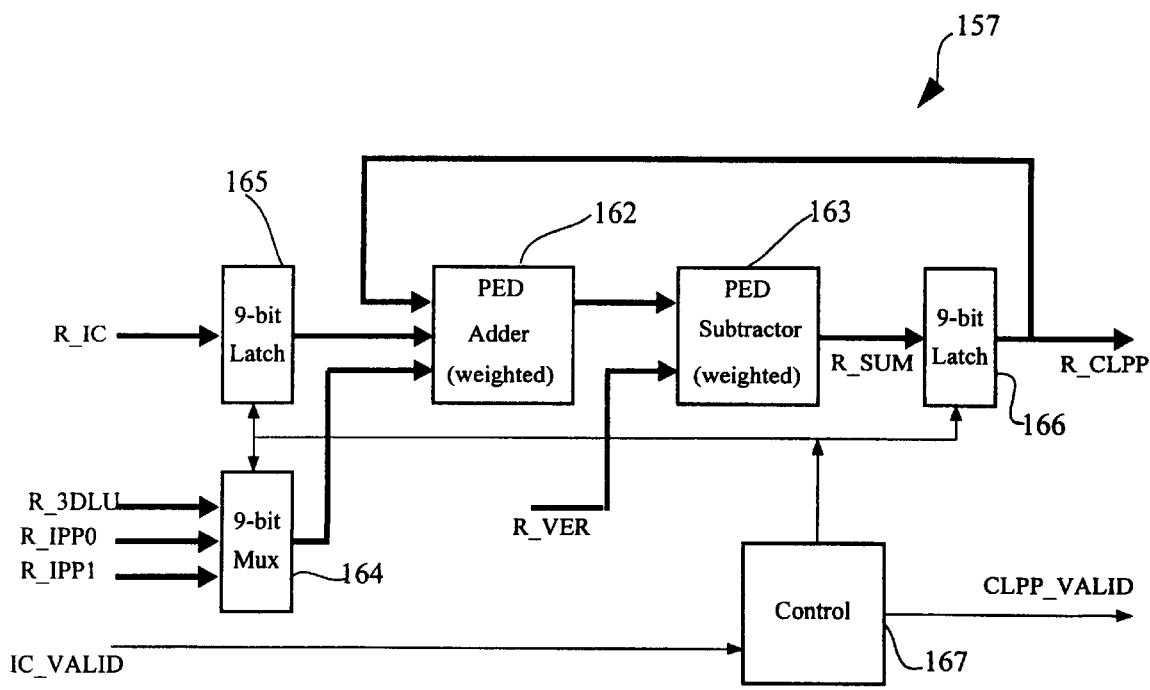
Fig. 36  (Only Red Channel datapaths shown; Blue and Green channels are identical)

Only Red Channel datapaths shown; Blue and Green channels are identical

COLOR DISPLAY SYSTEM

This application is a continuation of application Ser. No. 08/177,605 filed Jan. 4, 1994, now abandoned.

FIELD OF INVENTION

The present invention relates to a system for displaying screen images and more particularly to a system for displaying images on a colour Ferro-electric Liquid Crystal Display system having a limited number of colours and colour levels.

DESCRIPTION OF THE RELATED ART

Colour Cathode Ray Tube (CRT) display devices in common use are capable of displaying in the order of 1280×1024 pixel elements with each pixel element consisting of a red, a green and a blue dot (RGB) on the surface of the CRT. The principle of operation of the CRT is well known, with electrons being excited inside a semi-vacuum and being accelerated to strike a phosphor screen which undergoes illumination in the area of the electron's collision. This illumination is normally designed to last for a fraction of a second before a subsequent illumination must occur in order to maintain the appearance of constant illumination to the observer. By constantly re-illuminating the different portions of the screen it appears to the observer that the image is present on the surface of the screen. By selectively changing the nature of the illumination, it may further appear that the image on the surface of the screen is undergoing motion.

The intensity and portion of the screen which undergoes illumination is often determined by the inputs to the display device. For example, a common standard is the NTSC standard which provides three analogue input channels of intensity levels for each of the red, green and blue phosphor dots on the screen in addition to providing information and timing on the horizontal and vertical positioning requirements of the screen's illumination. This information is all provided in an analogue format and is well known in the art. Modern computers which output to display devices often assume that such devices work under a particular standard such as the NTSC standard.

The analogue format of the image signal creates a continuous tone image which has errors generally not perceived by the human eye. Often, the image signal is received as an analogue signal, such as a broadcast signal in the NTSC format, from which the RGB colour components can be demodulated to coexist as separate analogue signals to control the respective electron guns of the CRT. This is the standard approach for television reception. Sometimes, computer devices create display signal information in digital format such as 24 bit RGB (8 bits for each of red, green and blue) which corresponds to over 16 million separate colours. Because of the relative insensitivity of the human eye, when this digital format data is converted, either in the computer or CRT, into an analogue format for control of the CRT electron guns, an essentially continuous tone image is formed on the CRT.

Although CRT devices are known to give a high quality final picture, the nature of the tube is such that it tends to be a bulky, large and heavy device.

U.S. Pat. No. 4,964,699 (Inoue) entitled 'Display Device' discloses a device for displaying bi-level colours using a ferroelectric liquid crystal (FLC) element. In this device, the screen elements or pixels are of a binary nature, being either off or on. This is to be contrasted with the CRT-type device mentioned above where the output takes on an analogue form. Additionally, FLC elements tend to have a memory function in comparison to CRT devices in that once an element of the screen has been set to a particular colour, its colour value remains for a long period of time (often in the order of minutes) compared with the CRT screen refresh rate of a fraction of a second.

SUMMARY OF THE INVENTION

It is an object of the present invention to provide an improved or alternative method for displaying images.

In accordance with one aspect of the present invention there is disclosed a display system for displaying a continuous tone image on a display device having a plurality of pixels, each pixel being capable of displaying a finite number of different colours, said system comprising:

analogue input means adapted to receive an analogue input signal representing a continuous tone image to be displayed;

converter means adapted to receive analogue colour information from said analogue input signal and to produce a corresponding digital representation of said analogue colour information;

halftoning means adapted to receive said digital representation from the converter means and to produce a corresponding halftoned current output pixel value, for each one of said plurality of pixels of said display device;

frame store means adapted to store said current output pixel values from said half toning means;

line update means adapted to receive said digital representation and to produce a corresponding signature from said digital representation, said corresponding signatures being stored in a signature storage means, said line update means being configured to compare said corresponding signature with a previous corresponding signature from said signature storage means so as to determine which groups of pixel values require changing on said display device; and frame store controlling means adapted to receive information from line update means as to whether a group of pixels requires updating and capable of causing said frame store means to write out said current output pixel values to said display device.

According to another aspect of the present invention there is disclosed a method of displaying an image, said method comprising the steps of:

inputting colour information in an analogue format, converting the colour information from an analogue format to a corresponding digital format;

halftoning said digital colour information to produce output colour information;

determining those portions of the colour information that have changed; and outputting said output colour information corresponding to those portions where it has been determined that said colour information has changed.

According to another aspect of the present invention, there is provided an arrangement for displaying video images, said arrangement comprising:

a video input signal having colour information contained therein capable of producing a continuous tone image using colours obtained in a first set having a first plurality of colours;

a display device capable of displaying colours in a second set having a substantially limited second plurality of colours, and display converting means for receiving said input signal and manipulating said colour information to provide converted colour information which, when input to said display device provides a substantially continuous tone image using said second set of colours.

BRIEF DESCRIPTION OF THE DRAWINGS

A preferred embodiment of the present invention will now be described with reference to the drawings in which:

FIG. 28 is a representation of the data sequence of error diffusion;

FIG. 29 is a further representation of the data sequence of error diffusion;

FIG. 30 is a further representation of the data sequence of the error diffusion;

FIG. 31 is a further representation of the data sequence of the error diffusion;

FIG. 35 is a schematic diagram of the inter-parallel 3-dimensional error diffusion unit of FIG. 34;

FIG. 36 is a schematic diagram of the current line pixel pipeline of FIG. 34;

DESCRIPTION OF THE PREFERRED EMBODIMENT

Figure 1:
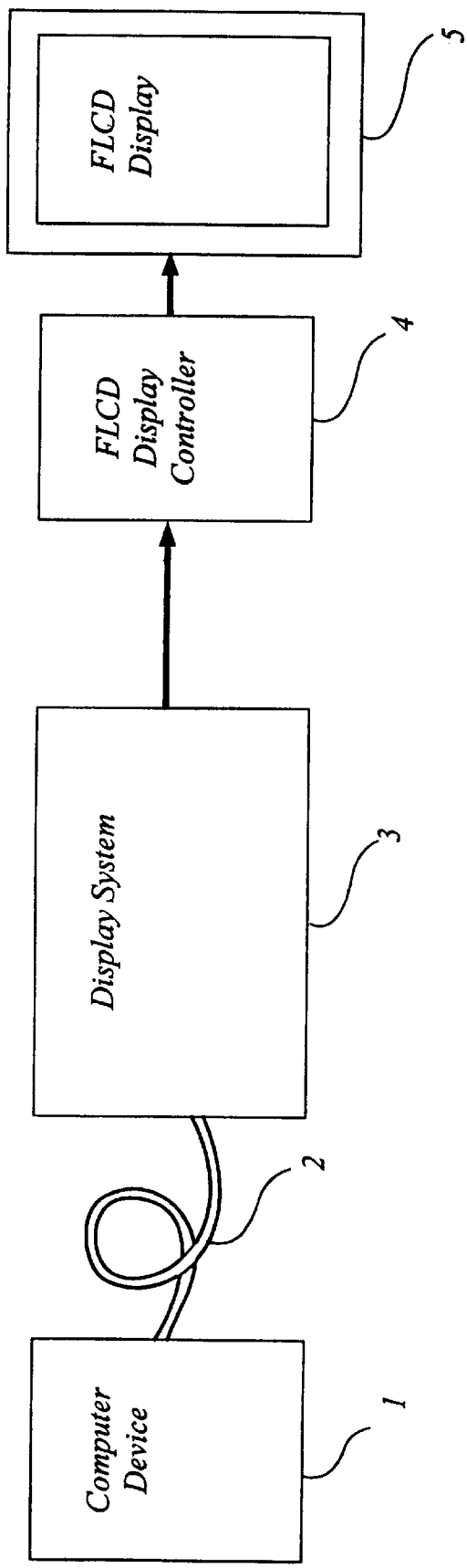
FIG. 1 is a schematic block diagram representation of an exemplary arrangement incorporating the preferred embodiment.

As shown in FIG. 1, a cable 2 interconnects a computer device 1 with a display system 3 which converts video data received from the computer device 1 into a format suitable for display on an FLCD display 5.

A display controller 4 is responsible for controlling the FLCD display device 5 and receives input in the form of four colour channels of information for each pixel of the FLCD display device 5. It is assumed in the present embodiment that each pixel of the FLCD display device 5 is capable of displaying the bi-level colours of red, green, blue and white. Hence, the input to the display controller 4, includes 4-bits of pixel colour information as well as associated location and control information. As each of the pixel's colours is capable of displaying two levels, either off or on, the total number of different colours will be 2×2×2×2=16 different colours.

Figure 2:
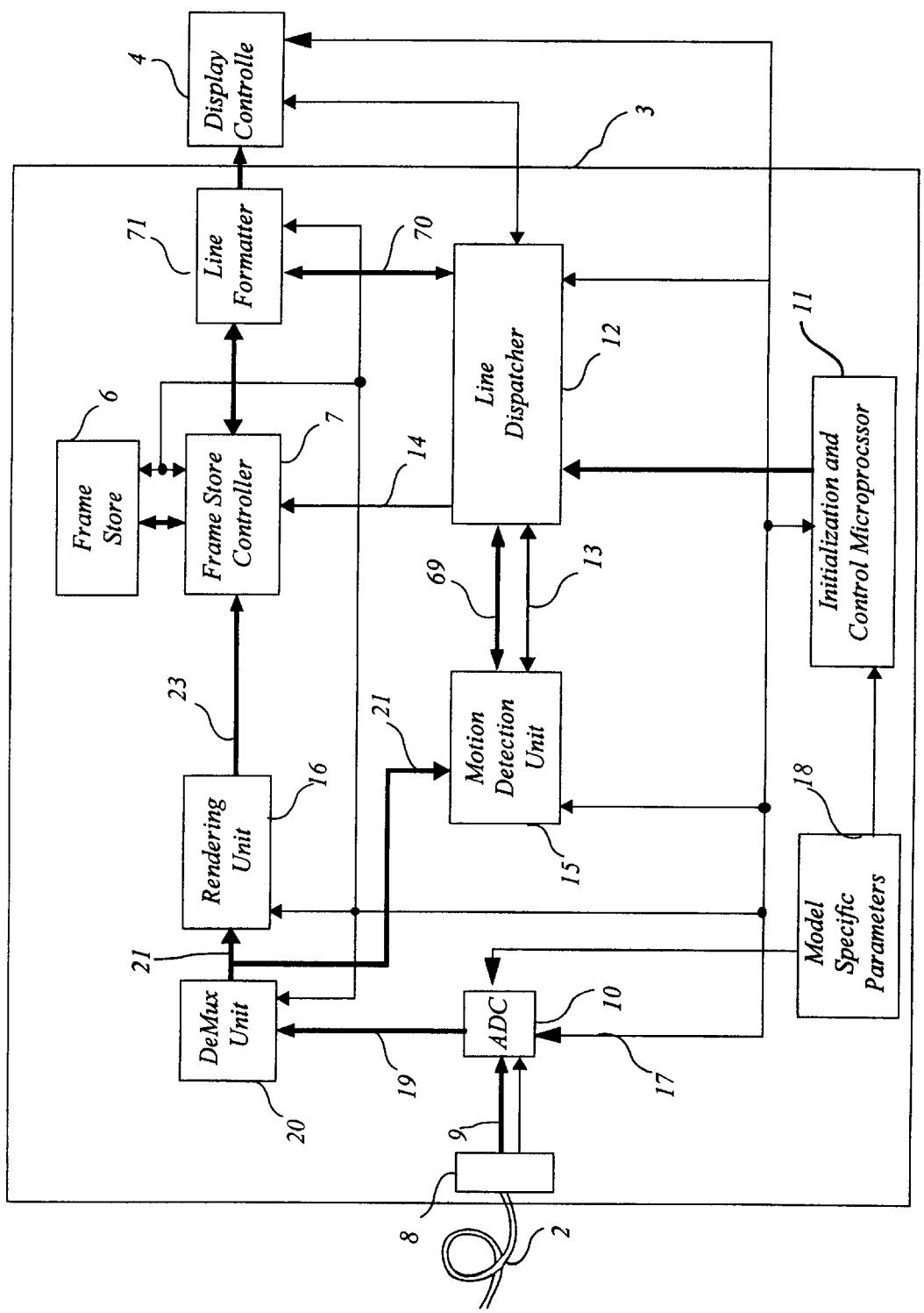
FIG. 2 is a schematic block diagram representation of the preferred embodiment.

Referring now to FIG. 2, there is shown the display system 3 in more detail. The analogue input to the display system 3 is achieved by means of the cable 2. The synchronization information of the analogue input is divided or separated from the colour information by an input divider 8. The colour information and synchronization information are then forwarded separately to an analogue to digital conversion unit 10. The Red, Green and Blue analogue input channels 9 from the divider 8 are fed to three analogue to digital converters in the analogue to digital conversion unit 10. Each analogue to digital converter converts its analogue channel input information to a corresponding digital value. The control information is also fed to the analogue to digital conversion unit 80 and is decoded and digitized to produce system control information such as pixel clock (PCLK), line retrace and frame retrace signals. The control information is output width the pixel colour information in addition to being supplied to the remainder of the system 3 via a control channel 17. The control channel 17 couples these signals to various portions of the overall system including an initialization and control microprocessor 11, a demultiplexer 20, a rendering unit 16, line formatter 71, a line dispatcher 12, a frame store 6, a frame store controller 7, a motion detection unit 15 and the display controller 4.

The analogue to digital conversion unit 10 requires model specific parameters, crystal timing input information, input control synchronization information as well as the three analogue input channels in order to produce the corresponding binary output pixels for each input pixel at the pixel clock rate which is determined by the model specific parameters. Preferably the model specific parameters are stored in a storage device 18, and are loaded into the analogue to digital conversion unit 10, at a start-up time by the initialization and control unit 11.

As an alternative to an analogue input, the cable 2 can convey an input signal in a digital format directed to an input buffer (not illustrated but known in the art), that substitutes for the analogue to digital conversion unit 10.

In order for a single display system 3 to be connected to a multitude of different computer systems, the cable assembly 2 can be preferably fitted with a model specific crystal and/or the storage device 18 (typically a serial EEPROM) from which the initialization and control microprocessor 11 can load model specific parameters into the display system controllers at start-up time. Model specific parameters which tend to vary from system to system include the frequency of the pixel output clock of the computer device 1, the number of pixels per line, the number of lines per frame, horizontal blanking time, vertical blanking time, analogue to digital gain and offset parameters etc. These parameters can then be stored in the cable 2 with different cables being available for different computer devices 1, thereby increasing the versatility and utility of the display system 3.

The number of binary bits and hence the resolution with which digital values are output from the analogue to digital conversion unit 10, can vary according to factors such as the cost and speed of the A/D Converters used. In this embodiment, each A/D converter of analogue to digital conversion unit 10 outputs 8 bits of information for its respective input colour on an A/D output bus 19. Hence, the A/D output bus 19 is at least 24 bits wide, representing a single pixel of display information. Additionally, the analogue to digital conversion unit 10 outputs pixel clocks, frame and other synchronization information on the A/ID output bus 19. A demultiplexer 20 groups together two adjacent pixels and outputs them together with clocking and synchronisation information on a bus 21 at half the input rate to the demultiplexer 20. This has the effect of halving the speed with which the rest of the display system 3 is required to work.

The dual pixel output format from the de-multiplexer 20 is fed to the rendering unit 16 which for each 24 bit input pixel information produces a 4-bit output in the form of one bit for each of Red, Green, Blue and White (RGBW) pixel data for the FLCD Display 5. The groups of pixels are output on the rendering unit's output bus 23.

Figure 3:
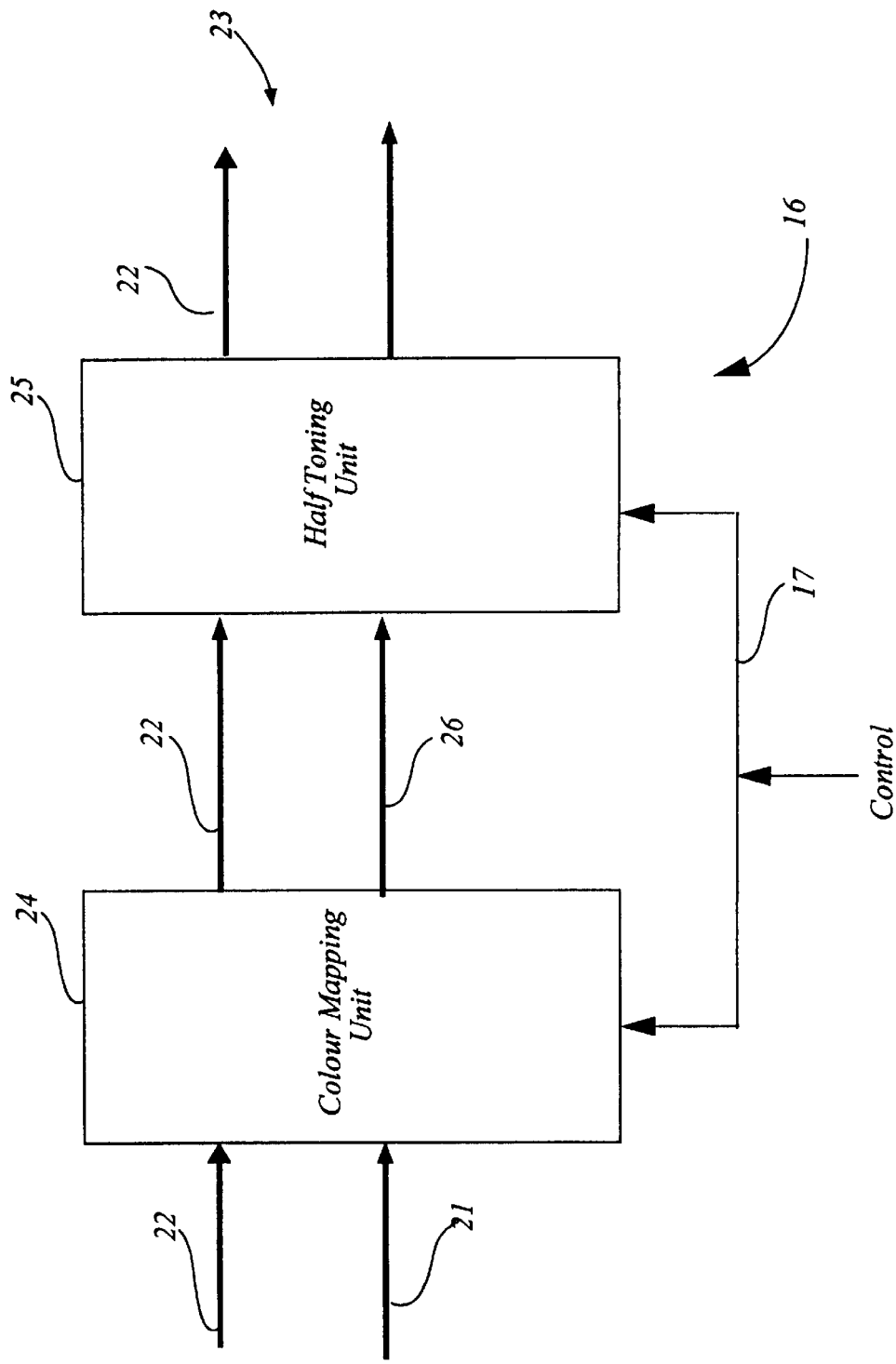
FIG. 3 is a schematic block diagram representation of the rendering unit of FIG. 2.

Turning now to FIG. 3, the rendering unit 16 consists of a colour mapping unit 24 and a halftoning unit 25. The demultiplexer output bus 21 connects to the colour mapping unit 24 to supply RGB pixel information and sychronization information. The sychronization information includes the pixel clock, vertical sync and horizontal sync signals. The colour mapping unit 24 performs a series of transforms on the input RGB pixel data before sending the transformed pixels and sychronization information to the halftoning unit 25, via a colour mapping to halftoning pixel bus 26, to halftone the pixels to produce 4-bit pixel output. This output appears on a rendering unit output bus 23.

Figure 4:
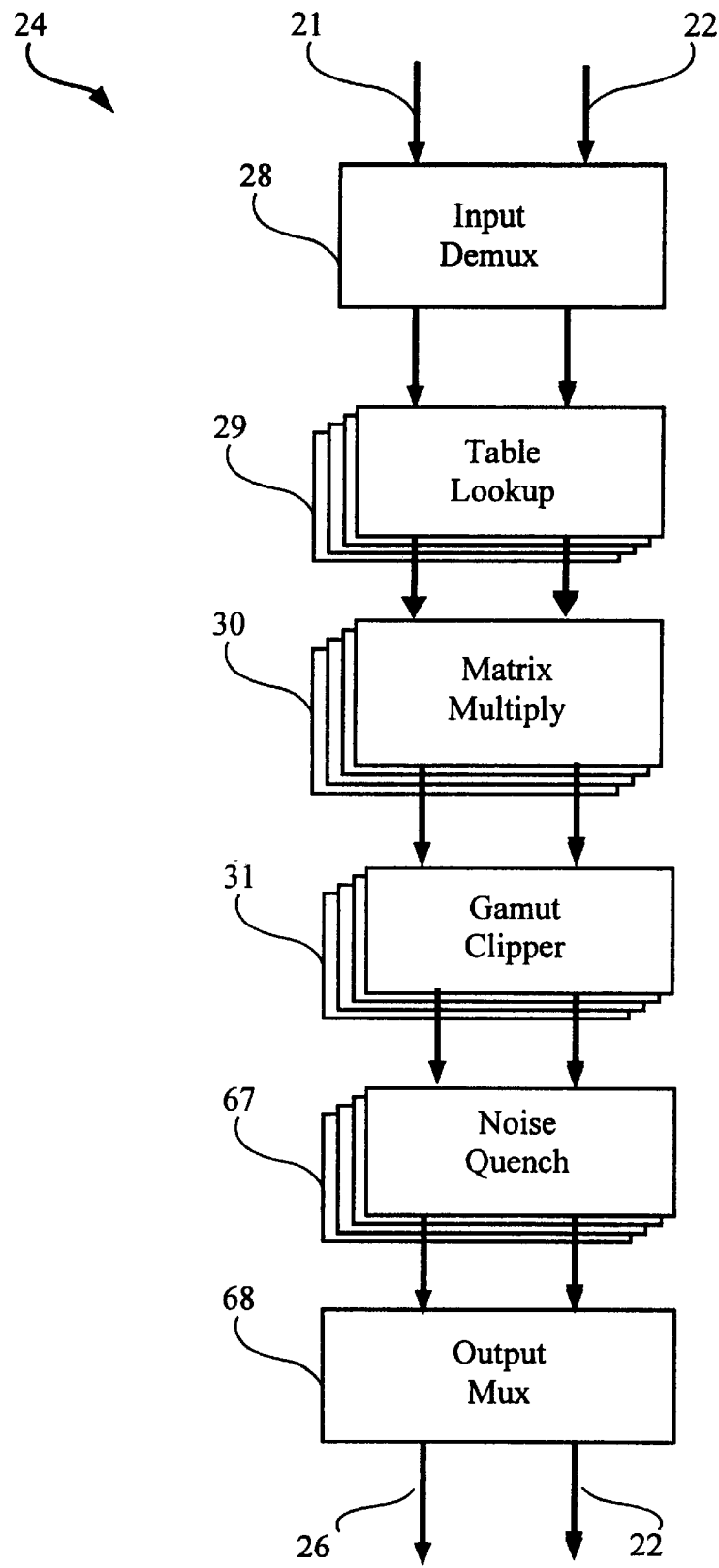
FIG. 4 is a schematic block diagram representation of a first embodiment of the colour mapping unit of FIG. 3.

Referring now to FIG. 4, there is shown in more detail a first embodiment of the colour mapping unit 24. The colour mapping unit 24 performs a series of transformations on RGB digital video data, mapping each pixel of the input data to a new position in RGB space. The purpose of these transformations is to modify video data intended for display on a CRT so that it is suitable for display within the gamut of the FLCD display 5.

The colour mapping unit 24 has a pipelined structure, with identical input and output interfaces. Each of the colour transformations can be switched in or out by appropriate configuration. In adapting the preferred embodiment for display on a monochrome FLCD Display, the colour mapping unit 24 can be omitted.

The colour mapping unit 24 performs a series of transformations on the input RGB data prior to halftoning. These transformations are applied one after the other, re-mapping data within the RGB space to achieve the following effects:

1. Gamma Correction (also called DeGamma)
2. Contrast Enhancement
3. Colour Masking
4. Gamut Clipping
5. Noise Quench The pixel input data is taken from demultiplexer output bus 21, two pixels as a time. The pixel input data is further demultiplexed by colour mapping demultiplexer 28 so that the rest of the colour mapping unit 24 works in parallel on four pixels at a time. The pixel clock, vertical sync, horizontal sync control signals 22 are also treated in tandem.

A colour mapping table lookup unit 29 implements the processes of gamma correction and contrast enhancement by replacing each pixel by a predetermined value stored in a lookup table whose values can be written through a configuration interface at system startup.

Gamma correction is a monotonic, non-linear transformation applied to the Red, Green and Blue components of a pixel independently. Its purpose is to correct the intensity of the incoming colour components, which are originally intended for display on a CRT, to match a FLCD panel's characteristics. Given that the primary colour component values of each pixel is in the range of 0 to 255, the following formulae must be applied to each of the input colour components:

$R_{out}=255*(R_{in}/255)^{\gamma}$
$G_{out}=255*(G_{in}/255)^{\gamma}$
$B_{out}=255*(B_{in}/255)^{\gamma}$ The value of $\gamma$ is determined by measurement of the colour response characteristics of a given panel and is determined by measurement. The colour mapping unit 24 can implement the degamma function using a lookup table.

Contrast Enhancement is a linear transformation, also applied to Red, Green and Blue components independently. Contrast enhancements moves all colours towards the corners of the input gamut, increasing the contrast between near-black and near-white areas. Preferably contrast enhancement is implemented by changing the values loaded into the lookup table of colour mapping table lookup unit 29 as this avoids the colour mapping unit 24 having any hardware dedicated specifically to contrast enhancement.

Contrast enhancement applies a linear multiplication factor to each of the R, G and B values of each sample, according to the formula:

$R_{out}=((R_{in}-128)*(256/h))+128$
$G_{out}=((G_{in}-128)*(256/h))+128$
$B_{out}=((B_{in}-128)*(256/h))+128$ where h is an integer in the range 1 to 256.

Figure 5:
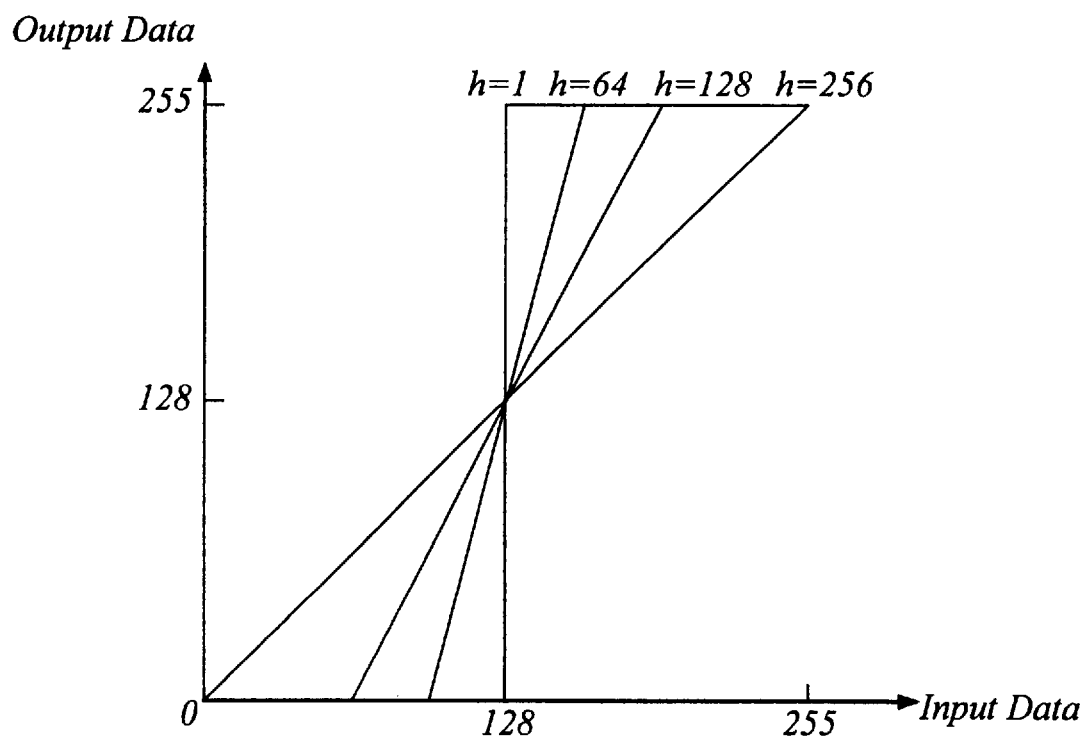
FIG. 5 illustrates various contrast enhancement approaches.

FIG. 5 shows the corresponding effect of contrast enhancement on input pixels for different values of h.

As seen in FIG. 4, a colour mapping matrix multiply unit 30 implements Colour Masking by applying a programmable matrix multiplication to the incoming RGB data. Colour Masking is a matrix transformation of the input data and each output (Red, Green and Blue) depends on each of the Red, Green and Blue inputs. It is designed to compensate for any non-orthogonal colour characteristics of the FLCD display 5. A possible additional function of the colour mask circuit is to perform RGB to luminance conversions employing the Green matrix multiply circuit only.

The colour mapping matrix multiply unit 30 includes nine programmable registers which hold matrix coefficients $a_{rr}$ through to $a_{bb}$ which are loaded at startup time and are determined from measurement of the colour characteristics of the FLCD display 5. The colour mapping matrix multiply unit 30 produces output colours according to the following formula.

$R_{out}=a_{rr}R_{in}+a_{rg}G_{in}+a_{rb}B_{in}$
$G_{out}=a_{gr}R_{in}+a_{gg}G_{in}+a_{gb}B_{in}$
$B_{out}=a_{br}R_{in}+a_{bg}G_{in}+a_{bb}B_{in}$ A gamut clipping unit 31 compensates for the fact that the RGBW display of the FLCD panel cannot represent all of the possible values in the RGB space. Values that cannot be represented, which are generally near-saturated colours, are re-mapped to within the panel's colour gamut.

Figure 6:
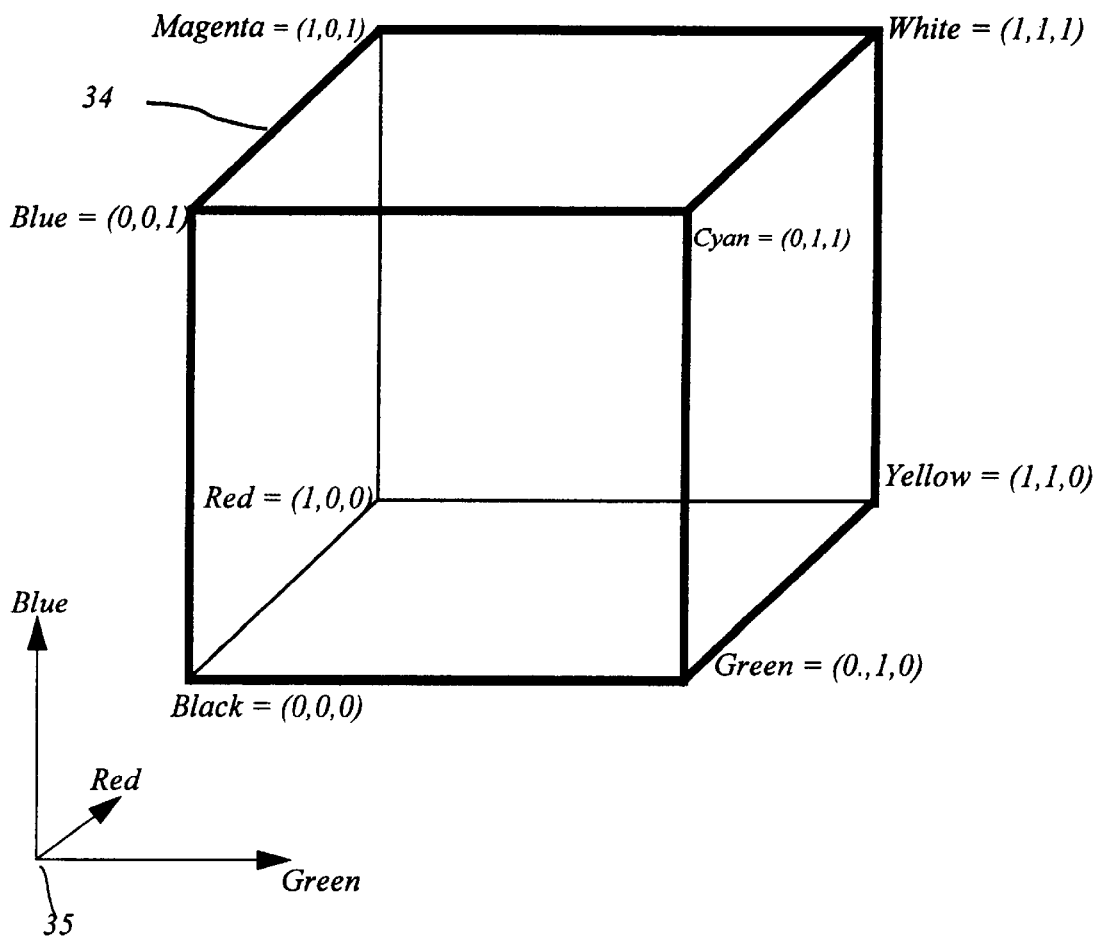
FIG. 6 is a schematic view of the colour gamut of the CRT type device.

In order to conceptualize the range of colours that can be displayed by this method it is helpful to map these colours into a unit cube 34 as shown in FIG. 6. The individual contributions of each of the three separate subgroups at any one particular point are added together to yield the final colour. The directions of increased intensity of a given primary colour is shown by the axis 35 with green increasing to the right, blue increasing vertically, and red increasing into the plane of the page. The chroma or saturation of a particular colour is represented by the shortest distance of a colour from the main diagonal of the cube. The main diagonal of the cube, running from (0,0,0) to (1,1,1), with equal amounts of each primary, represents the different grey levels or grey scale, from black (0,0,0) to white (1,1,1).

The actual colours that can be displayed by a device will then form points within and on the surface of the cube's volume. For example, in the 24 bit per pixel display model, the 256 different intensity levels of displaying the colour blue will form 256 separate horizontal planes through the cube. Similarly for the red and green intensity levels. The intersection of these planes will form $2^{24}$ separate points within, and on the surface of, the cube.

Figure 7:
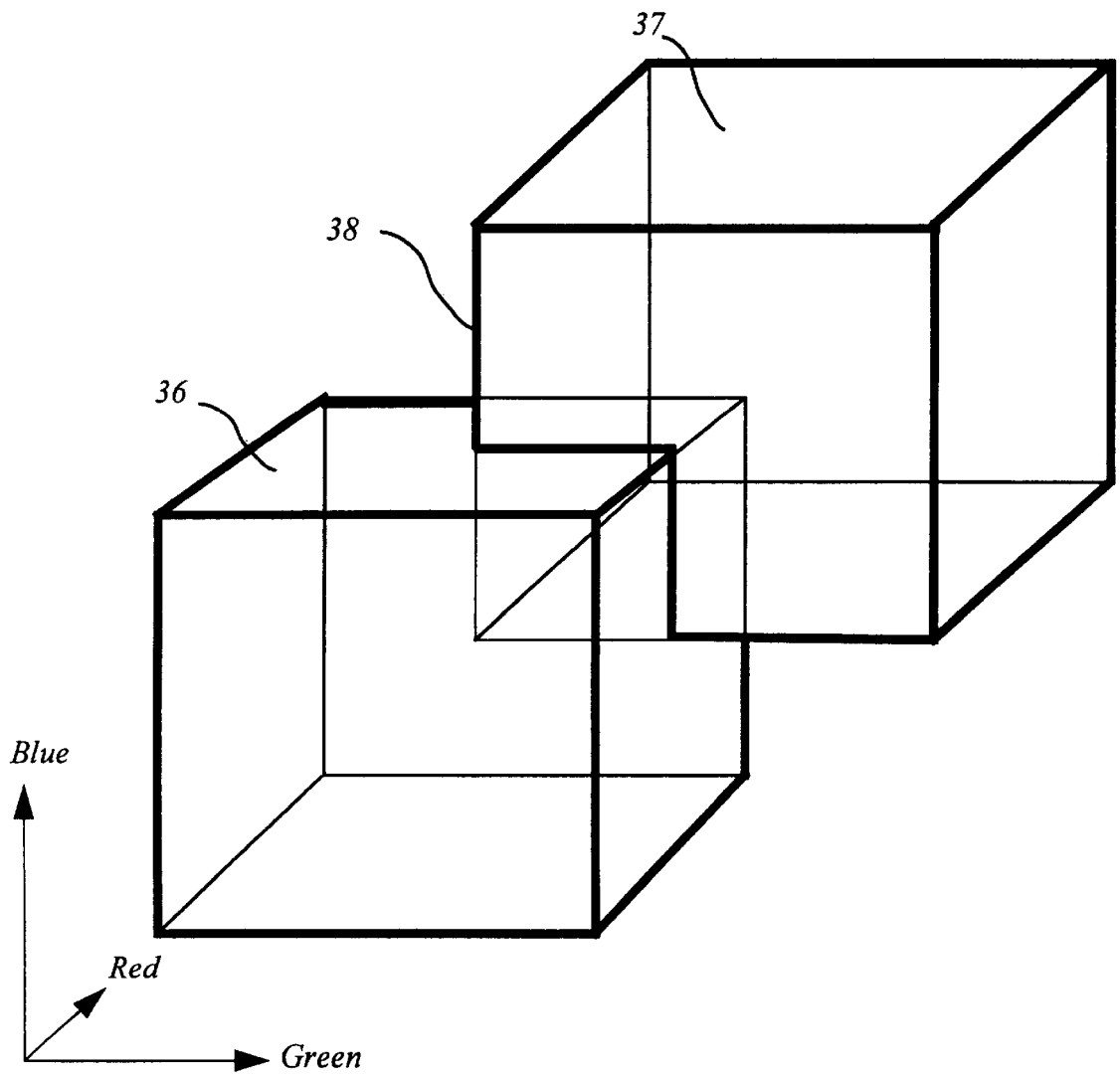
FIG. 7 illustrates the colour gamut of a display device having red, green, blue and white pixel elements.

Normally the colour white or grey is formed by equal intensities of red, green and blue pixel elements with different grey levels corresponding to different intensities. Hence the use of an extra white pixel corresponds to a translation of the relevant colour cube along the grey axis of the RGB space. FIG. 7 shows the overlapping RGB colour cubes for a display device having a bi-level white pixel element. The lower cube 36, represents the colour space mapped out by the red, green and blue pixel elements of the colour display device when the white pixel element is not illuminated. The upper cube 37, represents the colour space when the white pixel is illuminated. The upper cube has been translated along the diagonal greyscale axis by a distance which is proportional to the intensity of the white element. Hence the actual degree of overlap of the two different cubes is dependant upon this translation factor and in turn on the intensity of the white pixel. A volume 38 (as represented by the darker lines of FIG. 4) swept out by the combination, or summation, of the cubes 5 and 6 therefore represents the totality of different colours that can, by means of halftoning methods, be displayed by the display device.

Figure 8:
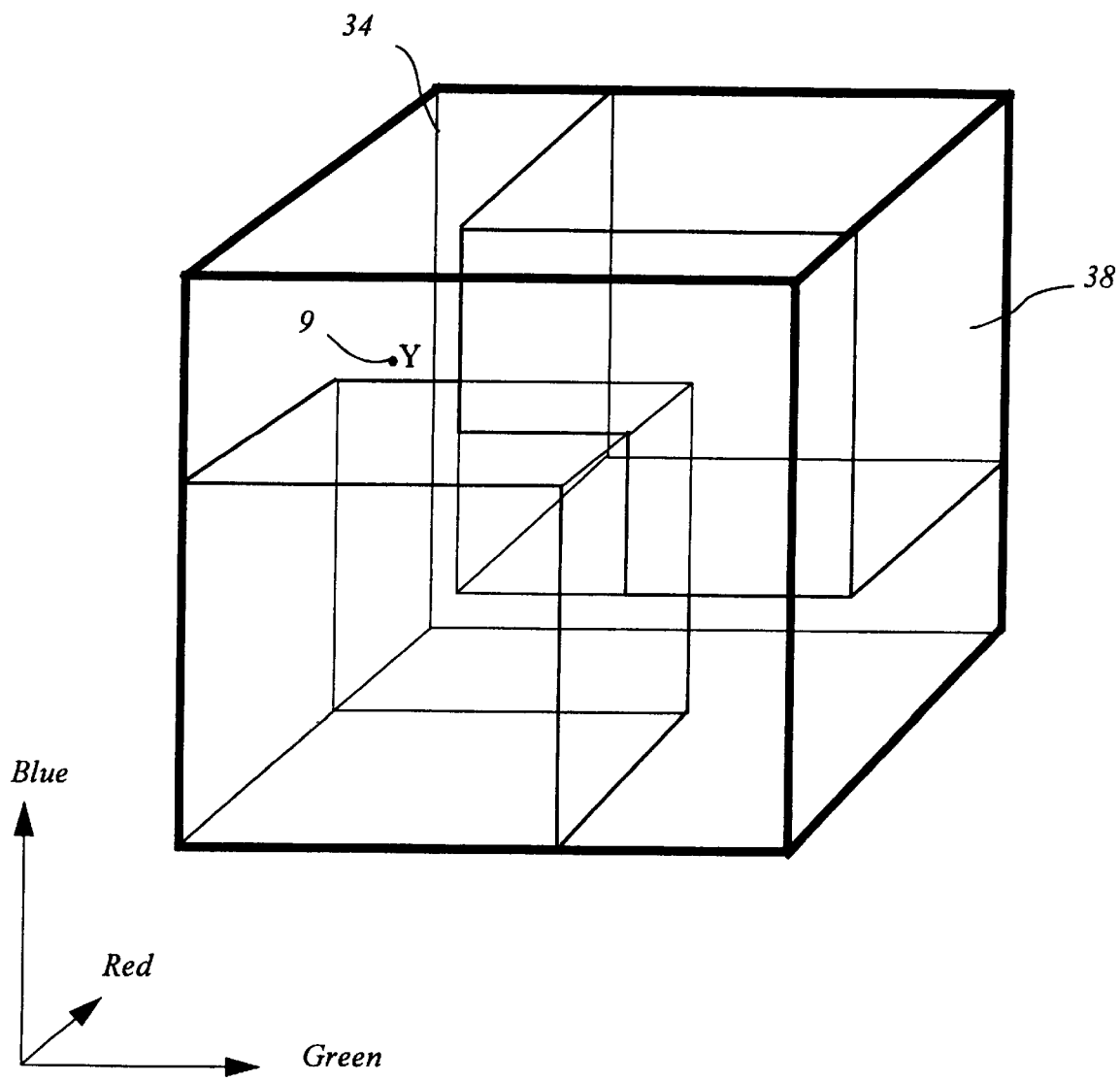
FIG. 8 illustrates the mapping of the colour gamut of the display device as illustrated in FIG. 7 into the colour gamut of the normal display device of FIG. 6.

As will be appreciated from FIG. 7, the overall colour space is no longer in the form of a cube. The colours of the input pixels are able to span the range of values as depicted by the original colour cube in FIG. 6. Greater advantage can be taken of the granularity of all the colours that can be displayed by the display device if the relationships between the colour spaces depicted in FIG. 6 and FIG. 7 are transformed as depicted in FIG. 8 which shows the RGBW colour space 38 of FIG. 7 which fits inside that of the RGB cube 34 of FIG. 6.

Although, by using the full colour space of the RGBW device as shown in FIG. 7, it has been possible to increase the range of intensities of colours that can now be displayed, a further problem has been created. The problem is the inability to display those colours that lie inside the RGB colour space 34 as shown in FIG. 8, but outside the RGBW space 38. A first example of such a colour 40 is depicted by the letter Y in FIG. 8.

Figure 9:
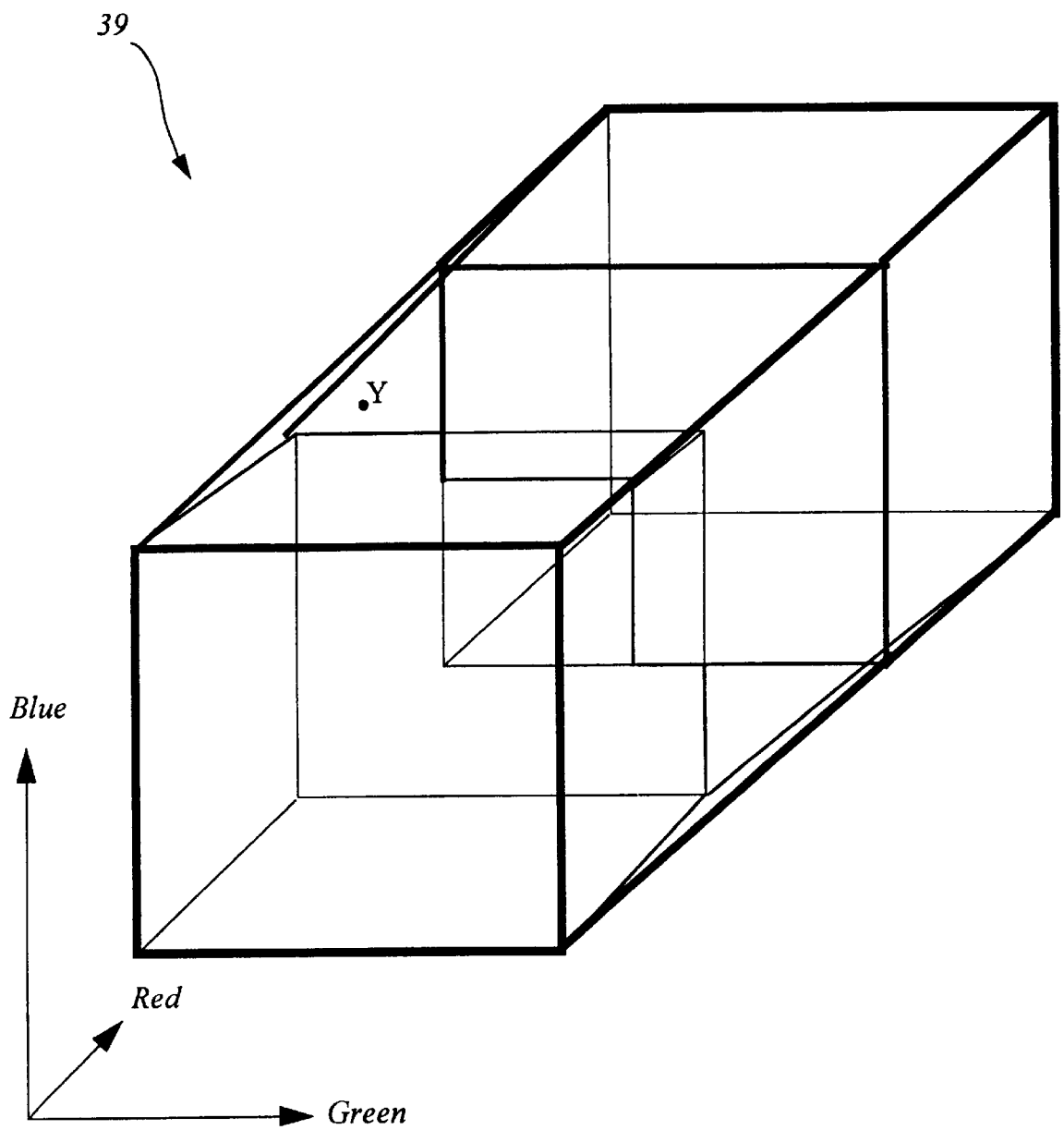
FIG. 9 illustrates the convex hull volume of the display device of FIG. 7.

Referring now to FIG. 9, in a first example, the colour Y lies within the volume swept out by a convex hull volume encompassing all the points displayable by the RGBW display. A convex hull is the equivalent volume that would be formed by stretching a rubber sheet around all the points. Hence, any line between two points inside a convex hull is also inside the same convex hull. More formally, if we choose one of the points to be the origin and denote the set of vectors $r_1, r_2, \ldots r_n$ to be the vectors from the origin to the other points, then the convex hull is a set of points (represented by the vector $r_h$) formed by using weights $w_i >= 0$ that satisfy the following conditions:

$$r_h = \sum_{i=1}^{n} w_i \cdot r_i \text{ and}$$

$$\sum_{i=1}^{n} w_i = 1.$$

An example of the convex hull swept out by the RGBW display gamut is shown in FIG. 9. Although it is not possible to directly display the colour represented by the position Y, the principles of halftoning, such as the Heckbert process, referred to previously, can be used to display a close approximation of that colour.

Hence, by means of halftoning, it is possible to simulate the display of all those values swept out by the convex hull of the RGBW colour values as shown in FIG. 9.

Figure 10:
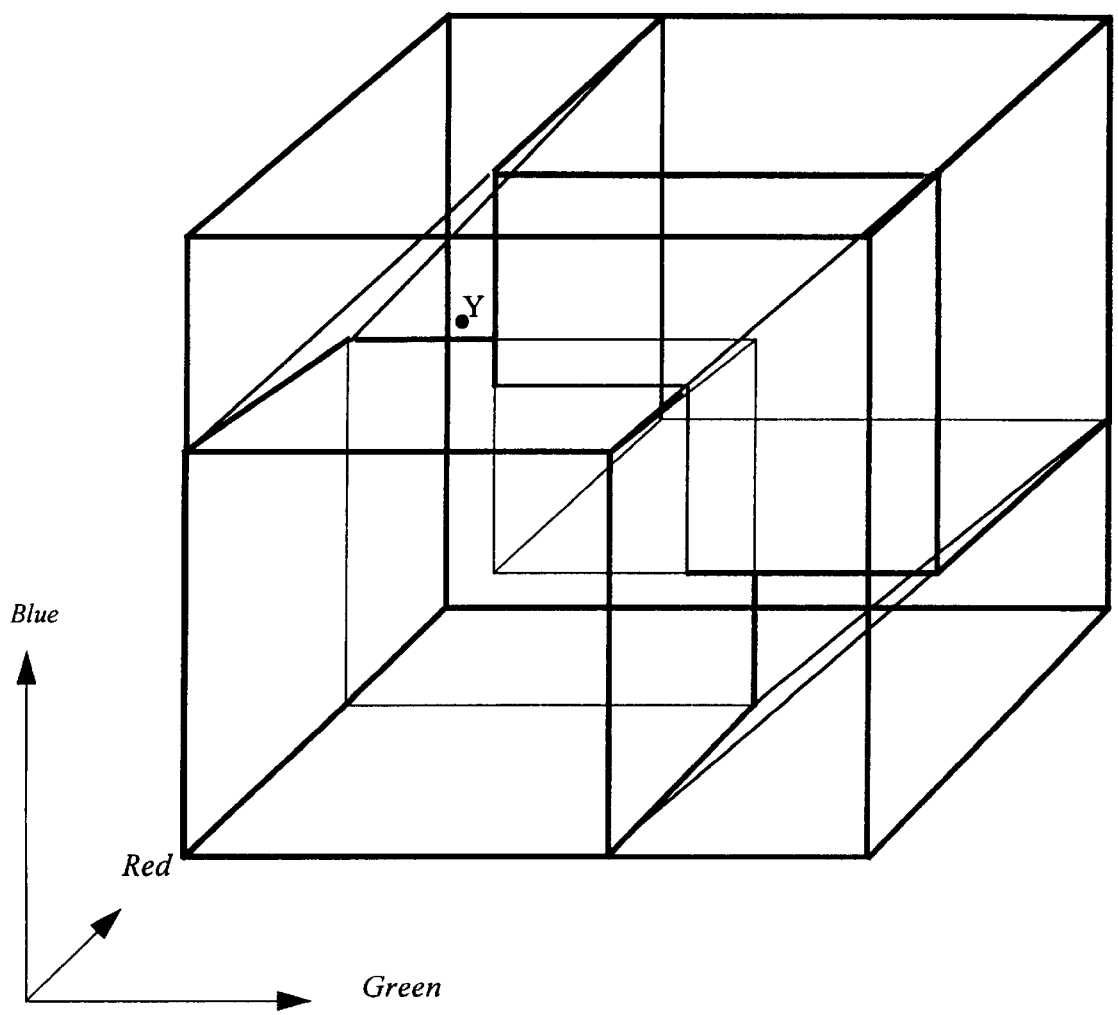
FIG. 10 illustrates the volume of FIG. 9 inside the colour gamut of FIG. 6.

FIG. 10 depicts the resulting colour space in addition to the desired colour space.

Figure 11:
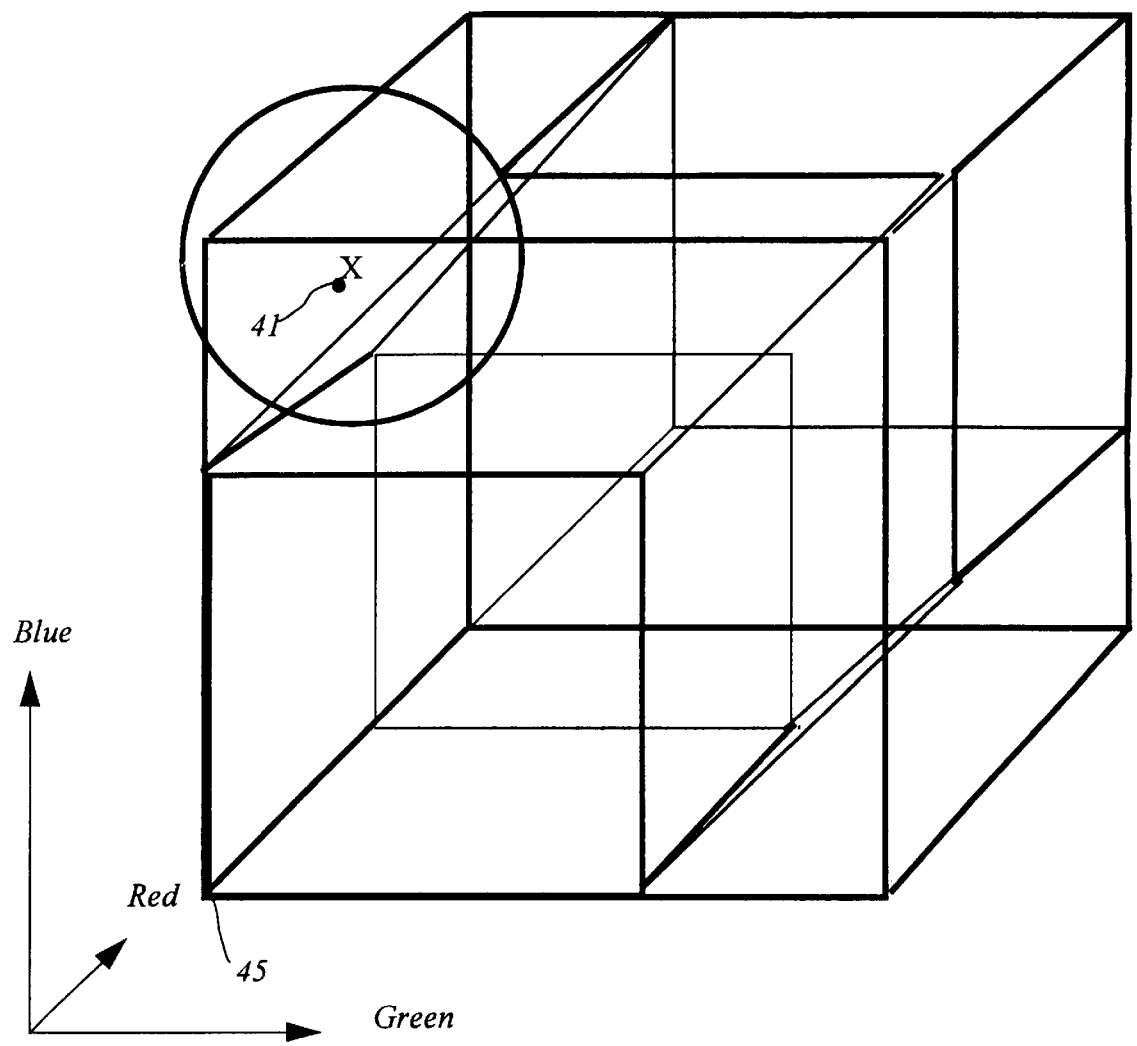
FIG. 11 illustrates displaying colour values that do not form part of the output colour gamut.

Referring now to FIG. 11, there is shown a second example of a colour 41 represented by the letter X. Here, the corresponding colour value represented by X is outside the representable space and must be changed to display a representable colour. A number of different methods can be used to minimize the loss of reproduction quality in the displayed image.

Figure 12:
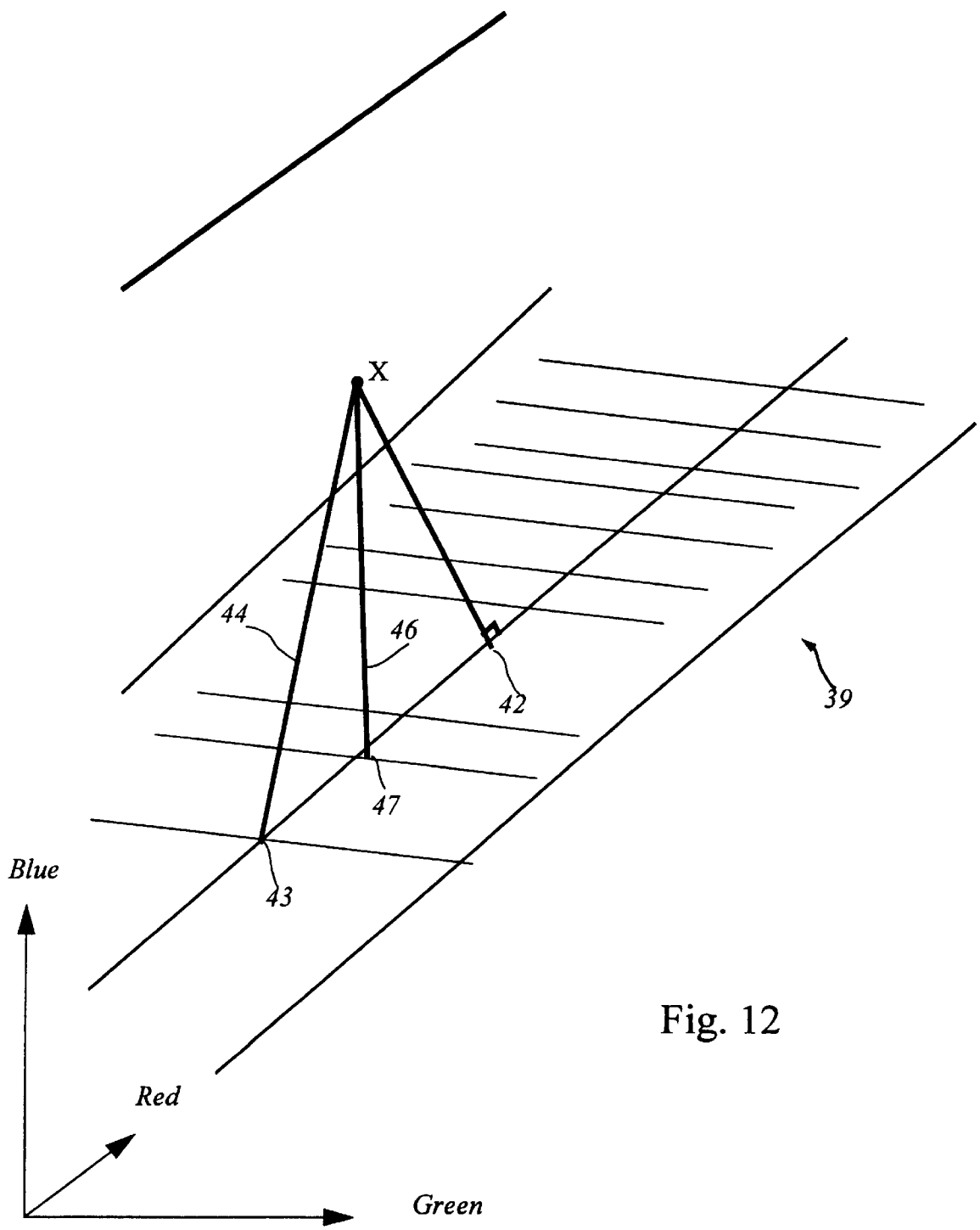
FIG. 12 is an enlarged portion of FIG. 11, illustrating different methods of displaying colours outside the output colour gamut.

Turning now to FIG. 12, there is shown an enlarged view of the circled region shown in FIG. 11, with X being the value to be displayed.

In a first method, a decision is made to firstly move the colour value X to the closest point 11 of the convex hull volume 8 of the display, and to thereby display the value of the print 11 by means of halftoning methods instead. In practice, owing to the nature of the volume swept out by the RGBW colour space, this will be near equivalent to a reduction in the saturation or chromaticity of the colour in question as a result of the new colour value 42 lying closer to the overall cube diagonal, which is assumed to represent the grey scale of the cube.

The resulting colour which is halftoned is closest, in RGB space, with euclidean distance measurement, to that which representation is desired, thereby introducing the minimum RGB mean-squared error in the displayed pixel.

In a second method, an intersection point 43 of the surface of the volume 39 and a line 44 drawn from the point X to the origin of the colour space 45 (as seen in FIG. 11) is calculated. It is assumed that the origin of the colour space is in the vicinity of the point representing black in the original colour cube. The pixel position corresponding to the point 43 is then used as the value to be displayed via halftoning.

As the line 44 is in the form of a vector from the origin 45 to the point X, the effect of this method is to preserve the proportions of the three primary colours in the output value, at the expense of the luminosity of the displayed colour.

A third method, is to change only one of the three values representing the colour to be displayed, until an intersection with the volume is achieved. In this example, the blue component value of the colour X is reduced along a line 46 until it intersects at a point 47 the convex hull volume 39. The blue channel is chosen because of the eyes relative insensitivity to blue in comparison with green and red. This method is called the 'drop-clip' method. Although this technique has the effect of changing the hue of a particular colour, the advantage of this process is that there is an alteration to only one of the primary colours. Accordingly, this method is significantly simpler to implement in a hardware type device.

Figure 13:
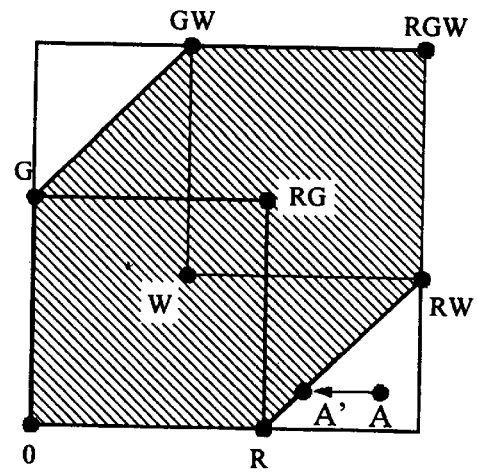
FIG. 13 illustrates another example of the drop clip method used in the preferred embodiment.

Referring now to FIG. 13 there is shown an example of the drop clip method where the gamut of the two dimensional cube has been projected to a two dimensional cube showing only the Red and Green dimensions only. In order to transform the point A to A' in accordance with the drop clip method, the following method should be used:

Assuming a RGB pixel data format with R, G and B in the range 0 to 255:

If R>minimum(G,B)+GLT, then set $R_{out}$=minimum(G,B)+GLT;

If G>minimum(R,B)+GLT, then set $G_{out}$=minimum(R,B)+GLT;

If B>minimum(R,G)+GLT, then set $B_{out}$=minimum(R,G)+GLT;

where GLT is the Gamut Limit Threshold, representing the intensity value of an illuminated Red, Green or Blue portion of a particular pixel relative to the illumination of the same portion and a white portion of a pixel. For the purpose of the present example, it is assumed that GLT is constant for each of the Red, Green and Blue channels.

Figure 14:
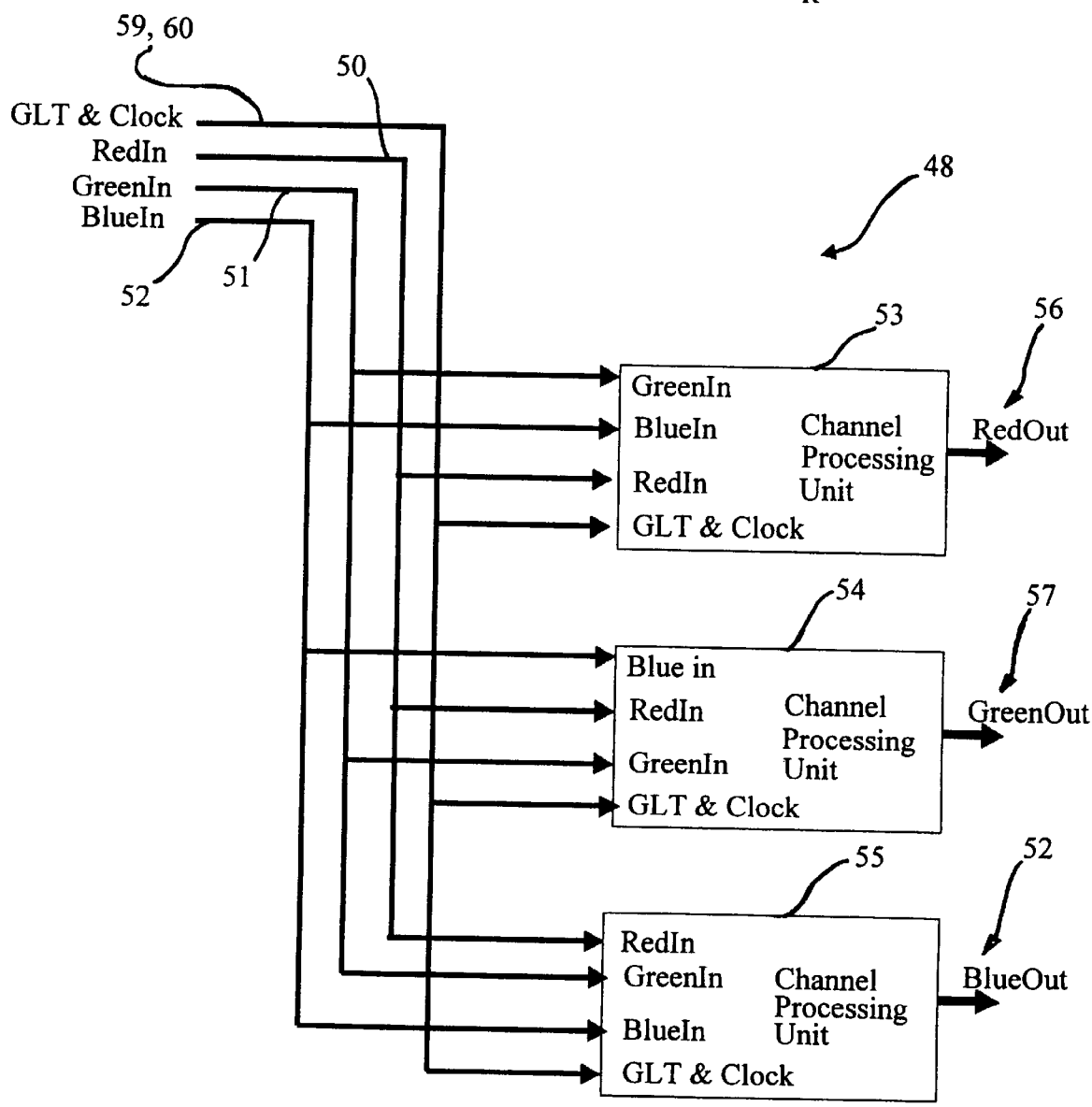
FIG. 14 is a schematic view of an apparatus implementing the drop clip method.

Referring now to FIG. 14, there is shown a gamut clipping apparatus 48 implementing the drop clip method of FIG. 13 for input comprising an 8-bit per pixel Red 50, Green 51 and Blue 52 colour pixel input. This input is processed by a corresponding channel processing unit 53, 54, 55 to produce a corresponding red output channel 56, green output channel 57 and a blue output channel 58. Additional clocking information 59 and the constant gamut limit threshold (GLT) 60 are also provided as inputs to the gamut clipping apparatus 48.

Figure 15:
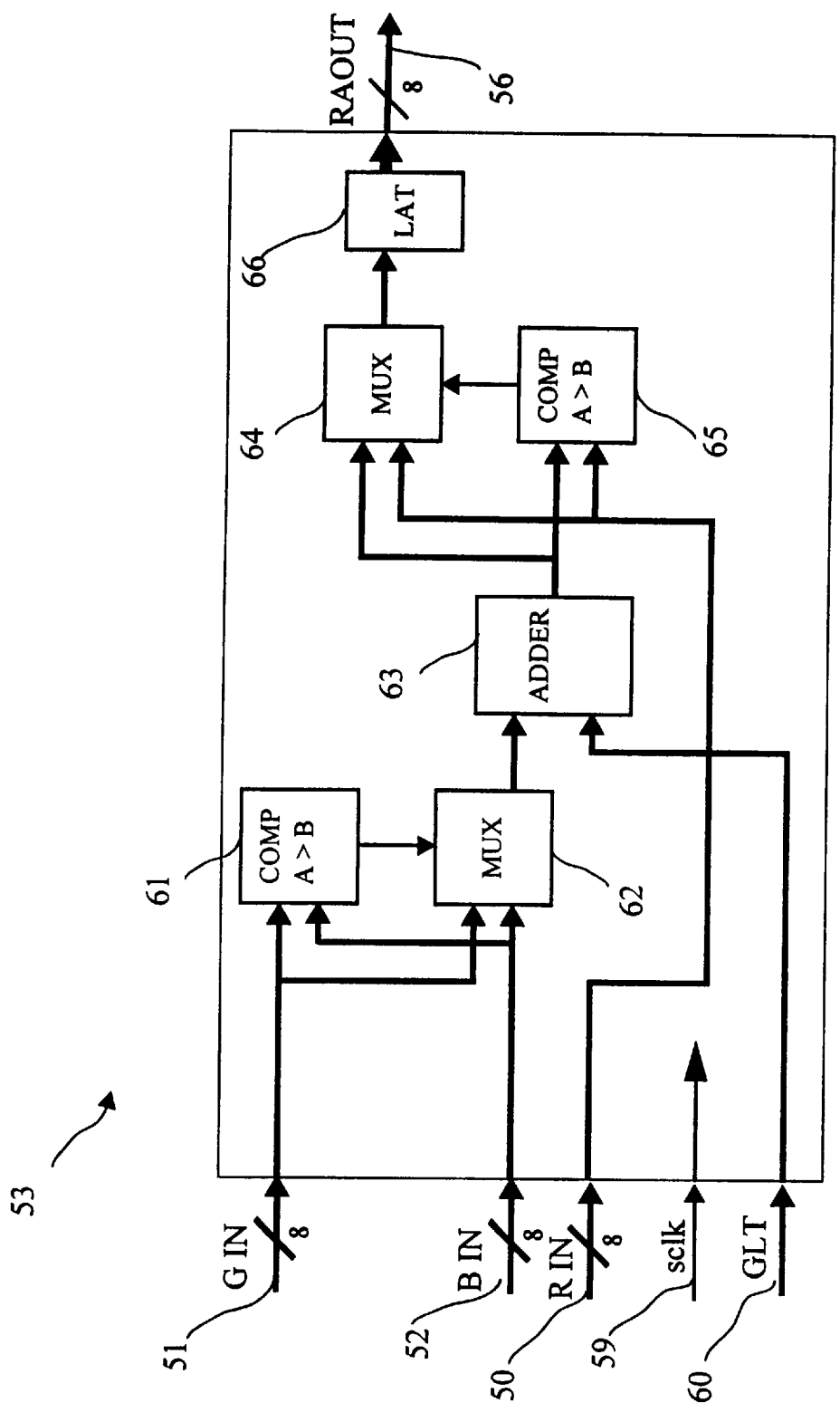
FIG. 15 is a more detailed schematic view of the first channel processing unit of FIG. 11.

Referring now to FIG. 15 there is shown is a more detailed schematic view of the first channel processing unit of FIG. 11. Each channel processing unit is the same except the inputs are permuted. This channel processing unit 53 is designed to implement the first conditional statement of the above mentioned method.

An initial comparator 61 and multiplexer 62 are used to determine the minimum value of the Green input channel 51 and the Blue input channel 52. The resultant minimum is then added with the GLT 60 by adder 63. This new value is then used to determine if the output value should be altered by comparator 65 and multiplexer 64 as outlined by the above algorithm.

Noise quenching attempts to compensate for rectified noise in the near-saturated regions of the input. It works by mapping near-saturated pixels to their saturated values if some number of the adjacent pixels are also saturated.

Figure 17:
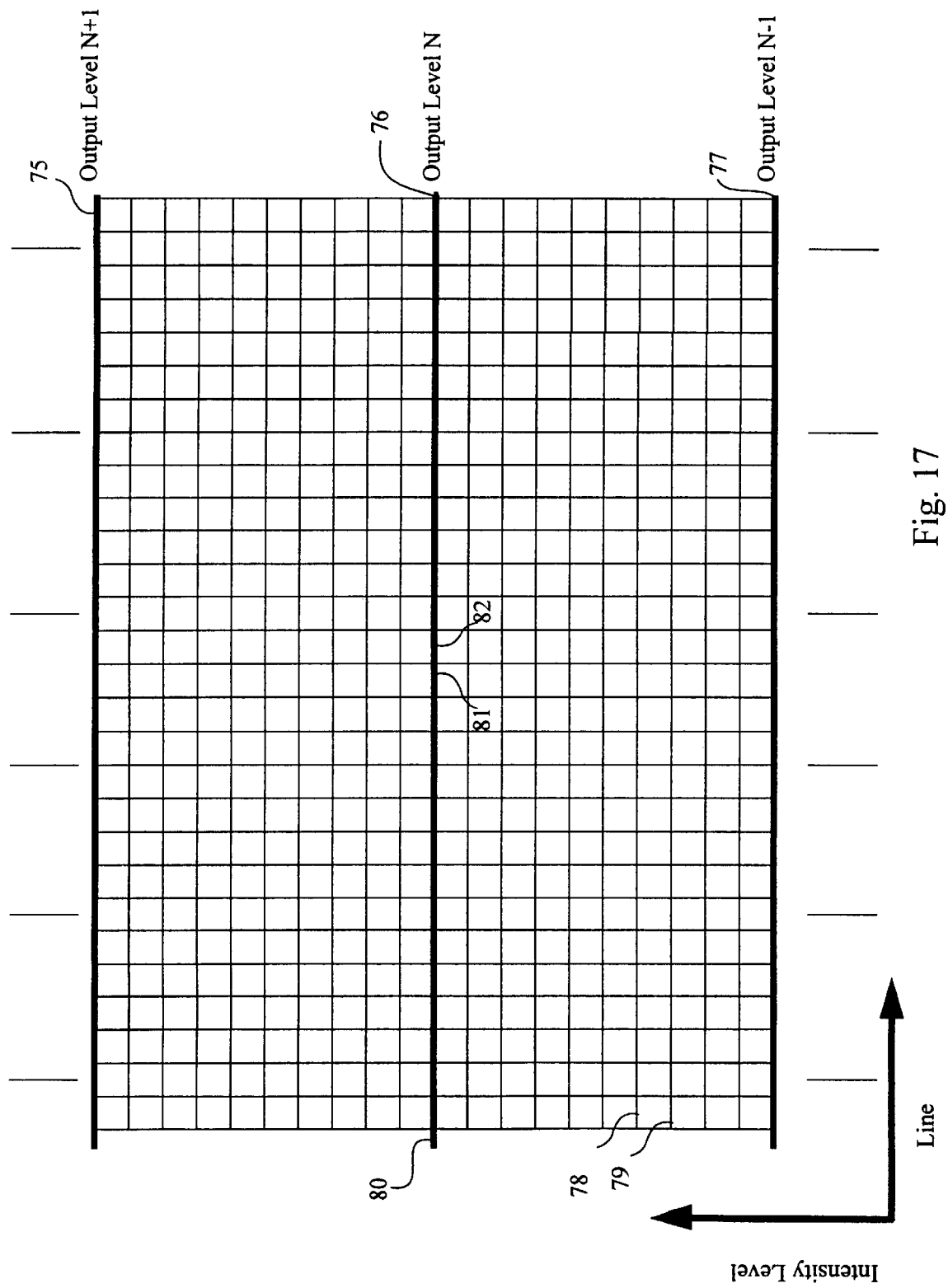
FIG. 17 is a graphical view of the pixel intensity level versus pixels on a line, for a region of constant intensity.

Turning now to FIG. 17, an example is shown of the process of error diffusion which is normally used where the number of levels of an output device is less than the number of levels assumed by the input means to that device. FIG. 17 shows the granularity of the possible output levels, 75, 76, 77 is much less then the granularity of the input levels 78, 79. In the present example, the granularity of the output is 10 times less than the granularity of the input. As a consequence, processes such as error diffusion or halftoning are used to attempt to approximate the display of the desired input image as close as possible using the limited number of output levels available. FIG. 17 shows a region of a line at a constant intensity, with portions 81, 82 representing adjacent pixels on a line.

The preferred embodiment is most effective in regions of near constant intensity level. In FIG. 17 it is assumed that such a region exists whereby the input 80 is of near constant intensity level for the portion of a line. In this example, the input intensity level 80 happens to also coincide with an output intensity level 76. Hence the error in the possible value that the output display can use to display this value is zero.

However, when using an input which is derived from an analogue source, it is inevitable that some form of 'noise' will be associated with the input signal. It is assumed for the purposes of discussion of the preferred embodiment that the form of noise is Gaussian and random in nature. The effect of this noise is to produce fluctuations in the input signal and this in turn can cause fluctuations in the output of the analogue to digital converters that convert the analogue input to a corresponding digital output level. For the purposes of discussion of the preferred embodiment it can be assumed that each analogue to digital converter produces an 8-bit output format and hence are capable of producing one 256 different levels in the range of 0 to 255.

Figure 18:
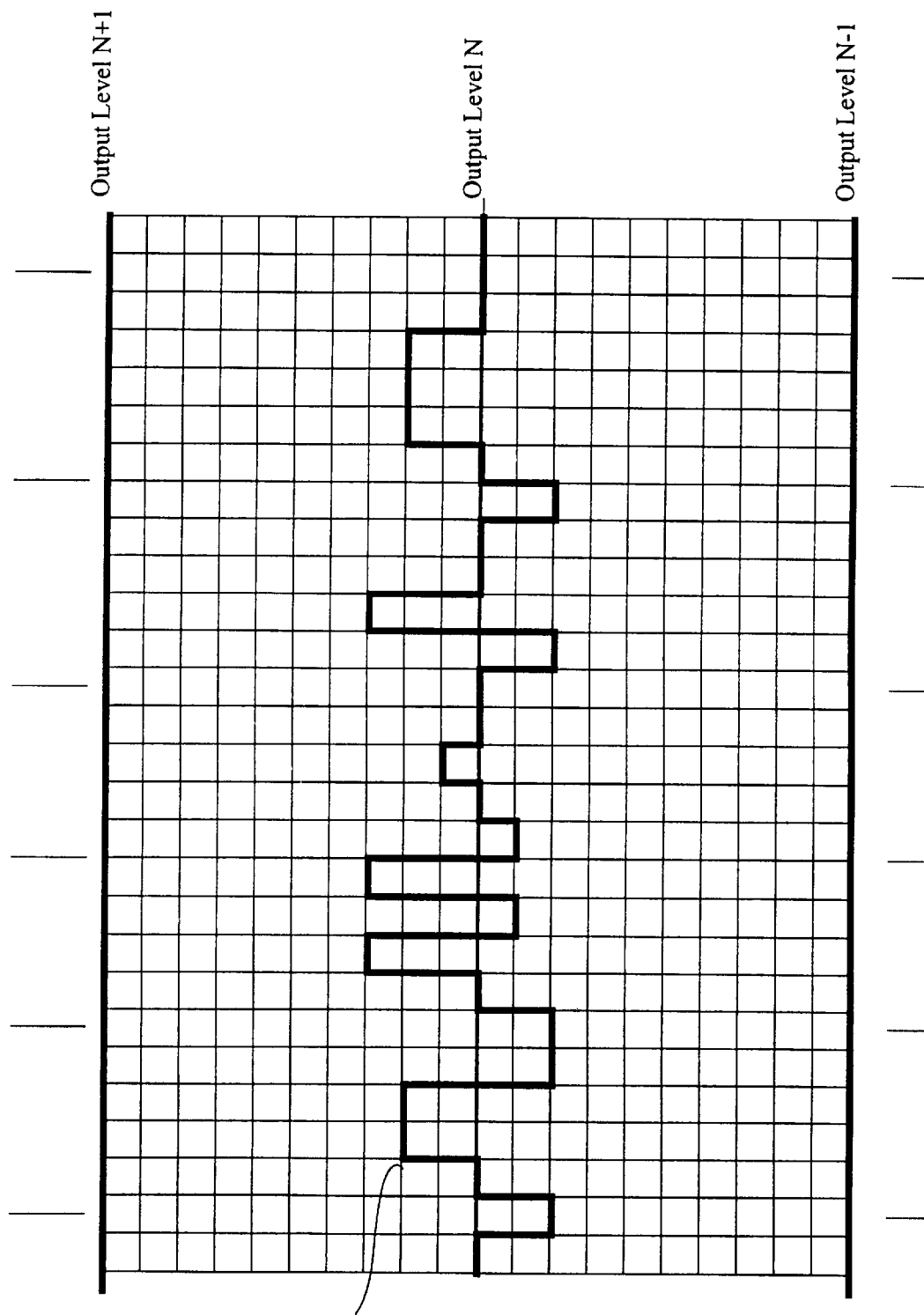
FIG. 18 is a graphical view of the pixel intensity level in FIG. 17 with noise added to the pixel intensity level.

Referring now to FIG. 18, there is shown a noise input signal 83 which consists of the input signal 80 of FIG. 17 with the addition of random Gaussian noise. The nature of this noise is substantially symmetric about an actual intensity value and causes the output of the analogue to digital converter to deviate from the true value of input signal 80 (FIG. 17).

If an error diffusion process such as the Floyd-Steinberg process is now used on the input signal 83, it is found that the output produced by the process is substantially unaffected by the effects of symmetrical forms of noise (provided they are not too large) as the effect of the error diffusion process is to spread the error associated with the display of a current pixel to adjacent pixels.

This has been found to have the affect of cancelling out low levels of symmetrical noise as the process acts somewhat like a low pass filter on an input signal. Hence the noise is not a significant problem.

Figure 19:
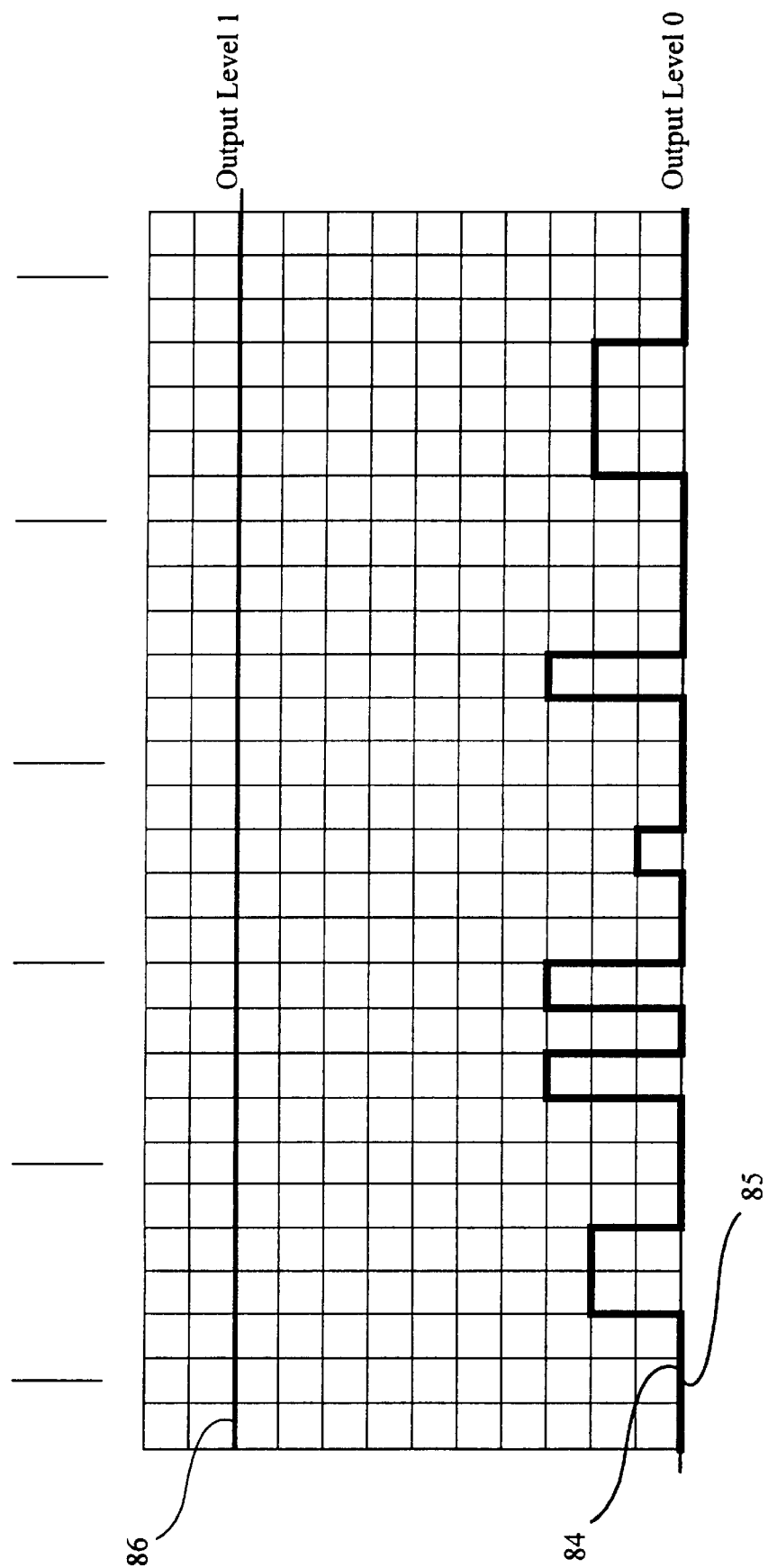
FIG. 19 is a graphical view of an input pixel intensity level of zero with noise which has been rectified.

Referring now to FIG. 19, there is shown the effect of noise near the extremity of the outputs of the analogue to digital converter. Noise at this (lower) extremity (and at the other (higher) extremity of the analogue to digital converter) can lead to problems occurring. The lowest value that the analogue to digital converter can output is set to be at a zero level, corresponding to the lowest analogue value expected from the computer device 1. Hence those values of the input signal that are below zero are rectified to zero by the analogue to digital converter and the output from the analogue to digital converter is in the form of rectified signal 85 with values less than output level signal 0 (84) being removed.

As mentioned previously, in error diffusing the rectified signal 85, the normal process of error diffusion takes the rectified signal 85 and determines which level is the closest level to the rectified signal 85 level (in this case output level signal 0 (84)) and takes the difference between these two levels and distributes it to adjacent pixels according to the particular error diffusion schema, with Floyd-Steinberg coefficients being the preferred schema. However, as the input is now in a rectified form and all the resultant differences are also in a positive form, it has been found that by diffusing these positive errors to adjacent pixels, the value of adjacent pixels (which includes that pixels actual value as well as the summation of error values from its adjacent pixels) can be built up to such a point that the output level 1 (86) becomes the closest pixel and consequently output level 1 (86) will be displayed on the output display device 5.

This has been found to give a unsightly distraction on the output display. Particularly in large areas of constant intensity of one colour as, when displaying the consequential error diffused representation of this area it is found that the area is 'sprinkled' with pixels of a different colour. This has been found to be particularly distracting and noticeable to an observer of the display. The problem does not appear to be as prominent in displaying areas of constant illuminated colour where the output level is other than at the extremity as the noise in the input signal will not be rectified by the analogue to digital converters and the error differences will be more likely to be smoothed out by adjacent pixels.

The preferred embodiment includes a noise quench method designed to remove rectified noise in colours in which one component is saturated or near the extremity of an analogue to digital conversion device. Although the method will be described in relation to a single primary colour, by using the method described on each primary colour, the method can be applied to a display having multiple primary colours.

In the preferred embodiment, an attempt is made to determine if an input signal at the extremity of the analogue to digital converter is in essence only noise and hence the noise can be removed from the input signal before the input signal is used for halftoning.

For each pixel value that is less than a predetermined distance from zero, the three horizontally adjacent pixels on each side are examined. If two or more of these pixels are exactly zero, then the original pixel is assumed to really also represent a zero value and its value is set to zero. Similarly if a pixel's value is near 255 (the saturation level), and two adjacent pixels of the three horizontally adjacent pixels on each side are exactly 255, then the pixel is set to 255. The predetermined distance value for deciding to force the pixel to a saturated value can be varied for each primary colour used in the display.

For an input line having M pixels on each line and primary colour input values being red, green and blue, the preferred method can be stated as:

For i=0 to M-1:

If $R(i)<R_{LT}$, and two or more of {R(i-3),R(i-2), R(i-1), R(i+1),R(i+2),R(i+3)} are equal to 0, then $R_{out}(i)=0$;

If $R(i)>R_{UT}$, and two or more of {R(i-3),R(i-2), R(i-1), R(i+1),R(i+2),R(i+3)} are equal to 255, then $R_{out}(i)=255$;

Otherwise, $R_{out}(i)=R(i)$.

If $G(i)<G_{LT}$, and two or more of {G(i-3),G(i-2),G(i-1), G(i+1), G(i+2), G(i+3)} are equal to 0, then $G_{out}(i)=0$;

If $G(i)>G_{UT}$, and two or more of {G(i-3),G(i-2),G(i-1), G(i+1), G(i+2), G(i+3)} are equal to 255, then $G_{out}(i)=255$;

Otherwise, $G_{out}(i)=G(i)$.

If $B(i)<B_{LT}$, and two or more of {B(i-3),B(i-2), B(i-1), B(i+1),B(i+2),B(i+3)} are equal to 0, then $B_{out}(i)=0$;

If $B(i)>B_{UT}$, and two or more of {B(i-3),B(i-2), B(i-1), B(i+1),B(i+2),B(i+3)} are equal to 255, then $B_{out}(i)=255$;

Otherwise, $B_{out}(i)=B(i)$.

Where R(i), G(i), B(i) represent the red, green and blue values respectively for the pixel at position i of a line.

$R_{LT}$ and $R_{UT}$ are the predetermined upper and lower thresholds of the red value of a pixel.

$R_{out}(i)$, $G_{out}(i)$, $B_{out}(i)$ represent the values to be output to a halftoning arrangement for the red green and blue portions of a pixel i respectively.

Pixels at the start and end of a line are treated as special cases and their values are not changed.

Figure 20:
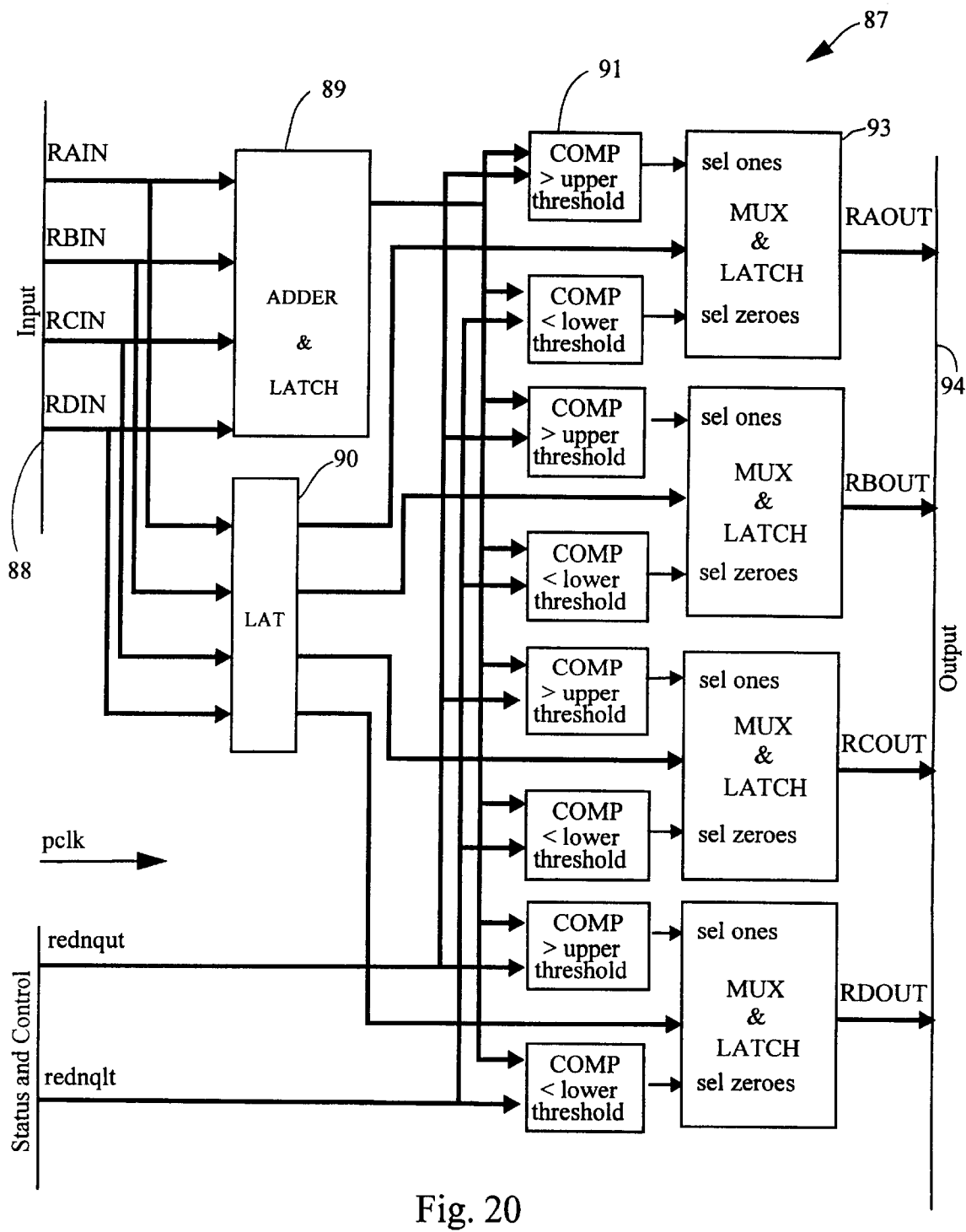
FIG. 20 is a schematic block diagram of the noise quenching unit shown in FIG. 4.
Figure 21:
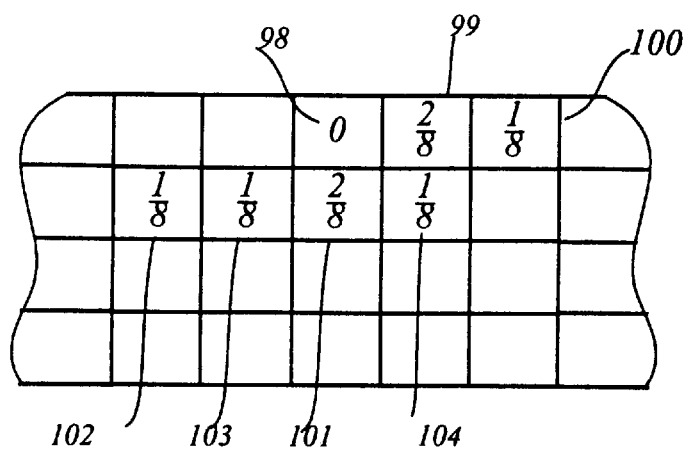
FIG. 21 is a diagrammatic representation of the Floyd and Steinberg error diffusion process.
Figure 22:
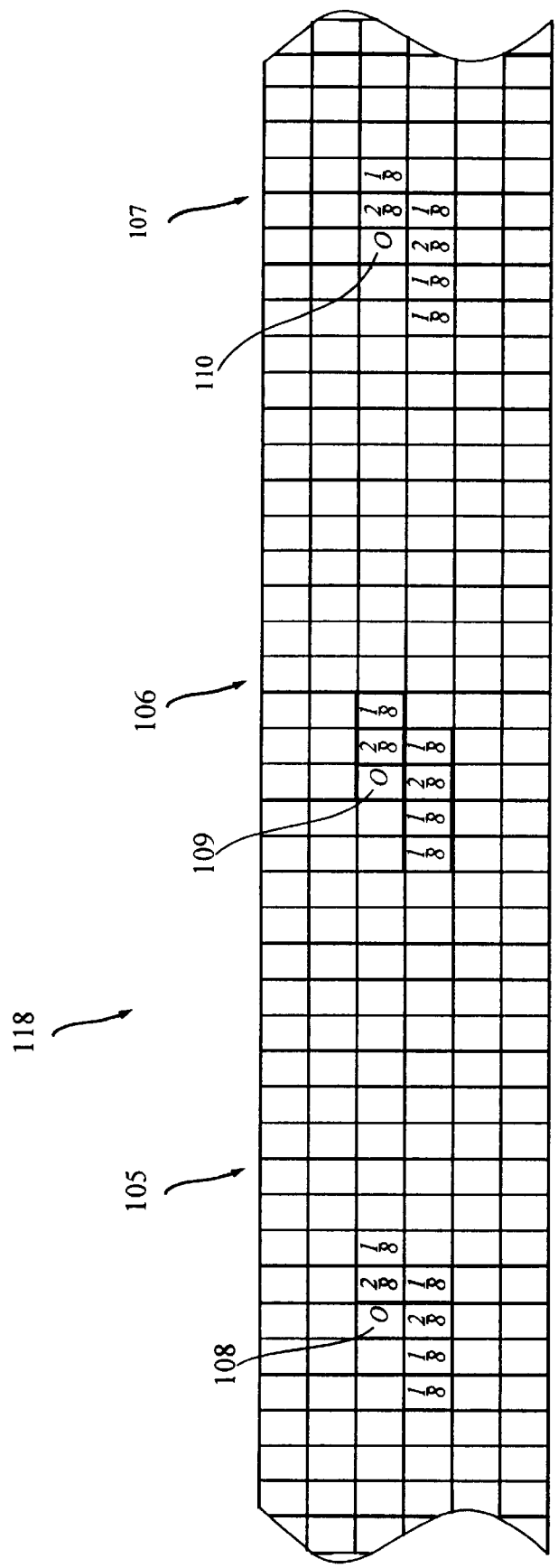
FIG. 22 is a representation of an initial state of error diffusion in the preferred embodiment.
Figure 23:
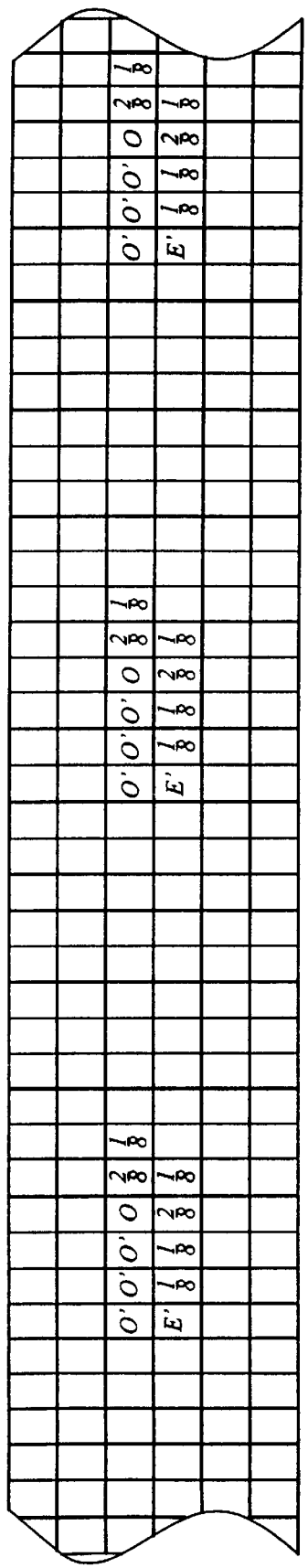
FIG. 23 is a representation of an operating state of error diffusion in the preferred embodiment.
Figure 24:
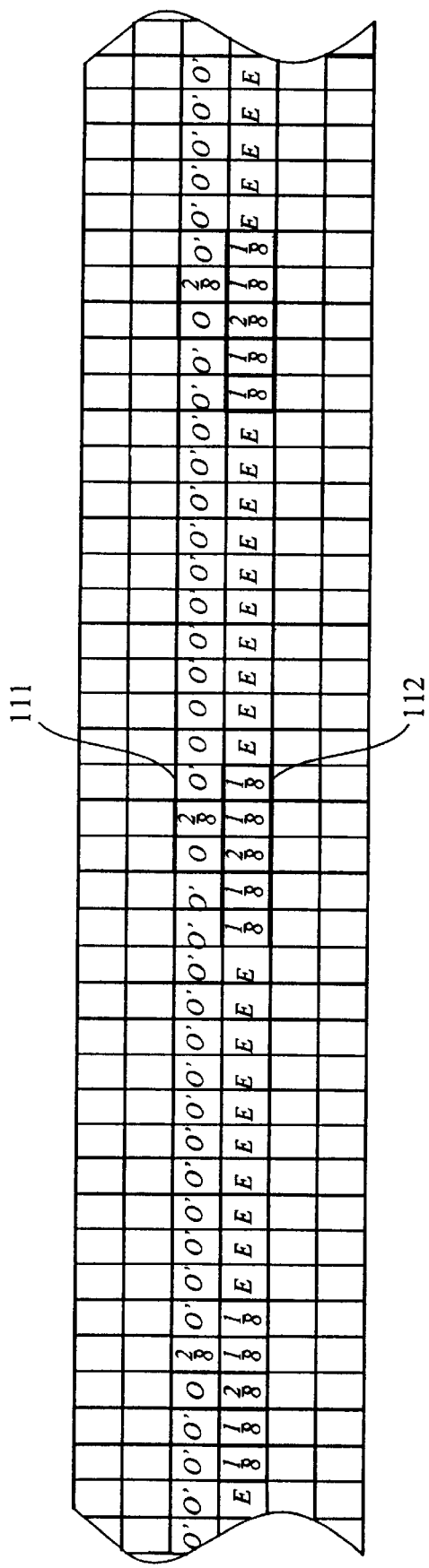
FIG. 24 is a representation of a state of error diffusion when each error diffusion process has reached the penultimate pixel in its area.

Referring now to FIG. 20, there is shown a noise quenching apparatus 87. For the sake of clarity, only the Red data channel is shown, with the green and blue channels being equivalent.

In the apparatus 87, data is input 88 at a rate of four pixels at a time. If the sum of the four pixels is greater than an upper threshold, then all four pixel samples are set to 255. Similarly, if the sum of four pixels is less than a lower threshold, then all four samples are set to 0. Otherwise, the pixels are passed to the output unaltered. An adder and latch 89 adds together the input values while a latch 90 stores the input values. Once added together each pixel is compared against an upper threshold 91 and a lower threshold 92 to determine 93 whether each output pixel value 94 should be the highest possible value, the lowest possible value or the input value.

A colour mapping output multiplexer 68, multiplexes the pixels so that the output format of the pixels is the same as that of the input to colour mapping demultiplexer 28. The pixel and control information is subsequently forwarded on colour mapping to halftoning pixel bus 26 and to colour mapping to halftoning control bus 27 to the halftoning unit 25.

Figure 16:
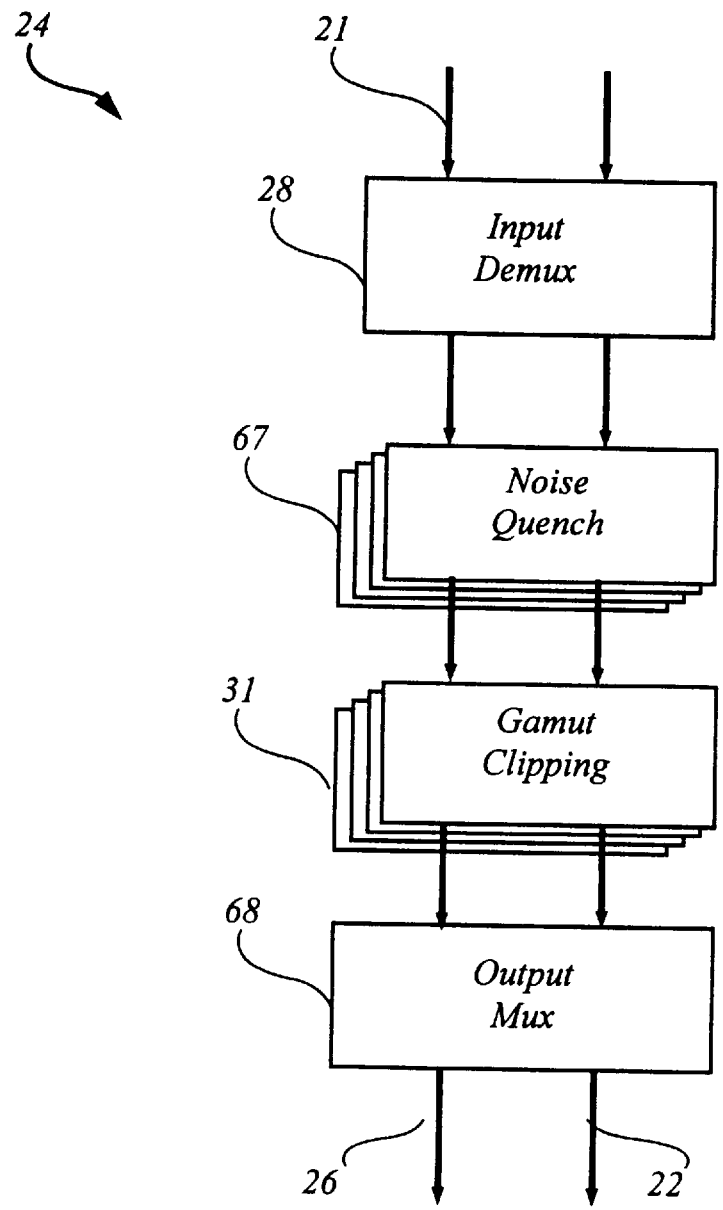
FIG. 16 is a schematic view of a second embodiment of the colour mapping unit of FIG. 3.

Referring now to FIG. 16, there is shown a second embodiment of the colour mapping unit 24 containing only the colour mapping demultiplexer 28, gamut clipping unit 31, noise quenching unit 67 and colour mapping output multiplexer 68 in addition to the gamut clipping unit 31 and noise quenching unit 67 being swapped in relative order. The second embodiment has the advantage of a substantial reduction in complexity in comparison to the first embodiment with the disadvantage of a loss in versatility in being unable to preform gamma correction, contrast enhancement or colour masking.

Referring again to FIG. 3, the halftoning unit 25 transforms continuous tone RGB data input on colour mapping to halftoning control bus 27, to 4-bit per pixel RGBW pixel data, suitable for display on the FLCD display 5. Output pixel data is forwarded to the frame store controller 7 for storage in the frame store 6.

Figure 26:
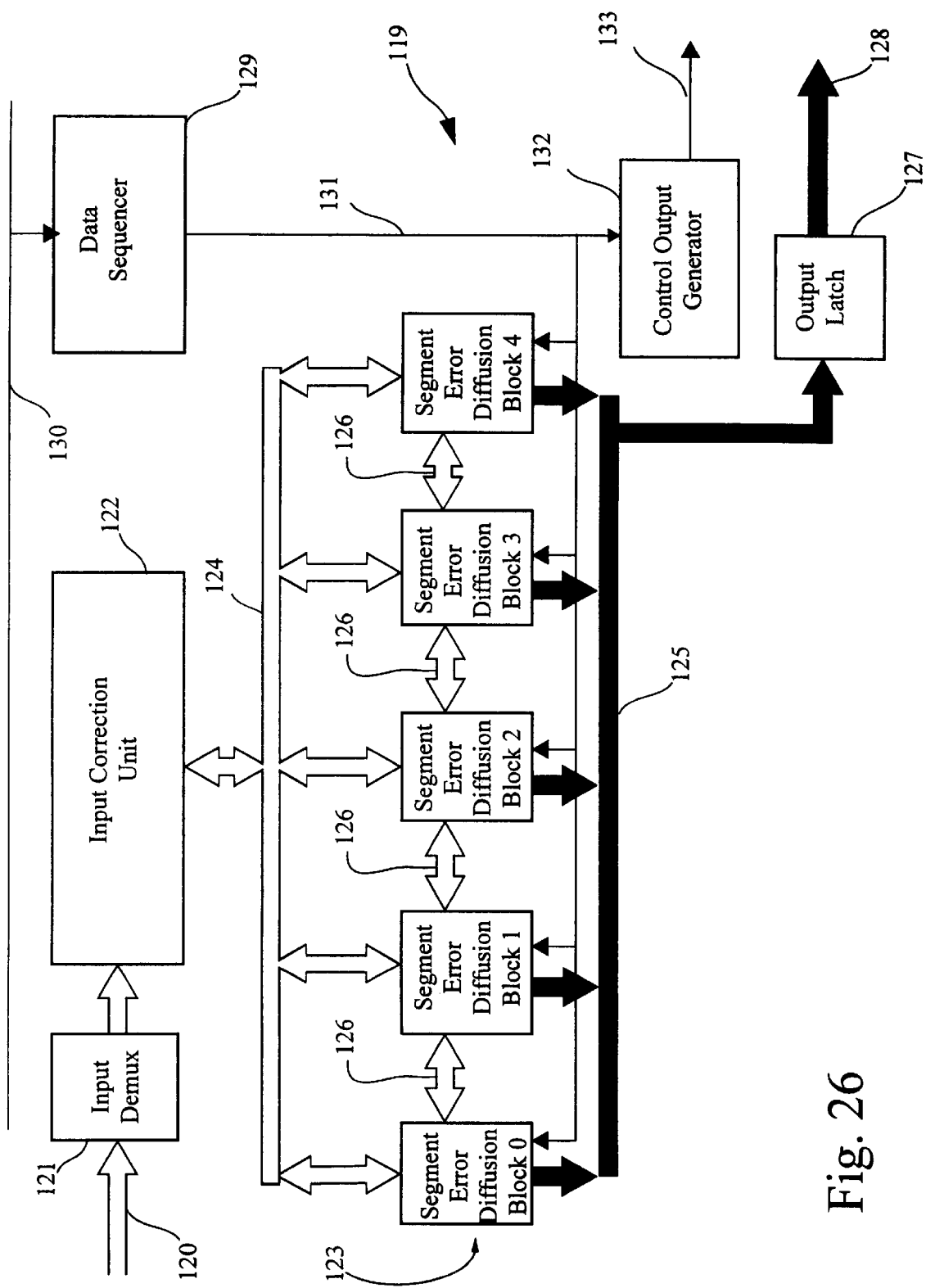
FIG. 26 is a schematic diagram view of an error diffusion apparatus used in the preferred embodiment.

Referring now to FIG. 26, there is shown a block parallel error diffusion apparatus 119 implementing the above outlined methodology. Input pixels 120 are provided two at a time at a rate of 70 MHz, with each pixel being 24 bits in length, with 8 bits of colour information for each of the red, green and blue colour portions of the pixel. The input pixels 120 are demultiplexed in an input demultiplexer 121 so that the rest of the block parallel error diffusion apparatus 119 can operate on groups of 4 pixel blocks at 35 MHz, being half the input frequency.

The output data bus 128 of the block parallel error diffusion apparatus 119 is in the form of 4 groups of 4-bit pixel data. The output pixels are intended for display on a device capable of displaying bi-level Red, Green, Blue and White (RGBW) pixels. Hence one bit of each 4-bit pixel data is used to display one of the RGBW colours.

The input pixels 120 are forwarded in parallel to an input correction unit 122, whereby the errors which have been diffused from a previous input line of pixels are added to the current input line of pixels as the corresponding input pixels are coming into the input correction unit 122. The errors to be diffused come from an array of five Segment Error Diffusion Blocks (SEDBs) 123 numbered 0 to 4. Upon correction of the input data, the results of input correction for each pixel is written to the required SEDB.

The three dimensional full colour error diffusion method carried out in the SEDB 123 is set out in 'Color Image Quantization for Frame Buffer Display' by Paul Heckbert, published in Computer Graphics, Volume 16, Number 3, July 1982, pages 297–304.

By applying a 3-D error diffusion technique disclosed in Hechbert's paper, above cited, to five separate segments of an image, in parallel, it is possible to provide a reduced speed image processing for a display device.

Figure 27:
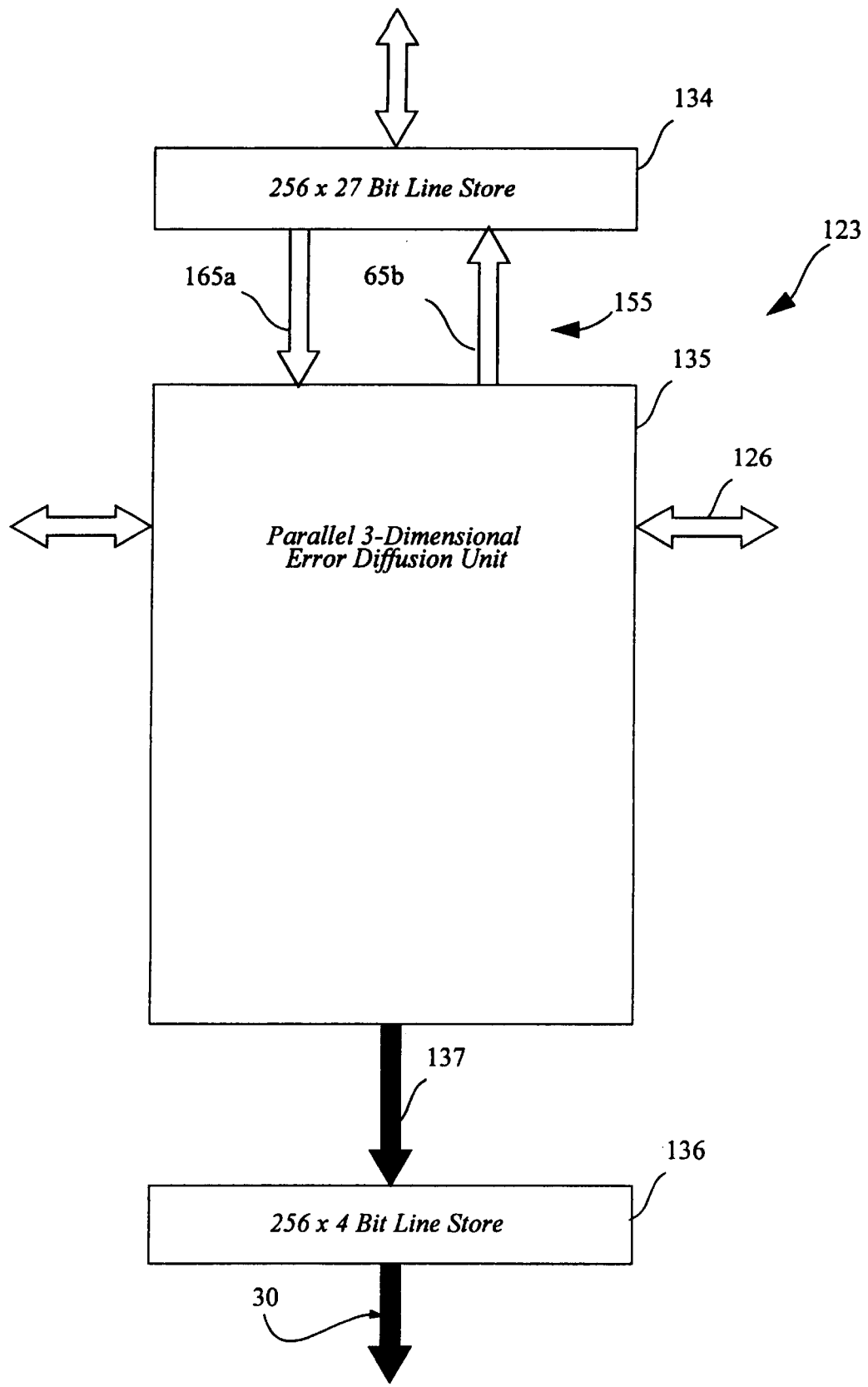
FIG. 27 is a schematic diagram representation of the segment error diffusion block of FIG. 26.

Referring now to FIG. 27, there is shown a single SEDB 123, in more detail. Each SEDB 123 is made up of a 256×27 bit RGB line store 134, a parallel 3-dimensional error diffusion unit (P3DEDU) 135, and a 256×4 bit RGBW line store 136. The 27 bits per entry in 256×27 bit RGB line store 134 represents a 9-bit value for each of R, G, and B, which is required to correctly represent positive and negative values for the errors and input corrected data.

Each SEDB 123 operates on a line segment consisting of one fifth of the input line and each has enough memory to store up to 256 pixels of intermediate data. Each SEDB 123 takes one-fifth of the input line period to acquire input corrected data from the input correction unit 122, then spends the remaining four-fifths of the input line period completing the error diffusion process on this data. The SEDBs operate in a staggered fashion on a line as input data for each segment becomes available. The error diffusion process produces a corresponding RGBW output, in the form of RGBW values for each pixel, which are forwarded out of each SEDB on a RGBW output 125 at the same time as the SEDB 123 is also acquiring input corrected data for the next line. Hence, there is exactly one line period of delay between input and output data for the SEDB 123.

Referring now to FIG. 26 and FIG. 27, the SEDB 123 operates in two stages. In the first stage the P3DEDU 135 is idle. The 256×27 bit RGB line store 134 provides four samples per cycle to the input correction unit 122 (FIG. 26), and receives four corrected samples back from each cycle. At the same time, the 256×4 bit RGBW line store 136 is accessed at four samples per cycle, driving results to an output latch 127 seen in FIG. 26. This stage lasts for approximately one-fifth of the input line period, corresponding to the time in which data for the particular segment is coming into the block parallel error diffusion apparatus 119.

In the second stage, the SEDB 123 applies the error diffusion algorithm to each sample in the 256×27 bit RGB line store 134 in turn, writing the resulting errors for the next line back into the 256×27 bit RGB line store 134 and the RGBW output into the 256×4 bit RGBW line store 136. This stage lasts for the remaining four-fifths of the input line period.

As well as acquiring data from the input correction unit 122, each SEDB 123 also exchanges data with adjacent SEDB via a SEDB to SEDB bus 126, to allow correct diffusion over segment boundaries thereby allowing boundary pixel elements to be correctly updated.

The output data from the SEDB 123 is output in raster order. This output data is latched in the latch 127, and synchronised before being forwarded on the bus 128 for display or storage. The output data is driven out of the block parallel error diffusion apparatus 119 as four parallel samples at one half of the input clock rate.

A data sequencer 129 receives vertical and horizontal information signals 130 as well as pixel clock information, and generates control signals 131 to the SEDB 123 and a control output generator 132. The control output generator 132 generates any frame, line and pixel validity signals that may be required by subsequent devices.

The choice of particular coefficients and pixels to which an error diffusion process assigns the error associated with the current pixel, can vary substantially and this is known in the art.

In order to understand the real time operation of the block parallel error diffusion apparatus 119, a detailed example of operation will now be presented with reference to FIG. 28 to FIG. 31 in addition to FIG. 26 and FIG. 27.

FIG. 28 shows the state of the SEDBs at the beginning of line (m) of the input. The 256×27 bit RGB line stores contain data for the previous line (m−1). For the first segment in the line, the 256×27 bit RGB line store 134 contains errors diffused from line (m−1) to line (m); this segment has been completely error diffused. The 256×4 bit RGBW line store 136 for the first segment contains RGBW data for line (m−1), waiting to be output. All of the other line segments are only partly diffused. For each of these segments, 256×27 bit RGB line stores contains error data for pixels which have been diffused, and corrected input data from line (m−1) for the remaining pixels, waiting to be diffused. For each segment there is RGBW data in the 256×4 bit RGBW line stores for each of the diffused pixels. It can be seen from FIG. 28 that, at the beginning of input line (m), SEDB1 has completed error diffusion on three quarters of the second line segment, SEDB2 has completed error diffusion of one half of the third line segment, SEDB3 has completed error diffusion on one quarter of the fourth line segment, and SEDB4 is just about to commence error diffusion on the fifth and final line segment.

FIG. 29, shows the situation after one fifth of line (m) has been input to the block parallel error diffusion apparatus 119. During the time while this first line segment is being input, the P3DEDU 135 for SEDB0 is idle. The input correction unit 122 reads errors from 256×27 bit RGB line store 134 for the first segment, and writes corrected line m data back to the same memory. At the same time, the output latch 127 reads data from the 256×4 bit RGBW line store 136 for the first segment, driving it out of the block parallel error diffusion apparatus 119. Both the input correction unit 122 and the output latch 127 access the line stores at the full data rate, i.e. up to 140M Samples per second. While the first line segment is being input, the four P3DEDU 135 units for the second, third, fourth and fifth segments each complete error diffusion on one quarter of their respective segments, working on stored data. By the time the input line is one fifth complete, SEDB0 contains a complete segment of corrected input data for line m ready for error diffusion, SEDB1 has completed its diffusion of line (m−1) so that the input correction unit 122 and output latch 127 can start working on it, and SEDB2, SEDB3 and SEDB4 have all moved one-quarter of a segment further ahead.

FIG. 30 shows the state of the SEDBs, further into input line (m). The input correction unit 122 is writing line (m) input data into the fourth segment. The output latch 127 is reading line (m−1) diffusion results from the same segment. The P3PEDU unit of SEDB3 is idle. The P3PEDU units for the first three segments are all working on corrected input data for line (m), which has been written previously by the input correction unit 122. RGBW data for line m is building up in the 256×4 bit RGBW line store 136 of the first three segments. The P3PEDU of SEDB4 is completing error diffusion on line (m−1) for the last segment.

FIG. 31, shows the state at the completion of line (m), which is similar to that at the start of line (m), except that all data is one line further advanced. The SEDBs are now ready for the input of line (m+1)

Two important points should be noted from the above description. Firstly, each P3PEDU unit of each SEDB is idle for one fifth of the input line period, to allow the input correction unit 122 and the output latch 127 exclusive access to the line stores for that segment. Each P3PEDU unit must therefore complete the error diffusion for its segment in the remaining four-fifths of the line period. This implies that the P3PEDU units run at one-fourth of the input data rate, in order to error diffuse one-fifth of the line in four-fifths of a line period.

The second point to note is that both the input correction unit 122 and the output latch 127 access the line stores at the full data rate, up to 140 MSamples per second. As the internal clock rate of the block parallel error diffusion apparatus 119 is one-quarter of the input data rate, input correction unit 122 and the output latch 127 access the line stores four samples at a time. This represents 108 bits of data read and written to the 256×27 bit RGB line store 134 per cycle when the input correction unit 122 is accessing them.

Figure 32:
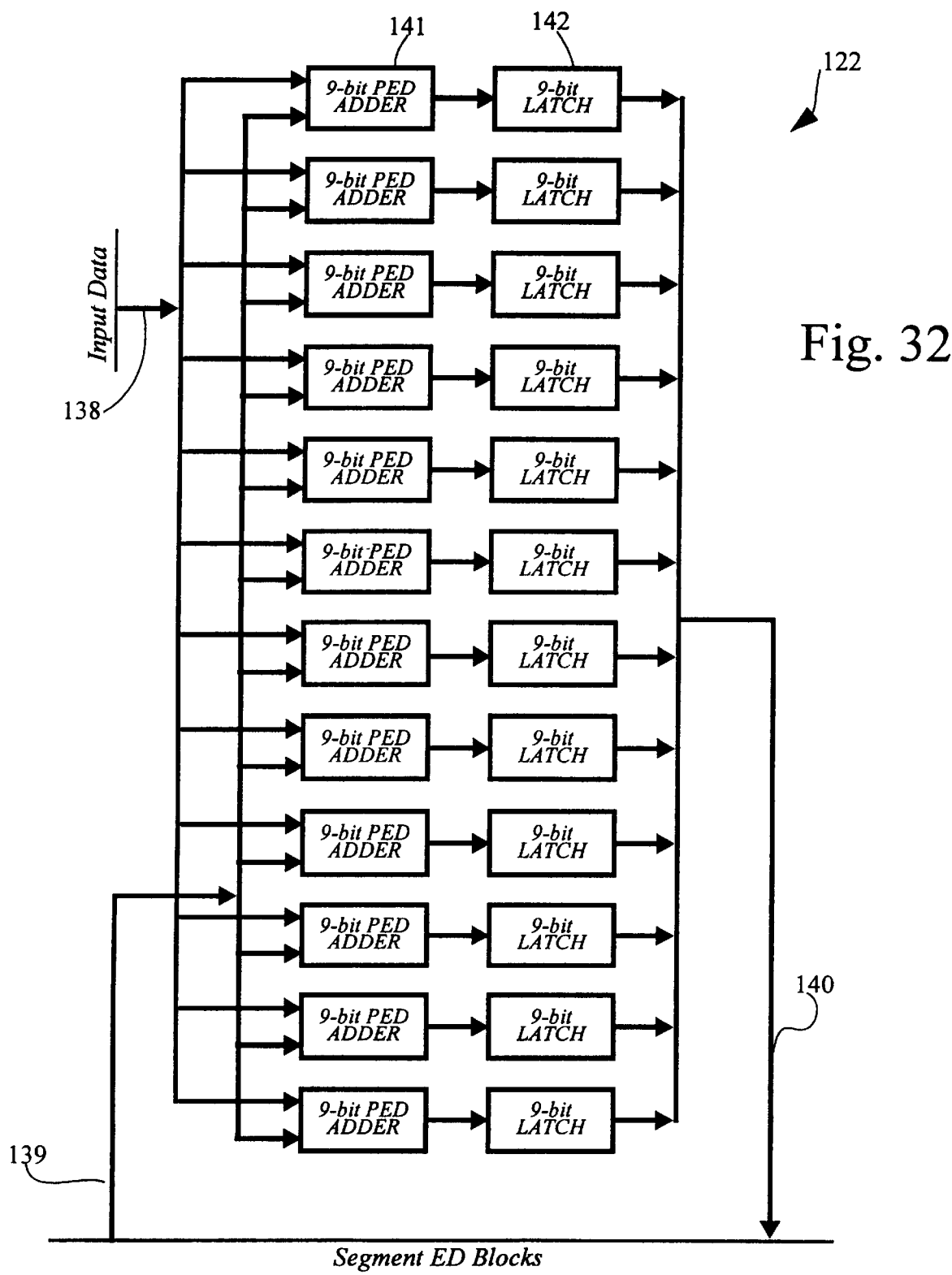
FIG. 32 is a schematic diagram view of the input correction unit of FIG. 26.

Referring now to FIG. 32, there is shown the input correction unit 122, of FIG. 26, in more detail. The input correction unit 122 performs the arithmetic required to diffuse errors between lines of an image, by adding errors from one line into incoming data for the next line. The input correction unit 122 can handle data at up to 140M Samples/ second. The input correction unit 122 handles the input data 138 for a line, four input samples at a time. SEDB error data 139 from the SEDBs, and incoming data are sent to the input correction unit 122. It sends its results, input corrected data 140, back to the SEDBs.

The input correction unit 122 is made up of 12 identical 9-bit parallel error diffusion (PED) adders 141, and 12 nine-bit latches 142 for the results of the additions. Each PED adder 141 takes one lot of input data 138 and one lot of SEDB error data 139 from the SEDB input interface. The latched adder results go to the SEDB output interface 140. The PED adder 141 is specifically designed to use a 9-bit PED number system. It is implemented using a standard 9-bit two's complement adder, with the overflow conditions modified for the special number system. When the adder overflows, the result is forced to the appropriate positive or negative limit. In the PED number system, an input is negative if the top two bits are set to 1; otherwise it is positive. The algorithm for the PED adder 141 is as follows:

```
a,b,c: nine bit PED values
c_out: single bit carry out
c = a + b; {also returns carryout on c_out}
if(a(8)=0 OR a(7)=0) AND (b(8)=0 OR b(7)=0) {both inputs positive}
    if(c_out=1) OR (c(8)=1 AND c(7)=1) {carry out or result negative}
        c=101111111;                    {maximum positive value}
if(a(8)=1 AND a(7)=1) AND (b(8)=1 OR b(7)=1){both inputs negative}
    if(c(8)=0 OR c(7)=0)                {result positive}
        c = 110000000;                  {maximum negative value}
```

Referring again to FIG. 26 and FIG. 27, the 256×27 bit RGB line store 134 is shown to interface with the data sequencer 129, input correction unit 122 and also the P3DEDU 135 in the same SEDB 123.

Figure 33:
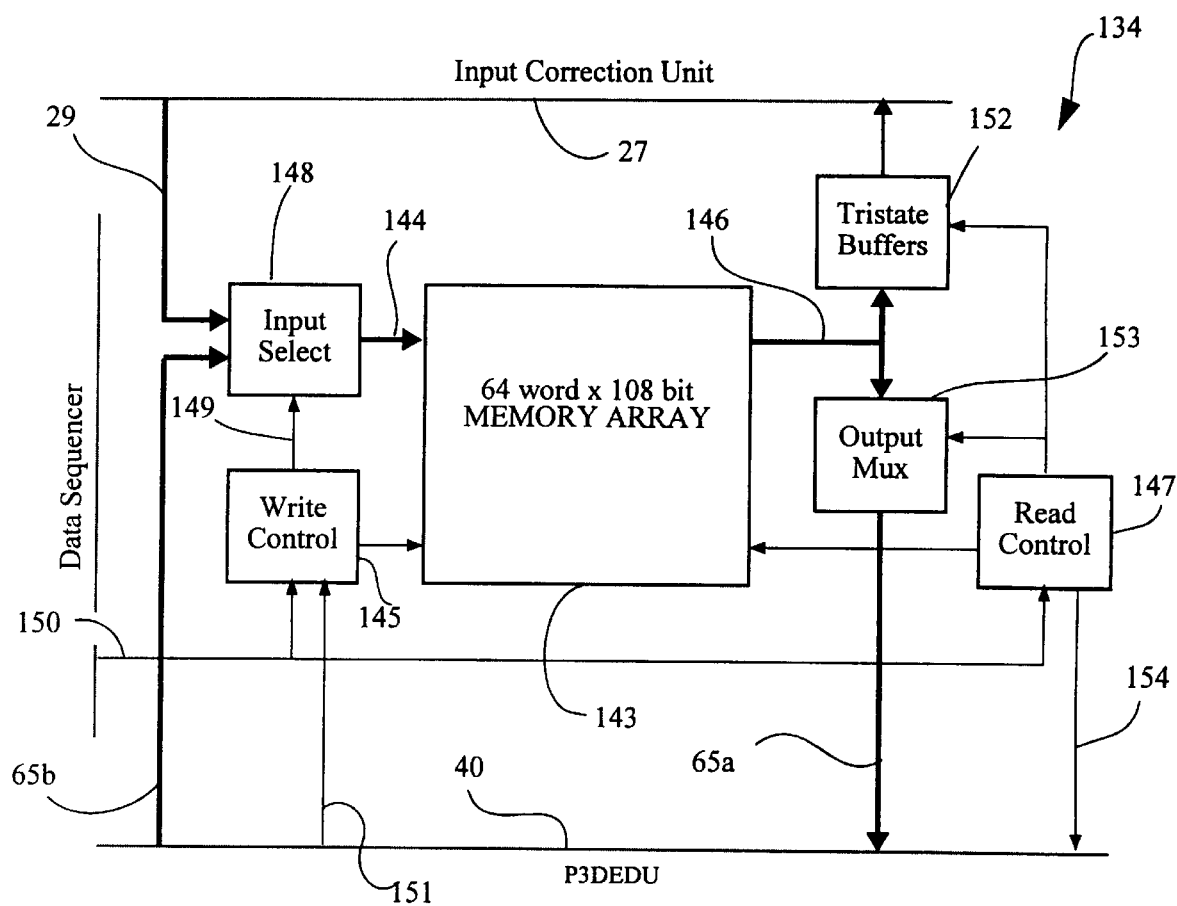
FIG. 33 is a schematic diagram representation of the 256×27-bit line store of FIG. 27.

Referring now to FIG. 33, there is shown the structure of the 256×27 bit RGB line store 134 in more detail. The 256×27 bit RGB line store 134 is part of the SEDB 123. It contains various address generation logic, so that it can be accessed as a FIFO in one of two modes: 108 bits read/write per cycle, or 27 bits read/write per cycle. In 108-bit mode, 256×27 bit RGB line store 134 reads and writes to the input correction unit 122. In 27-bit mode, the 256×27 bit RGB line store 134 reads and writes to the P3DEDU 135 in the same SEDB. Access in either mode is initiated by control signals from the data sequencer 129 (FIG. 26).

The 256×27 bit RGB line store 134 consists of a 64 word by 108 bit memory array 143 with separate read and write ports. The memory write port 144 can take data from either the input correction unit 122 or the relevant P3DEDU 135, and is controlled by a write control module 145. The data from the read data port 146 of the memory array 48 can be driven to either interface, under the control of a read control module 147.

An input select unit 148 is controlled by a signal 149 that chooses the source of the data. If the data is coming from the input correction unit 122 interface, it is passed straight through. If the data is coming from the P3DEDU interface, three consecutive samples are latched, and combined with the following sample to give 108 bits of write data, to be written once every fourth cycle.

The write control module 145 takes an EN_IC signal 150 from the data sequencer 129 (FIG. 26) and an P3DEDU_VALID signal 151 from the P3DEDU interface. When EN_IC is asserted, input correction unit 122 data is selected for writing, and one location in the memory array is written in each cycle. When P3PEDU_VALID is asserted, P3DEDU data is selected for writing, and one location is written every fourth cycle. When neither is asserted, no writing takes place, and the write address is reset.

The 256×27 bit RGB line store 134 is provided with tristate buffers 152 which drive data from the memory array 143 outputs to the input correction unit 122. The tristate buffers 152 are enabled by the read control module 147 when the EN_IC signal 150 is asserted.

An output multiplexer 153 selects 27 bits from the memory array outputs to be driven to the P3DEDU interface. The four 27-bit groups that make up the array output are selected in rotation.

The read control module 147 takes an EN_IC and an EN_P3PEDU signal 150 from the data sequencer 129. When EN_IC is asserted, the tristate buffers are enabled, and the memory array 143 is read once each cycle. When EN_P3PEDU is asserted, the read control module 147 reads one location every fourth cycle, cycles the output multiplexer 96 and drives an IC_VALID signal 154 to the P3DEDU interface. When neither signal is asserted, no reads take place, and the read address is reset.

Referring now to FIG. 26 and FIG. 27, data to and from the P3DEDU 78 is in the form of three 9-bit values in each direction of each clock cycle. Data to the P3DEDU 135 represents input-corrected components for each RGB pixel in the segment. Data from the P3DEDU 135 to the 256×27 bit RGB line store 134 represents error values to be diffused to the next line for each pixel.

Figure 34:
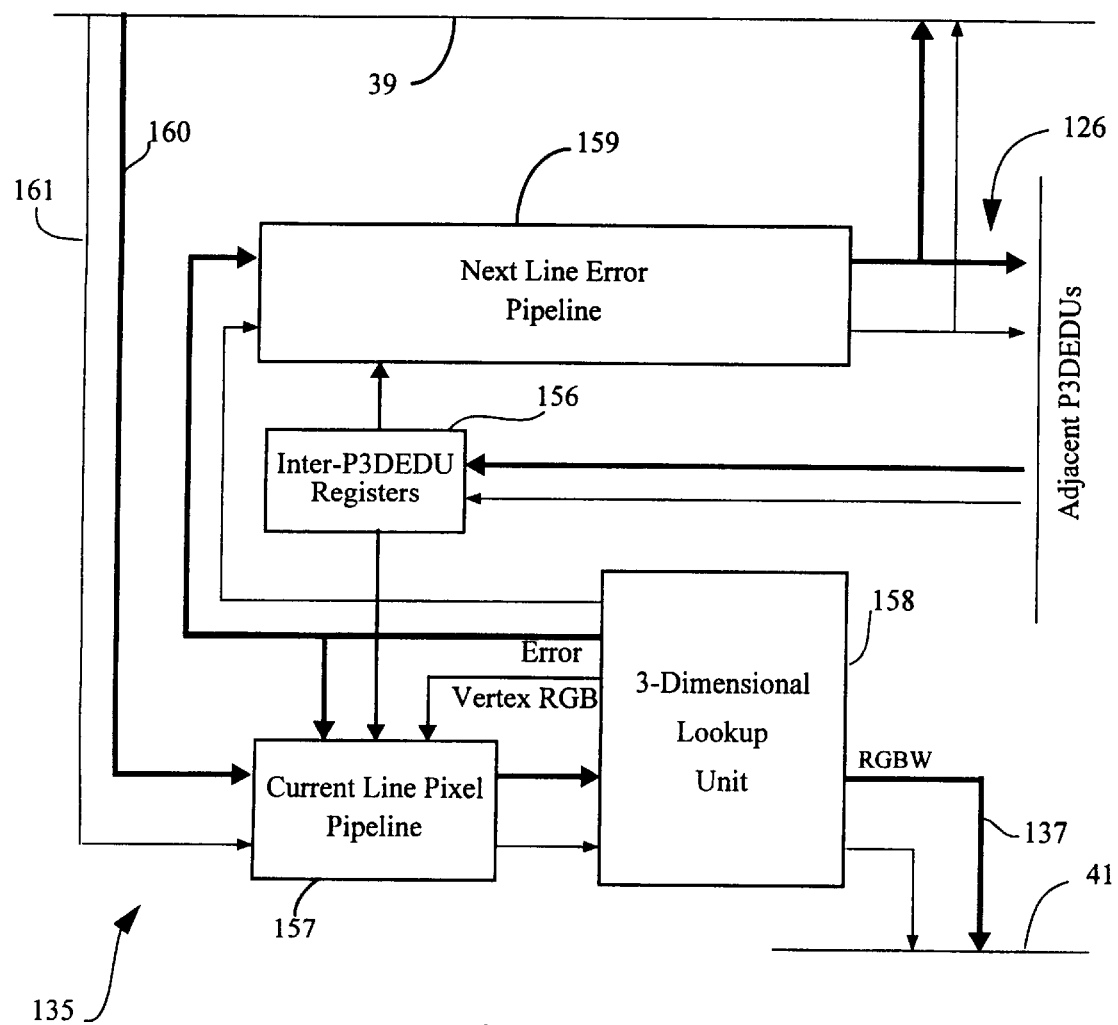
FIG. 34 is a schematic diagram representation of the parallel 3-dimensional error diffusion unit of FIG. 27.

Referring now to FIG. 34, there is shown the P3DEDU 135 in more detail. The P3DEDU 135 is made up of four main sections comprising Inter-P3DEDU Registers 156, a Current Line Pixel Pipeline (CLPP) 157, a 3-Dimensional Lookup Unit (3DLU) 158 and a Next Line Error Pipeline (NLEP) 159.

The input corrected data 160a comes from the 256×27 bit RGB line store 134, into the CLPP 157. The CLPP 157 generates the corrected values for pixels on the current line based on the incoming data, previous error results, and in some cases the contents of the Inter-P3DEDU Registers 156.

As each current line pixel value is calculated, it is passed to the 3-Dimensional Lookup Unit (3DLU) 63. The unit 63 looks up the RGBW vertex closest to the pixel value, finds the co-ordinates of this vertex in RGB space, and works out the error, which is the difference between the pixel value and the vertex RGB co-ordinates in accordance with the Heckbert process. This error value is latched and delayed by one cycle in the 3DLU 158. The RGBW output 137 of the vertex is output to the 256×4 bit RGBW line store 136, while the RGB value of the vertex, and the latched error, are fed back to the CLPP 157, to be used in the calculation of the next pixel value on the current line.

The Next Line Error Pipeline (NLEP) 159 receives the latched error from the 3DLU 158. The pipeline 64 calculates the error value to be passed to the next line in each pixel position, by doing a weighted sum of successive pixel errors; in some cases, values from the Inter-P3DEDU Registers 156 are used in this calculation. The results of the sum are driven to the 256×27 bit RGB line store 134 via line 65b, and also to the adjacent P3DEDU via line 31.

Control signals, (e.g. 161) pass through each unit with the data, so that at each interface, data is accompanied by a VALID signal, asserted whenever the data at that interface is valid. These control signals are used to generate local control signals within each module, and to generate output control signals at all interfaces.

Referring to FIG. 35, the Inter-P3DEDU Registers 156 are shown in more detail. For the sake of clarity, only the red channel data path is shown, with the blue and green data paths being identical. The Inter-P3DEDU Registers 156 form part of the P3DEDU 135. There are four Inter-P3DEDU Registers 156 for each colour, whose outputs (for the red channel) are designated R_IPP1, R_IPP0, R_IPN1, and R_IPN0. R_IPP0 and R_IPP1 represent Inter-P3DEDU errors from the previous segment, and are loaded in order from R_PREV when a PREV_VALID_IN signal is asserted. R_IPN0 and R_IPN1 represent Inter-P3DEDU errors from the next segment, and are loaded in order from R_NEXT when NEXT_VALID_IN is asserted.

Referring to FIG. 34, the P3DEDU 135 exchanges data from the two adjacent P3DEDUs through the SEDB to SEDB bus 126. Three 9-bit signals come from each of the adjacent P3DEDUs. In addition, the P3PEDU Error signals are driven to each adjacent P3DEDU. The data from the adjacent P3DEDUs represents P3PEDU errors diffusing into the current segment from adjacent segments. For each full segment processed by the P3DEDU 135, two values are received from the previous segment, and two from the next segment. Similarly, the P3PEDU Error outputs are used to transfer two samples to the previous segment, and two samples to the next segment.

In some cases the data from the Inter-P3DEDU Registers 156 is used by the CLPP 157 to calculate the next pixel value on the current line.

Referring to FIG. 36, there is shown the Current Line Pixel Pipeline (CLPP) 157 in more detail. Again, for clarity only the Red channel datapath is shown.

The CLPP 157 consists of a CLPP control unit 167, a three input P3DEDU adder 162, a two input P3DEDU substractor 163 a multiplexer 164 to select one of the adder inputs, and two latches 165, 166. Incoming pixel data R_IC is latched 165, and passed to the P3DEDU adder 162. The other inputs to the P3DEDU adder 162 are the latched CLPP output R_CLPP, and the output of the multiplexer 107 which selects between the 3DLU 158 error output R_3DLU, and the two Inter-P3DEDU Registers 156, R_IPP0 and R_IPP1 under the control of CLPP control unit 167. The adder result goes directly to the P3DEDU substractor 163, where the 3DLU 158 vertex selection output R_VER is subtracted from it.

R_3DLU represents the error diffused into the current pixel from the pixel two positions earlier. The error from the previous pixel is (R_CLPP—R_VER). The adder and subtractor combined to diffuse these two errors into the current pixel, while making the path from R_VER into the latch 166 be as fast as possible.

The multiplexer selection, and the reset signals on the latches, are controlled by CLPP control unit 167 signals derived from an IC_VALID input. These make sure that the CLPP 157 starts up correctly at the beginning of a line segment. In particular, R_CLPP is set to zero while the first pixel in the segment is being calculated, and this in turn forces R_VER to be zero. The CLPP control unit 167 also outputs CLPP_VALID, indicating valid data on the R_CLPP output.

The full algorithm for the CLPP 157 is:

| | | |
|---|---|---|
| Pixel 0: R_SUM(0) | = | R_IC(0) + R_IPP0 + (2/8)*R_CLPP −(2/8)*R_VER |
| | = | R_IC(0) + R_IPP0 since R_CLPP=R_VER=0 |
| Pixel 1: R_SUM(1) | = | R_IC(1) + R_IPP1 + (2/8)*R_CLPP −(2/8)*R_VER |
| Pixel n (1<n<N-1):R_SUM(n) | = | R_IC(n) + (1/8)*R_3DLU + (2/8)*R_CLPP −(2/8) *R_VER |

Figure 37:
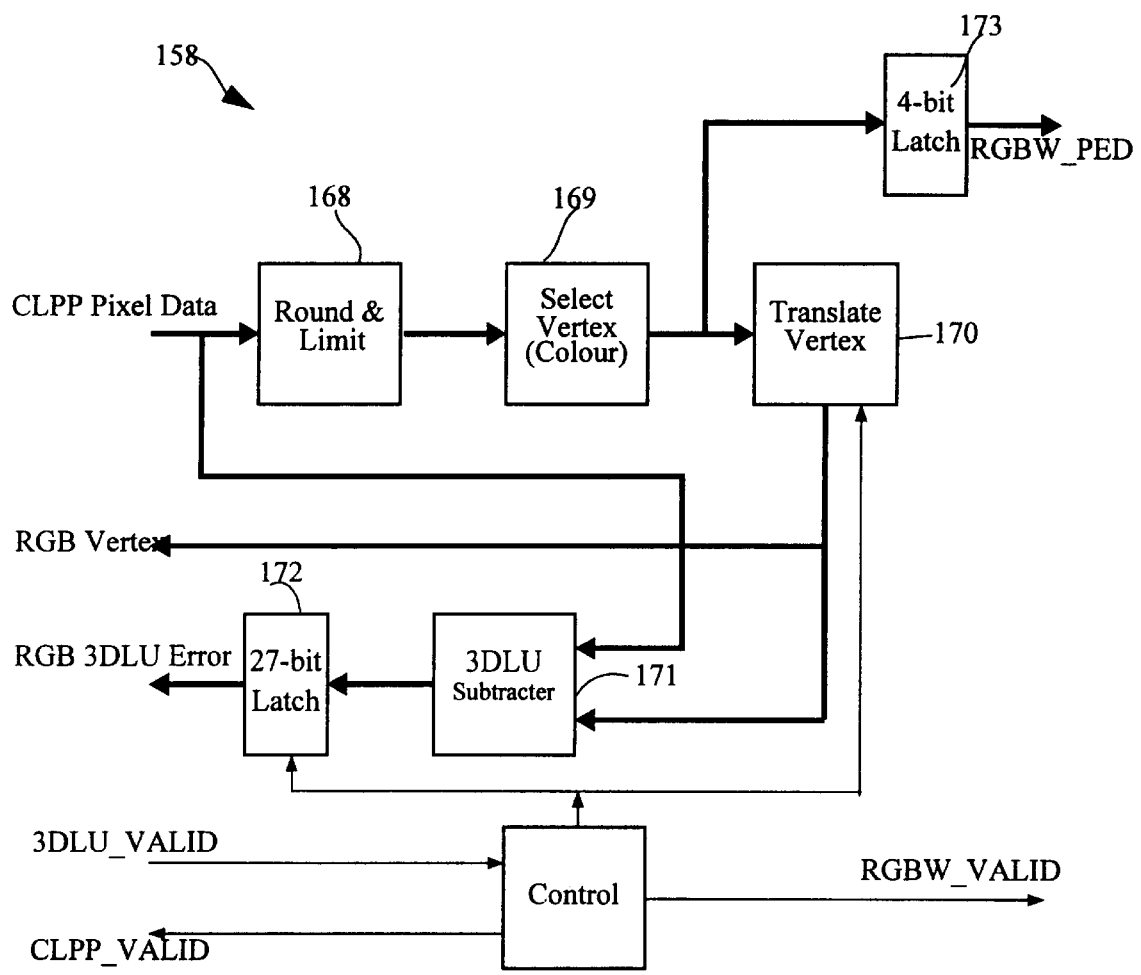
FIG. 37 is a schematic diagram of the 3-dimensional lookup unit of FIG. 34.

Referring now to FIG. 37, there is shown the 3-Dimensional Lookup Unit (3DLU) 63 in more detail. The 3DLU 158 receives each current line pixel as it is calculated by the CLPP 157. The 3DLU 158 takes the current line pixel as it is calculated and looks up the RGBW vertex closest to the pixel value. It then proceeds to find the co-ordinates of this vertex in RGB space. Next it works out the error.

The three components of the input pixel are reduced to 3 bits each, by first limiting their values to between 0 and 255, then dividing by 32 and rounding the result. The resulting 9 bits are used to address a selection ROM 169, which selects one of the 16 RGBW values displayable on the FLCD panel. This selected vertex is driven out to the 256×4 bit RGBW line store 136 via latch 173.

The selected RGBW vertex is also translated back into RGB space by vertex translation unit 170, which uses six registers WPRed, RPRed, WpGreen, GPGreen, WPBlue, and BPBlue (not shown), which specify the co-ordinates of the RGBW vertices in RGB space. The RGB vertex resulting from this translation is driven out of the 3DLU 158. It is also subtracted from the incoming pixel value to give a 3DLU Error value, which is latched 172 before being output from the 3DLU 158. The 3DLU Error value and the RGB vertex value are fed back to the CLPP 157 which then calculates the next pixel value on the current line. 3DLU_VALID is asserted to indicate valid 3DLU 158 Error data.

Figure 38:
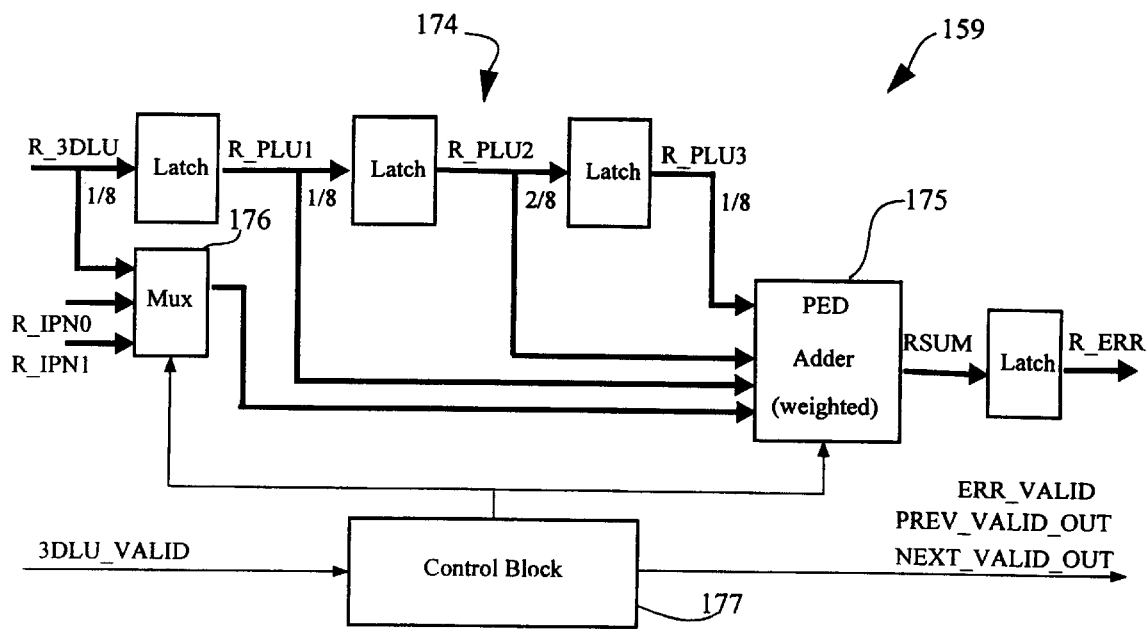
FIG. 38 is a schematic diagram of the next line error pipeline of FIG. 34.

Referring to FIG. 38, there is shown the Next Line Error Pipeline (NLEP) 159 in more detail. Again, for clarity only the Red channel datapaths are shown.

The NLEP 159 takes the calculated error for each pixel from the 3DLU 158 and generates the total error to be diffused into each pixel on the next line, as well as Inter-P3DEDU data. It consists of a pipeline 174 for error data from the 3DLU 158, a five-input adder 175, and a multiplexer 176 and control logic 177 to select the adder inputs.

The operation of the NLEP 159 is based on the input signal 3DLU_VALID, which is asserted by the 3DLU 158 when the first valid error is present on R_3DLU, and remains asserted until the last valid error for the segment. The data on R_3DLU is piped through three latches 174, so that at any time the four most recent error values from the 3DLU 158 are available. When not transferring valid error data from the 3DLU 158 (i.e. when 3DLU_VALID is not asserted), R_3DLU is always zero.

For the majority of its operation, the multiplexer 119 is selected so that adder 175 produces the following sum:

$$RSUM = (1/8)*R\_3DLU + (1/8)*R\_3DLU1 + (2/8)*R\_3DLU2 + (1/8)*R\_3DLU3$$

The first outputs produced by the NLEP 159 are the two error values to be sent to the previous segment. The first of these is produced when the first pixel error for the segment, R_3DLU(0), is on R_3DLU, and the second one clock cycle later. A PREV_VALID_OUT signal is asserted when these previous segment errors are on the output R_ERR, whose value will be:

Cycle-2  R_ERR = (1/8)*R_3DLU(0)  {other adder inputs are 0}
Cycle-1  R_ERR = (1/8)*R_3DLU(1) + (1/8)*R_3DLU(0)
         {other adder inputs are 0}

In the following cycle, a ERR_VALID signal is asserted, and the errors for the current segment on the next line begin to appear on the output.

Cycle 0         R_ERR = (1/8)*R_3DLU(2) +
                        (1/8)*R_3DLU(1) + (2/8)*R_3DLU(0)
Cycle K(1<n<,N-3) R_ERR = (1/8)*R_3DLU(n+2) +
                        (1/8)*R_3DLU(n+1) +
                        (2/8)*R_3DLU(n) + (1/8)*R_3DLU(n-1)

In cycle N−2 the next line error for the second to last pixel in the segment is produced. A DATA_VALID signal will be deasserted because the are no more pixel errors to be transferred. In this cycle, the multiplexer 176 is switched to select the Inter-P3DEDU error register R_IPN1 (FIG. 35), which represents error to be diffused into pixel N−2 of the next line from the next segment.

Cycle N-2  R_ERR = R_IPN1 +
                   (1/8)*R_3DLU(N-1) + (2/8)*R_3DLU(N-2) +
                   (1/8)*R_3DLU(N-3)

In the next cycle, the multiplexer 176 is switched to select the other Inter-P3DEDU error register R_IPN0. Zeroed errors from the 3DLU 158 are by now propagating down the pipeline.

Cycle N-1  R_ERR = R_IPNO + 0 + (2/8)*R_3DLU(N-1) +
                   (1/8) *R_3DLU(N-2)

Following cycle N−1, the ERR_VALID output is deasserted, and NEXT_VALID_OUT is asserted. At this stage the error pipeline is also temporarily stalled, with R_3DLU2 holding R_3DLU(N−1), and R_3DLU3 holding R_3DLU(N−2). The final two outputs are the errors to be diffused into the next segment, which are:

Cycle N    R_ERR = (2/8)*R_3DLU(N-1) + (1/8)*R_3DLU(N-2)
Cycle N+1  R_ERR = (2/8)*R_3DLU(N-1)

The NLEP 159 drives the accumulated errors to be propagated into each pixel position on the next line to the 256×27 bit RGB line store 134, and the errors to be propagated into adjacent segments on the next line to other P3DEDUs.

Figure 39:
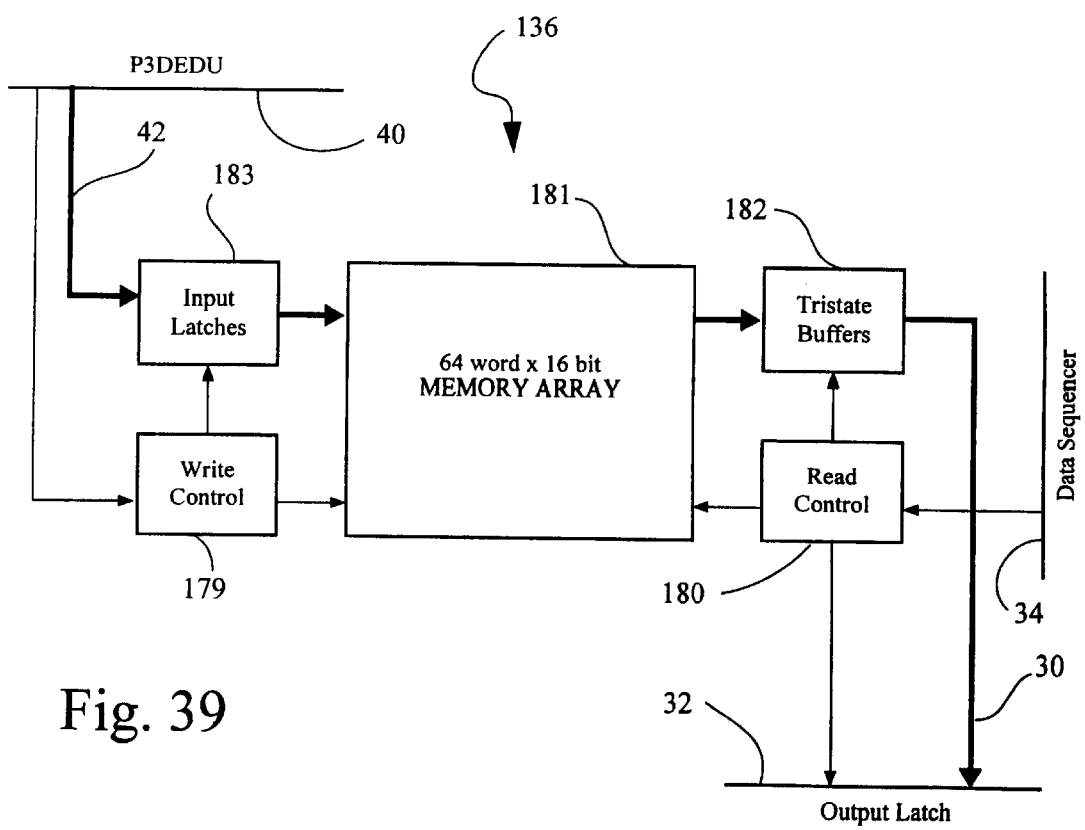
FIG. 39 is a schematic diagram of the 256×4 bit line store of FIG. 34.
Figure 40:
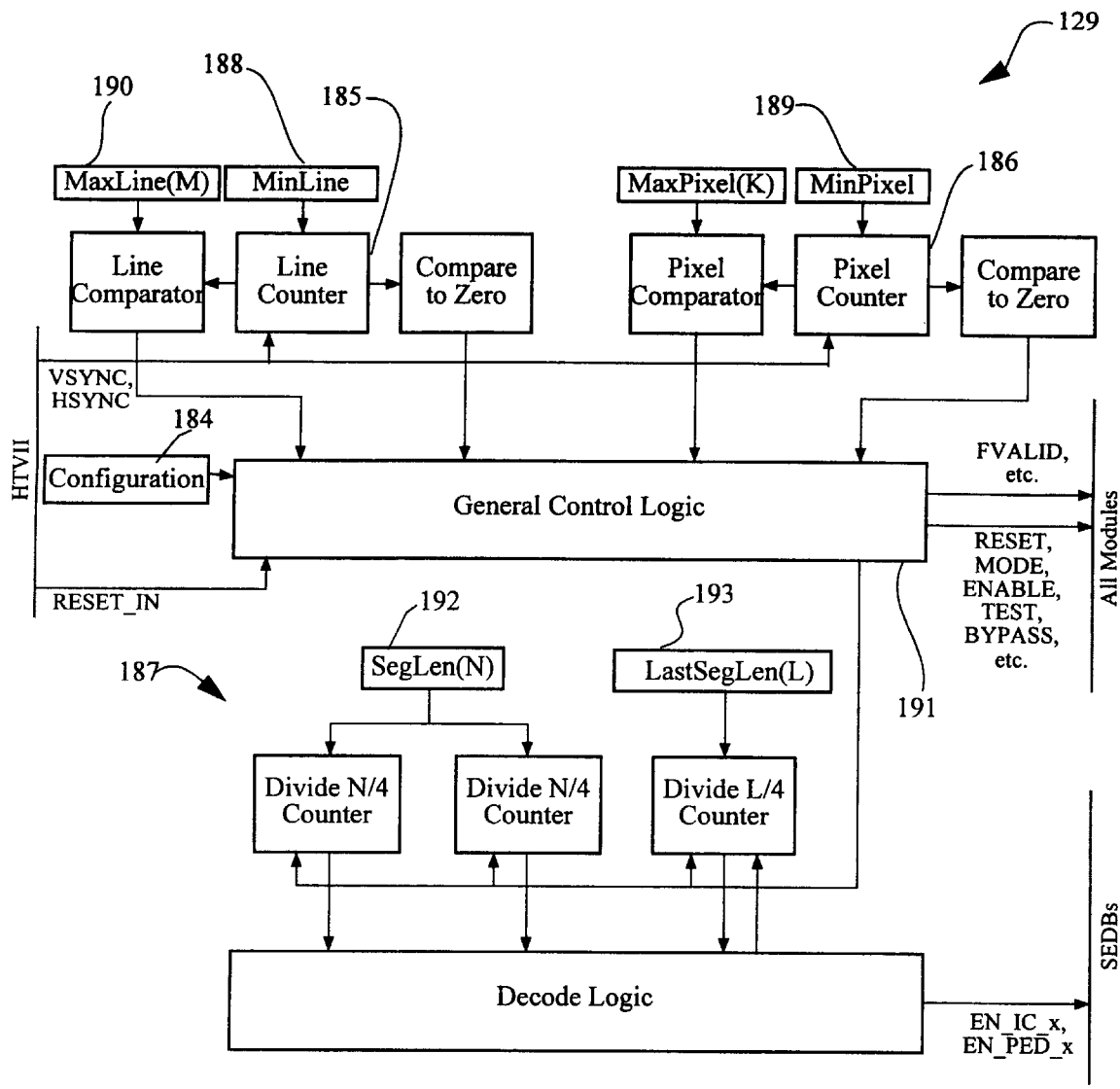
FIG. 40 is a schematic diagram of the data sequencer of FIG. 26.

Referring to FIG. 39, there is shown the 256×4 bit RGBW line store 136 in more detail. As shown in FIG. 28, the 256×4 bit RGBW line store 136 forms part of a SEDB 123 and is interfaced to the data sequencer 129, the P3DEDU 135 and the output latch 127. It contains write control logic 179 and read control logic 180, so that it can be accessed as a FIFO in one of two modes: 4 bits written in each cycle, or 16 bits read in each cycle. In 4-bit write mode, the 256×4 bit RGBW line store 136 is written by the P3DEDU 135 in the same SEDB. In 16-bit read mode, the 256×4 bit RGBW line store 136 is read by the output latch 127. Access in one or the other mode is initiated by control signals from the data sequencer 129 and the P3DEDU 135.

The 256×4 bit RGBW line store 136 consists of a 64 word by 16 bit memory array 181, with separate read and write ports. The memory write port takes data from the P3DEDU interface, and is controlled by the write control logic 179. The read port data is driven to the interface of the output latch 127 via tri-state buffers 182, under the control of the read control logic 180.

The input latch 183 assembles 4-bit data from the P3DEDU 135 into 16-bit words for writing to the memory array. Three consecutive samples are latched, and combined with the following sample to give 16 bits of write data which is written to the memory array 181 once every fourth cycle.

The write control logic 179 takes the P3PEDU_VALID signal, and generates input latch control signals, and memory array write controls, so that one array location is written every fourth cycle while P3PEDU_VALID is asserted. When it is deasserted, no writing takes place, and the write address is reset.

The tri-state buffers 182 drive data from the memory array outputs onto the output latch interface. They are enabled by the read control logic 180 when EN_READ is asserted.

The tri-state buffers 182 take a EN_READ signal from the data sequencer 129. When it is asserted, the tri-state buffers 182 are enabled, and the memory array 181 is read once each cycle. When it is deasserted, no reads take place, and the read address is reset. A control signal from the data sequencer 129 initiates the 256×4 bit RGBW line store 136 operation in its read mode.

Figure 25:
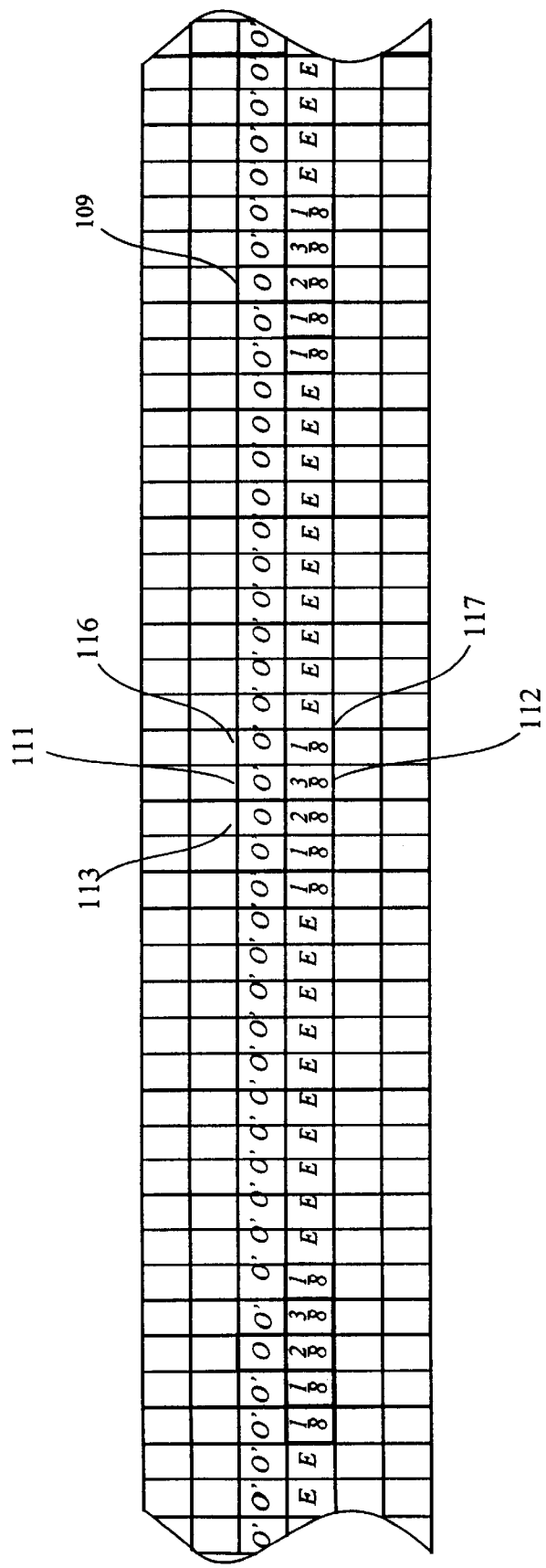
FIG. 25 is a representation of a state of of error diffusion when each error diffusion process has reached the final pixel in its area.

Referring to FIG. 25, there is shown in detail the data sequencer 129. The data sequencer 129 controls the operation of all other modules on the block parallel error diffusion apparatus 119. It contains configuration registers 184, which control the operating modes of the other modules on a global basis. It also contains line counter 185, pixel counter 186 and segment counters 187, which are used to control the sequencing of the other modules, particularly the SEDBs.

The data sequencer 129's operation for a frame is started when an active edge is detected on a VSYNC input signal to the block parallel error diffusion apparatus 119. This causes the line counter 185 to be loaded from a minline register 188. The line counter 185 is incremented on the occurrence of every HSYNC active edge, also input to the block parallel error diffusion apparatus 119. The HSYNC active edge also causes the pixel counter 186 to be loaded from a minpixel register 189. The pixel counter 186 is incremented by 4 in every PCLK cycle.

The line counter 185 is compared against zero, and against a maxline register 190, to determine whether the block parallel error diffusion apparatus 119 is in the active part of each line. The results of these comparisons are fed to a general logic block 191, along with the contents of the configuration registers 184. This general logic block 191 produces the global reset, enable and test signals to the rest of the modules on the block parallel error diffusion apparatus 119. It also controls the function of the rest of the data sequencer 129, which generates the SEDB sequencing signals.

The SEDB segment counters 187 consists mainly of three counters. There are two counters which divide the clock by N/4 cycles, where N is the value in a segment length register 192. The counters are used on alternate lines to produce the control signals for the first four SEDBs. The third counter divides the clock by L/4 cycles, where L is the value in a last segment length register 193. This counter is used in each cycle to produce the control signals for SEDB4.

Figure 41:
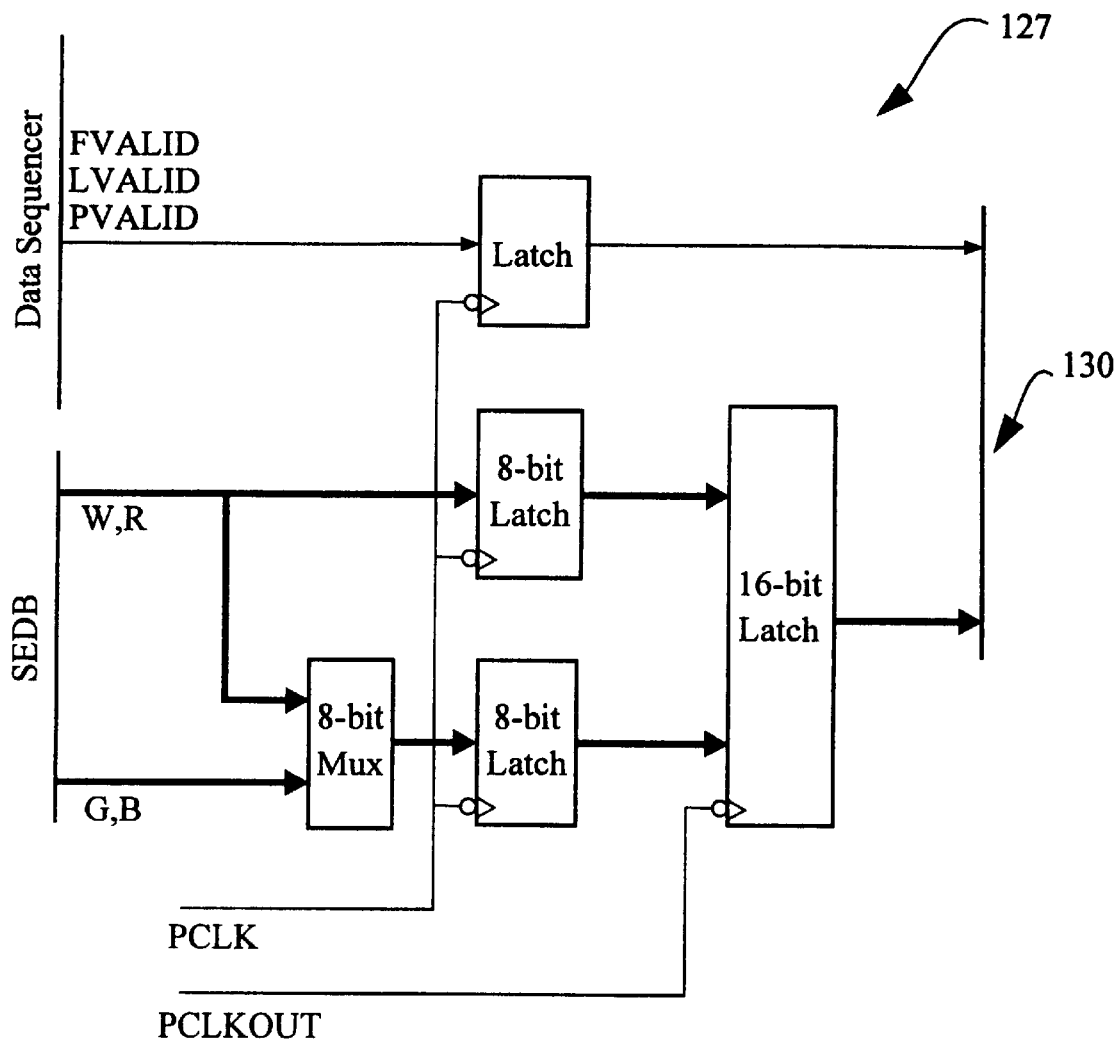
FIG. 41 is a schematic diagram of the output latch of FIG. 26.

Referring now to FIG. 41, there is shown the output latch 127, which takes data from the SEDB, and formats it before driving it to the output data bus 128. In the colour case, this simply delays data by one cycle. The output latch 127 also latches the frame, line and pixel valid output signals, so that they remain in step with the output data.

Data from the SEDB is in the form of four 4-bit values in each clock cycle, and represents RGBW or monochrome values for four consecutive pixels.

The output latch 127 is essentially two banks of flipflops. The first bank is clocked by the falling edge of PCLK. The Valid signals are latched in each cycle. The 16 bits from the SEDB are also latched each cycle in the first bank. The second bank of latches is clocked by the rising edge of PCLKOUT, and drives the output.

As seen in FIG. 2, the display system 3 includes a frame store 6 which contains four bits for each colour output pixel of the FLCD display device 5, one bit for each of the Red, White, Green and Blue parts to the display. Output from the rendering unit 16, is forwarded to frame store controller 7 and stored in the frame store 6. In the preferred embodiment the frame store 6 is configured as a double buffer with an incoming rendered frame stored in one half, while the other half, which has been filled with a previous frame, is available for line by line update of the FLCD display 5. Hence the size of the frame store 6 is preferably 1280 (pixels per line)×1024 (lines per frame)×4 (bits per pixel)×2=10 Mbits. Access to the frame store 6 is controlled by the frame store controller 7. There are four types of access required of the frame store 6:

1. Render writes from the rendering unit 16;
2. Reads from the FLCD display device 5 via the line formatter 71;
3. Control access read and writes; and
4. Refresh cycles.

For speed efficiency, long sequential accesses can be performed in fast page mode. Where accesses are to be in the fast page mode, the frame store controller 7 can incorporate FIFO buffers to accumulate page mode bursts.

The frame store controller 7 also can incorporate address mapping logic, the purpose of which is to spread DRAM row accesses in the frame store 6 in an attempt to achieve self-refresh by the incoming video data. A separate refresh controller can then be incorporated to cater for cases where incoming video rates and geometries do not provide for self-refresh. At any one time, the rendering unit 16, line formatter 71, and/or the internal refresh controller may require access to the frame store 6. Some of these accesses may be done in a fast page mode. Thus there is a requirement for the frame store controller 7 to decide which module is to have access to the frame store 6, while the other waiting modules have their data buffered as required.

Figure 77:
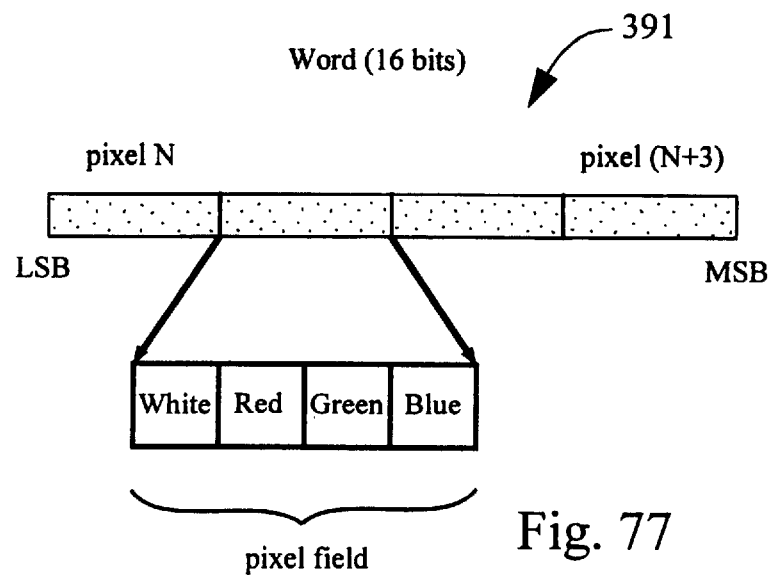
FIG. 77 illustrates a word data structure.

Referring now to FIG. 77, there is shown the form of image data from the rendering unit 16, which consists of four sets of pixel data with four bits per pixel. Hence the overall size of the input data is a 16 bit word 391.

Figure 78:
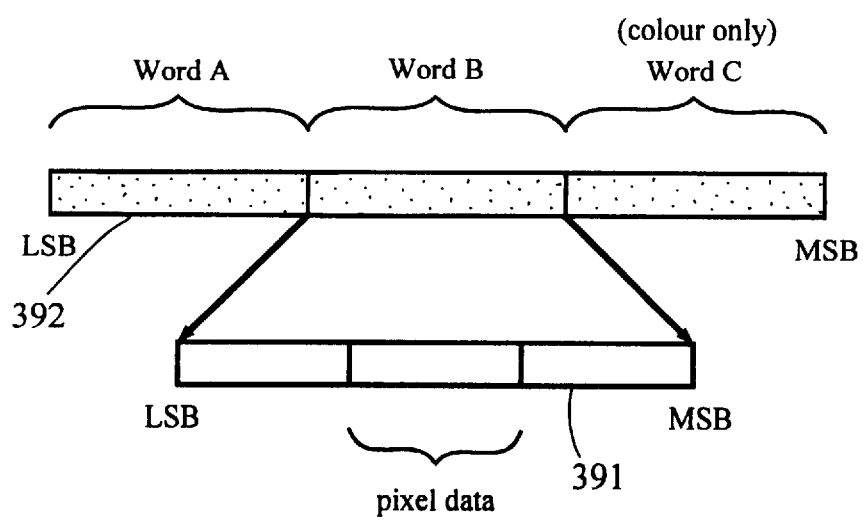
FIG. 78 illustrates the long word data structure.

Referring now to FIG. 78, the frame store 6 stores data in the format of three words 391 being packed into a 48-bit long word 392. This permits a minimum of four adjacent pixels to be written to the frame store 6 at any one time.

The frame store 6 memory image data bus is therefore one 48 bit long word wide, whereas the rendering unit 16 and line formatter 71 deal with one 16 bit word size data packet at a time, whereas the natural addressing unit of the FLCD display 5 is one 4-bit pixel data packet. These different orientations are consolidated by the use of a number of 'frame store memory address models', as seen by the various interfaces around and in the frame store controller 7. The frame store controller 7 performs the appropriate translations between addressing models.

A first frame store memory address model is the 'Screen Address Model' used by the line formatter 71. The line dispatcher unit 12 determines which lines should be sent to the FLCD display 5. It passes the line number to the line dispatcher unit 12 along line formatter to line dispatcher bus 70. This number is interpreted as the "y" component of the screen address, with the "x" component defaulting to zero. The screen address is converted to a physical address and used to initiate a fast page mode read of the frame store 6. Subsequent fast page mode accesses, sufficient to build an entire line, are performed, with the remaining physical addresses calculated within the frame store controller 7.

A second frame store memory address model is the 'Zero Address Model' used by the rendering unit 16. The rendering unit 16 is not required to supply an address with the image data it outputs. Pixels are simply packed into 16 bit words and clocked sequentially into the frame store controller 7. Location of the data in the frame store 6 memory and thus on the FLCD display 5 is controlled by a number of internal address data counters, internal to the frame store controller 7, which are reset by the various synchronisation signals. These synchronisation signals include:

A FVALID signal which occurs on the beginning of a new frame and signals that the internal data address counters should be reset to point to the beginning of the first line in the frame store 6.

A LVALID signal which occurs at the beginning of a new line and signals that the internal data address counters should be advanced to point to the beginning of the next line in the frame store 6.

A PVALID signal that, when asserted, indicates that the incoming pixel data is valid.

Figure 79:
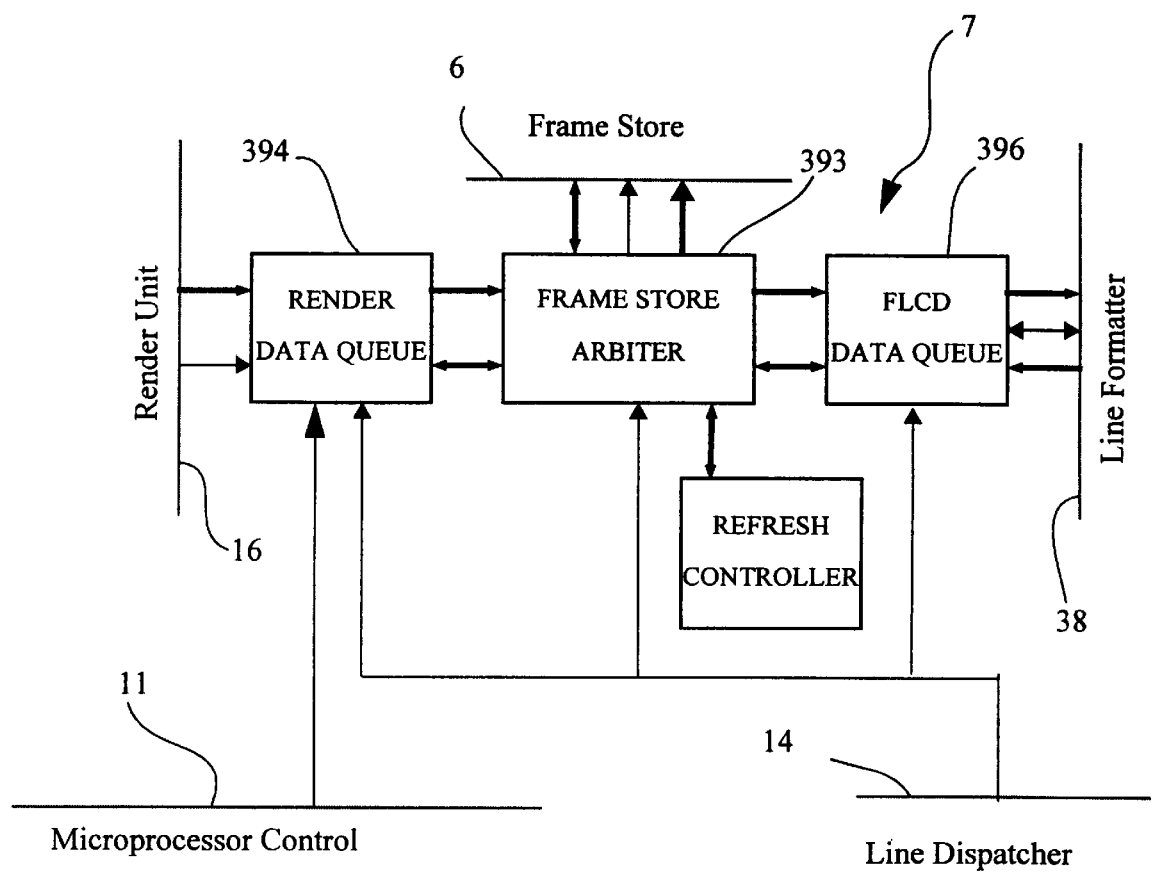
FIG. 79 is a schematic block diagram representation of the frame store controller of FIG. 2.

Referring now to FIG. 79, there is shown the frame store controller 7 in more detail. The frame store controller 7 consists of a frame store arbiter 393, a render data queue 394, a refresh contoller 395 and a FLCD data queue 396.

The frame store controller 7 accepts requests to access the frame store from the rendering unit 16 and line formatter 71. If contentions arises between access requests, the frame store arbiter 393 assesses relative priorities and allows one to proceed. The priorities are programmable by the initialization and control microprocessor 11. The frame store controller 7 also maps the input address to a physical row and column address of the frame store 6 which consists of a DRAM array. The frame store arbiter 393 interfaces with its neighbouring modules via request-acknowledge handshake signals, as well as address and data buses, buffer select and other read-write control signals. Accompanying a frame store access request is a starting linear address. When a request is first acknowledged, the start address is read into the frame store arbiter 393 and loaded into an internal register. No further address information is required from the requesting module. When a long-word is to be written into the frame store 6, individual write-control signals select which of the constituent words are actually written. The request acknowledge signal is used to synchronously clock data long-words until the page mode access is complete, as signified by the request becoming inactive.

Rendered image data from the rendering unit 16 can arrive at the frame store controller 7 asynchronously, at up to 35 Mwords per second. The render data queue 394 must resynchronise this data to its own clock and then store it in an internal FIFO until enough is acquired to fill a fast page mode write burst. A write request, together with a starting linear address as calculated from the synchronisation signals and is then sent to the frame store arbiter 393. In response to this request, the frame store arbiter 393 uses the acknowledge signal to clock enough long-words from the render data queue 394 to fill a fast page mode write burst.

The FLCD data queue 396 requests image data for transfer through the line formatter 71 to the display controller 4 by converting a screen line number from the line formatter 71 into a starting linear address and presenting this, as well as a read request to the frame store arbiter 393. When this read request has been satisfied, and an internal FIFO of the FLCD data queue 396 has been filled with a fast page mode read burst, the FLCD data queue 396 signals the line formatter 71 that a display line of pixels can be sent to the display controller 4. Once signalled, the line formatter 71 is able to synchronously clock words from the FLCD data queue 396 without wait states. It is the responsibility of the FLCD data queue 396 to continue sequential frame store page reads to ensure its FIFO does not empty until an entire line has been read.

The refresh contoller 395 is connected to one port of the frame store arbiter 393. When enabled, it constantly requests, at a low priority, that a row refresh cycle be performed on the frame store 6.

Figure 80:
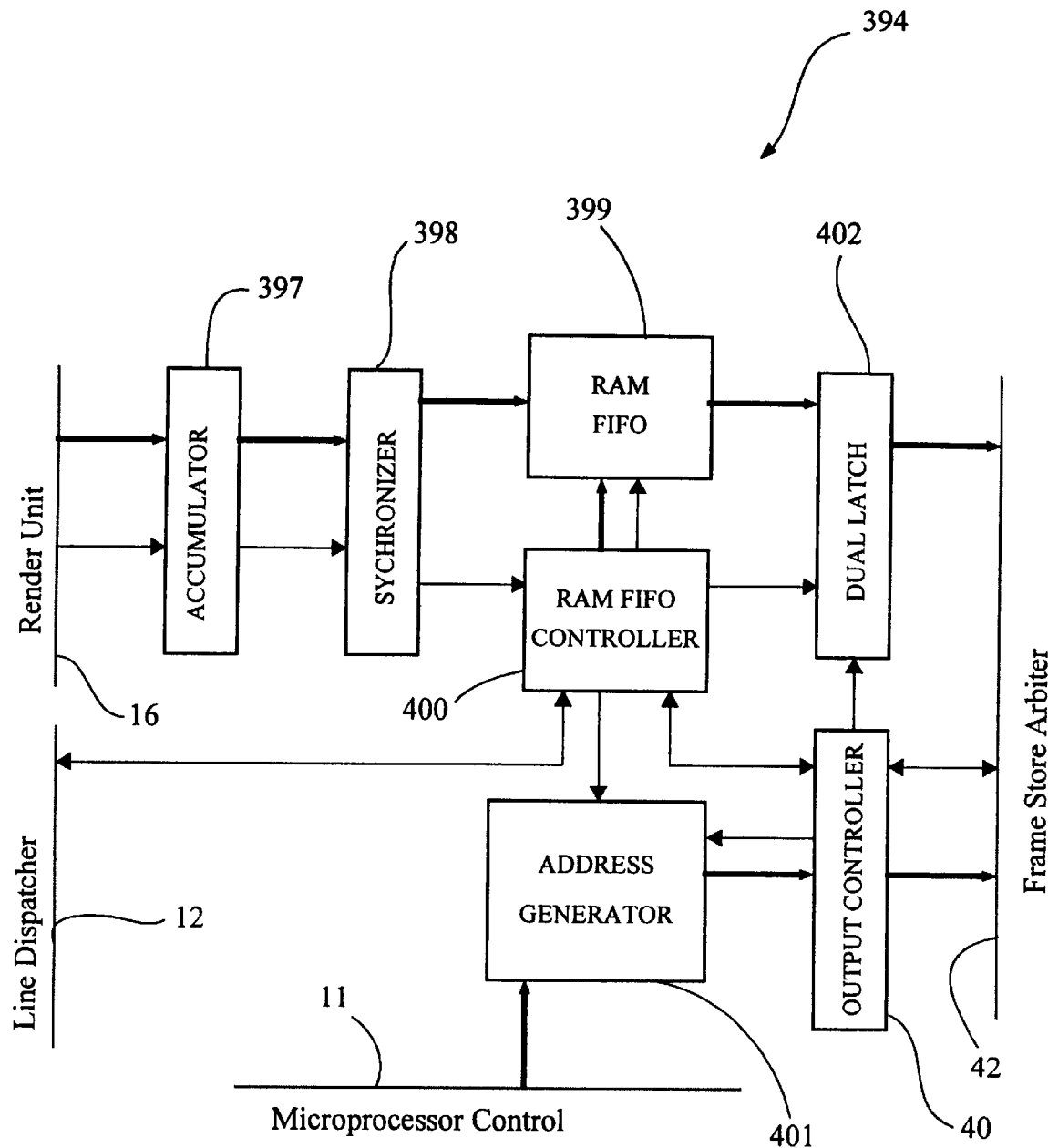
FIG. 80 is a schematic block diagram representation of the render data queue unit of FIG. 79.

Referring now to FIG. 80, there is shown the render data queue 394 in more detail. The render data queue 394 includes an accumulator 397, a sychronizer 398, a RAM FIFO 399, a RAM FIFO controller 400, a address generator 401, a dual latch 402 and a output controller 403. The accumulator 397 accumulates three lots of 16 bit word pixel data from the rendering unit 16. This 48 bit long word is then forwarded to the sychronizer 398. The sychronizer 398 is responsible for synchronising between the different clock rates of the render unit's output and the frame store controller 7. The RAM FIFO 399 and the RAM FIFO controller 400 together implement, through use of a circular buffer, a FIFO queue which is 32 long words deep. The RAM FIFO controller 400 generates read and writes for the RAM FIFO 399 When the incoming data fills any half of the circular buffer (16 deep by 48 bit wide), the RAM FIFO controller 400 generates a request for the frame store arbiter 393 via the output controller 403. The frame store arbiter 393 then empties the half-buffer. It is important that the burst rate of emptying the RAM FIFO 399 is much faster than the incoming data rate ensuring that the RAM FIFO 399 never overflows. The incoming data sees the RAM FIFO 399 as an infinite length of 48 bit wide RAM. When the incoming data fills up the RAM FIFO 399 it starts writing at the first location.

The RAM FIFO controller 400 also generates an EndOfLine and EndOfFrame signals for the address generator 401. It asserts an RQIDLE signal for the line dispatcher unit 12 after the end of a frame and after it has emptied the Ram FIFO. It deasserts the RQIDLE at the beginning of the frame.

The address generator 401 generates the linear address for the frame store arbiter 393. The address generator 401 has a number of internal registers which are set up by the initialization and control microprocessor 11, these registers include:

LineStart register—used in determining the first line on which an image should start.

LineOffset register—used to determine how many pixels in from the edge that an image should start.

CurrLineAdd—used by the address generator 401 to indicate a current line position.

CurrAdd—used by the address generator 401 to indicate a current pixel position within a line.

The initialization and control microprocessor 11 sets up the LineStart, LineWidth and the LineOffset registers. CurrAdd is loaded with the summation of LineStart and LineOffset at power up. CurrLineAdd is loaded with the LineStart at power up. CurrAdd is incremented on the rising edge of the pixel clock (PCLK) signal accompanying the input pixels. CurrLineAdd is loaded with the summation of CurrLineAdd and LineWidth at the end of a line. CurrAdd is loaded with the summation of CurrLineAdd, LineWidth and LineOffset at the end of the line. CurrAdd is loaded with the summation of LineStart and LineOffset at the end of the frame. CurrLineAdd is loaded from the LineStart register at the end of the frame.

A Pseudocode form of the address generation is shown below:

```
if (reset)
    CurrAddr = LineStart + LineOffset
    CurrLineAddr = LineStart
end if
if (new page)
    CurrAddr = CurrAddr + PageSize(16)
end if
if (new line)
    CurrLineAddr = CurrLineAdrr + LineWidth
    CurrAddr = CurrLineAddr + LineWidth + LineOffset
end if
if (new frame)
    CurrAddr = LineStart + Line Offset
    CurrLineAddr = LineStart
end if
```

The dual latch 402 consists of two latches in series and is provided so that the RAM FIFO controller 400 can read one address location in advance to keep up with the speed of the frame store arbiter 393.

The output controller 403 generates the request signal for the frame store arbiter 393 and it generates the read ahead signal for the RAM FIFO 399 and the control signal for the dual latch 402.

Referring again to FIG. 80, the motion detection unit 15 groups together successive pixels on a line into line segments and processes them to produce signatures. A signature is a coded representation of the shape of the one-dimensional signal representing a line segment. Previously produced signatures and those signatures that are being produced for the current frame are stored by the motion detection unit 15 in a double-buffered Signature Store. The motion detection unit 15 compares pairs of stored and current signatures, and uses the maximum difference along a line to determine a priority value with which each line should be updated. These "line update priorities" are relayed to the line dispatcher unit 12 via motion detector to line dispatcher bus 69.

Figure 42:
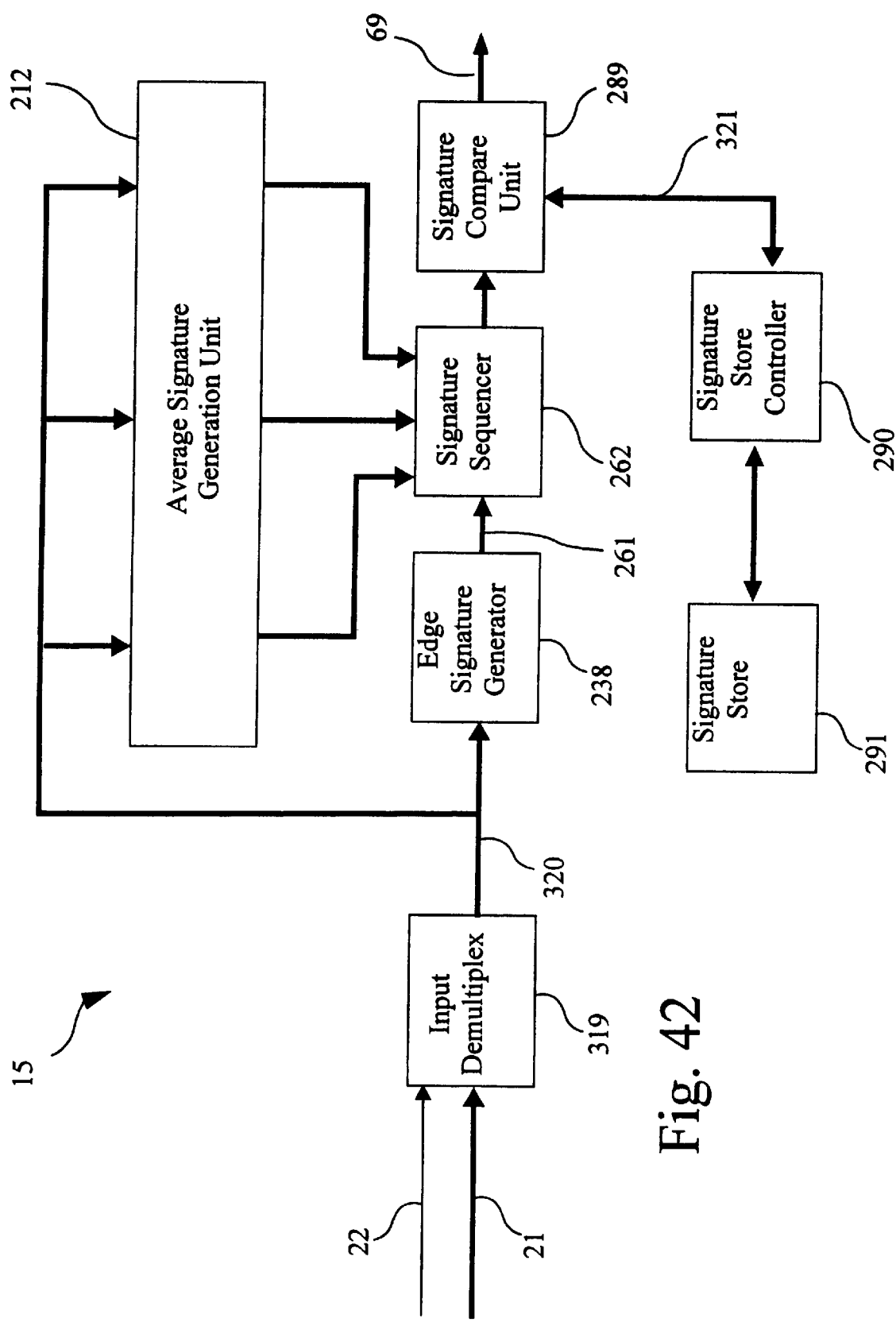
FIG. 42 is a schematic block diagram representation of the motion detector of FIG. 2.

Turning now to FIG. 42 the motion detection unit 15 is shown in more detail. The motion detection unit 15 receives input from demultiplexer output bus 21. This bus includes one channel capable of carrying two pixels at a time, and an associated control information channel 317. In order to ease the processing speed requirements, the pixel information is further demultiplexed by input demultiplexer 319, whereby two groups of two pixels are grouped together so that the rest of the motion detection unit 15 operates on groups of four pixels. By reducing the speed requirements at which the motion detection unit 15 must operate, an implementation in a more economical technology is possible. Hence groups of four pixels, each of 24 bits, are output on a bus 320.

The red, green and blue individual primary colour portions of each pixel in addition to relevant control information is fed to an average signature generation unit 212, The average signature generation unit 212 implements, on each primary colour portion of the image, a first motion detection method conveniently called an 'average signature method' of determining a priority for the updating of a given line of the screen. This method determines a specific summation of an 'average region' of pixel values of a line as will be described hereinafter, and outputs an average signature value to a signature sequencer 262 for each region of a line.

The input pixels are also fed to an edge signature generator 238 which uses them to determine a set of edge values in accordance with an 'edge detection method', to be described hereinafter. One set of edge values is output to the signature sequencer 262 for each predetermined 'edge region'. An edge region being different from an area region.

The area values and edge values are both output to the signature sequencer 262, which packs these values into a 48-bit sample and outputs the sample to a signature compare unit 289.

The signature compare unit 289 takes the samples from the average signature sequencer 93 and samples from a previous frame, which have been stored in a signature store 291 and are input via a signature store controller 290, and determines two priority values for each line of the current input frame, outputting the values on motion detector to line dispatcher bus 69.

Figure 43:
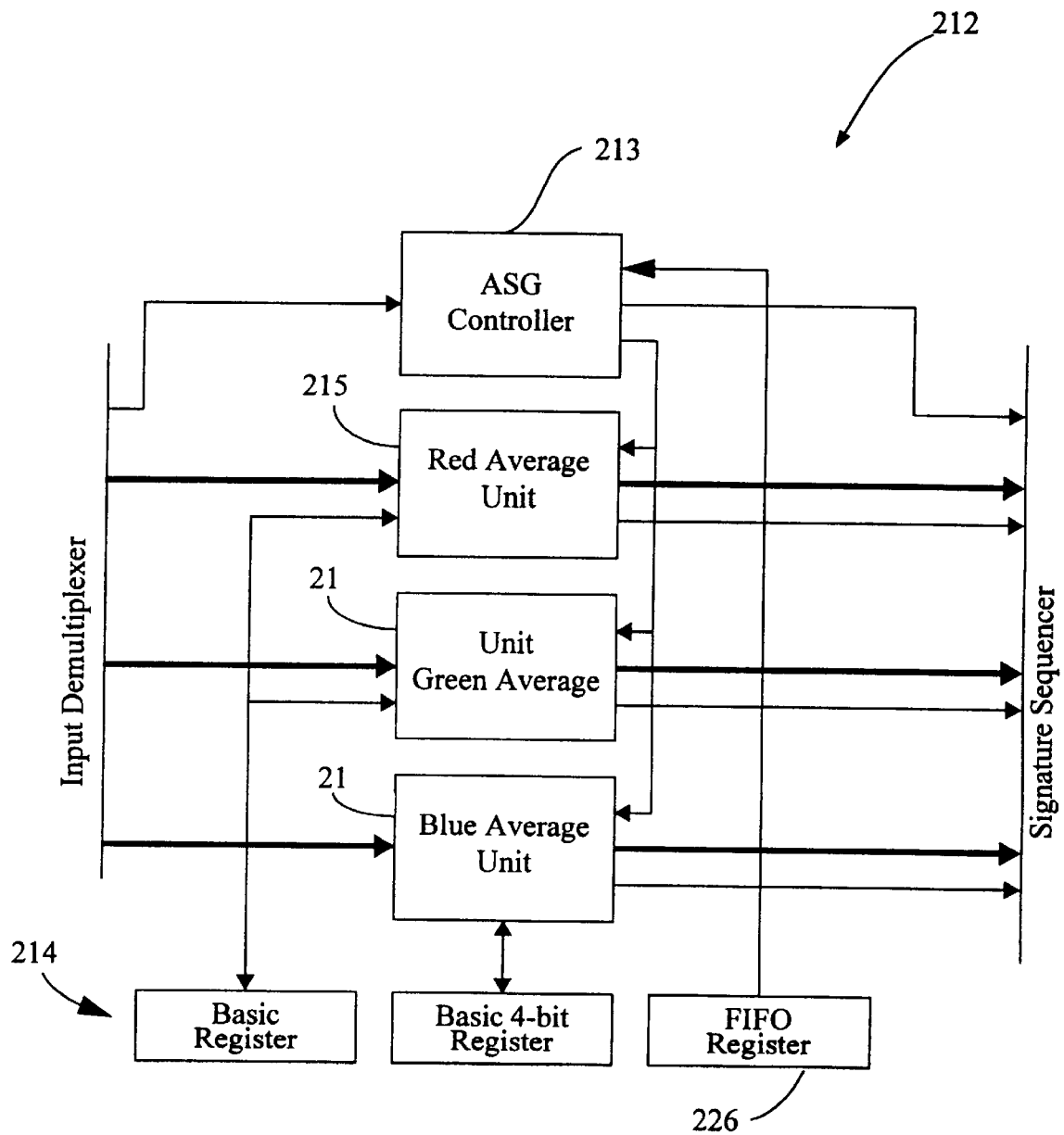
FIG. 43 is a schematic representation of the Average Signature Generation unit of FIG. 42.

Referring to FIG. 43 there is shown the average signature generation unit 212 in more detail. The average signature generation unit 212 consists of three registers 214, an average signature generation controller 213, red average signature unit 215, green average signature unit 216 and a blue average signature unit 217 with each colour signature unit being identical.

The average signature generation unit 212 produces signatures based on the average pixel values of each colour over a horizontal scanline segment. A weighted pixel stream is formed from the input pixel stream of a single colour by multiplying each pixel by 1,–1 or 2 depending on a pseudo-random input control pattern. This weighted pixel stream is summed. The result of the summation over a line-segment of programmable length is the average signature.

Figure 46:
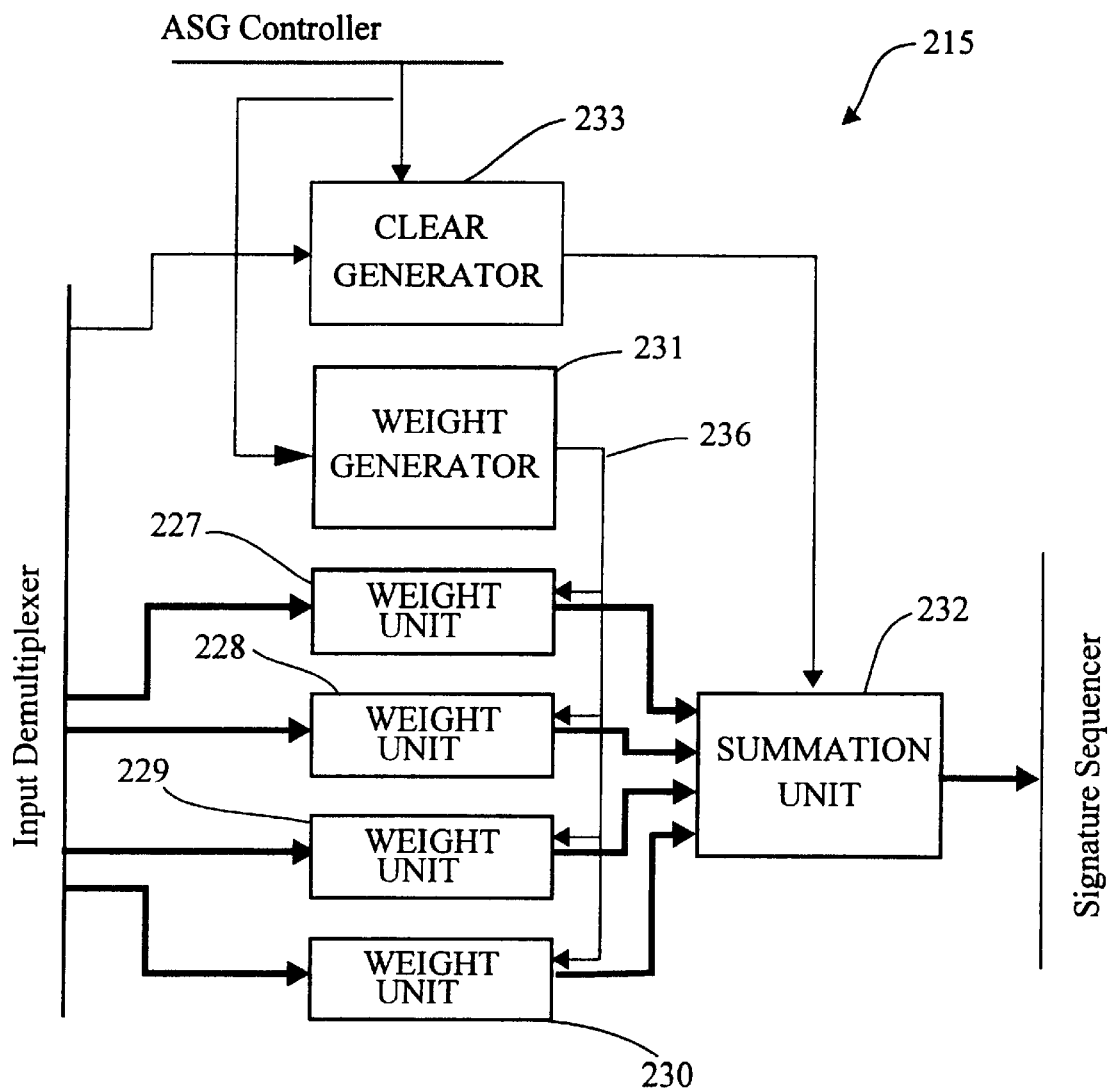
FIG. 46 is a schematic block diagram representation of the red average signature unit of FIG. 43.
Figure 47:
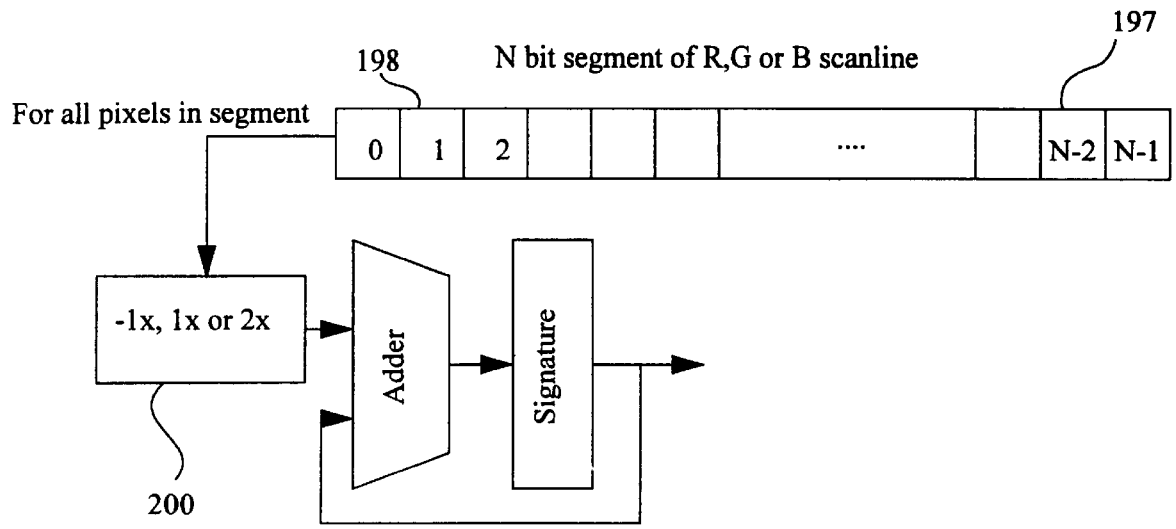
FIG. 47 is a schematic block diagram representation of the process of obtaining an average of a n-bit line segment.

Referring now to FIG. 46, there is shown the red average signature unit 215 in more detail, with the green average signature unit 216 and the blue average signature unit 217 being identical. The red average signature unit 215 implements an average signal generation algorithm which will now be described with reference to FIG. 47. The input image is divided into lines and each line is divided into a predetermined number of line segments 197 having N pixels 198. The incoming N pixels of a line segment are forwarded to a multiplier 200 and are preferably multiplied by the value '–1', '1' or '2'. The actual value of multiplication is determined pseudo-randomly. The same pseudo-random number generator seed is used at the start of each frame, so the value for multiplication chosen for the same pixel of subsequent frames is also the same. Preferably, a seed is chosen which minimizes the coincidence of multiplication patterns for pixels in the same column for a current line and the lines above and below the current line. This has been found to reduce the possibility of the motion detection method failing to detect a change in a vertical feature of subsequent images.

Figure 44:
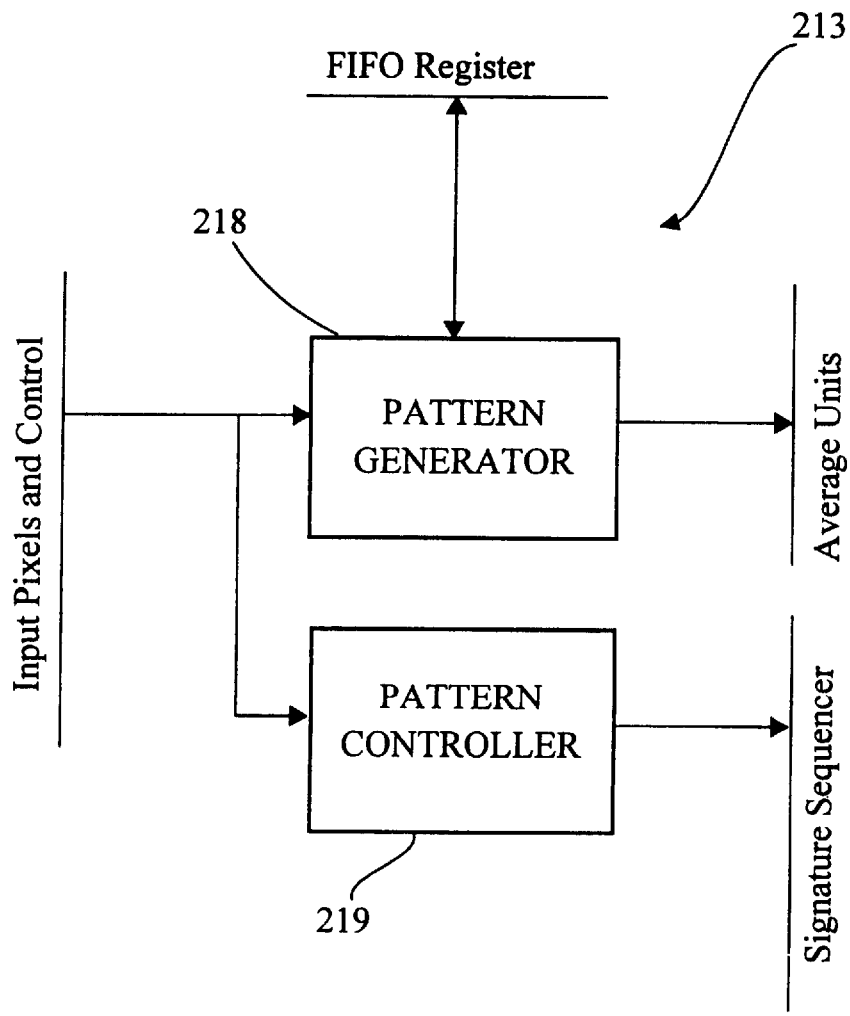
FIG. 44 is a schematic block diagram representation of the average signature generation controller of FIG. 43.

Referring now to FIG. 44, there is shown the average signature generation controller 213 in more detail. The average signature generation controller 213 consists of a pattern generator 218 and a pattern controller 219. The pattern generator 218 generates the control patterns for each of the average signature units, and holds a segment length value for each unit. The pattern controller 219 also generates output signals when output data to the signature sequencer is valid. Only one set of output signals is necessary since all the average signature units will have the same minimum and maximum stages of pipeline delays before generating their first valid signature and generating their final signature during a scan line.

Figure 45:
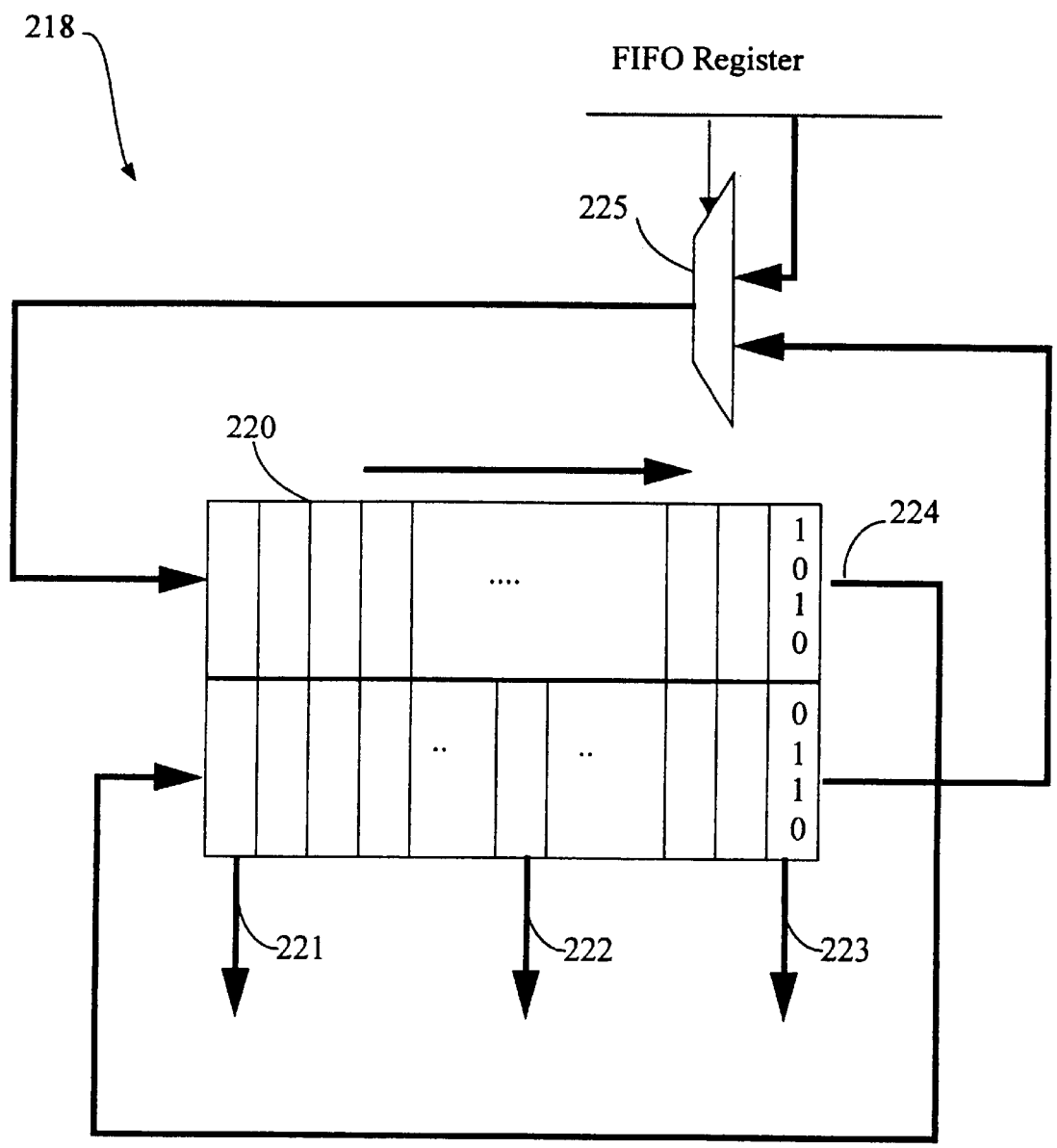
FIG. 45 is a schematic block diagram representation of the pattern generator of FIG. 44.

Referring now to FIG. 45, there is shown the pattern generator 218 in more detail. The pattern generator 218 includes a 34 bit long and eight bit wide first-in-first-out register (fifo) 49 which cycles weight patterns. The weight patterns are read out of the fifo 220, four bits at a time, at various points including blue pattern readout 221, green pattern readout 222 and red pattern readout 223 and forwarded to the average signature generation units 215–217.

At the end of the fifo, the top four bits are fed 224 into the start of the fifo to form the bottom four bits. The bottom four bits are fed into the start of the fifo, via multiplexer 225 to form the top four bits. At the end of each frame, the initial data is loaded into the fifo 220 from fifo register 226 (FIG. 43) via multiplexer 56 so that the same pattern is generated from frame to frame.

Referring now to FIG. 46, the red average signature unit 215 includes a series of weight units 227–230, one for each input pixel, the input pixels being demultiplexed to enter four at a time. The weight units 227–230 multiply their input values by '–1', '1' or '2' as determined by the control outputs of a weight generator 231.

The weight generator 231 reads in a 4-bit pattern word from the average signature generation controller 213 and generates control signals 236 for the weight units 227–230. One bit is input from the average signature generation controller 213 for each pixel. The control signals 236 are two bits wide. These are formed by taking one bit as the input bit and forming the second bit according to the following formula If pattern input=0 then second bit=0
If pattern input=1 then toggle second input.

Figure 48:
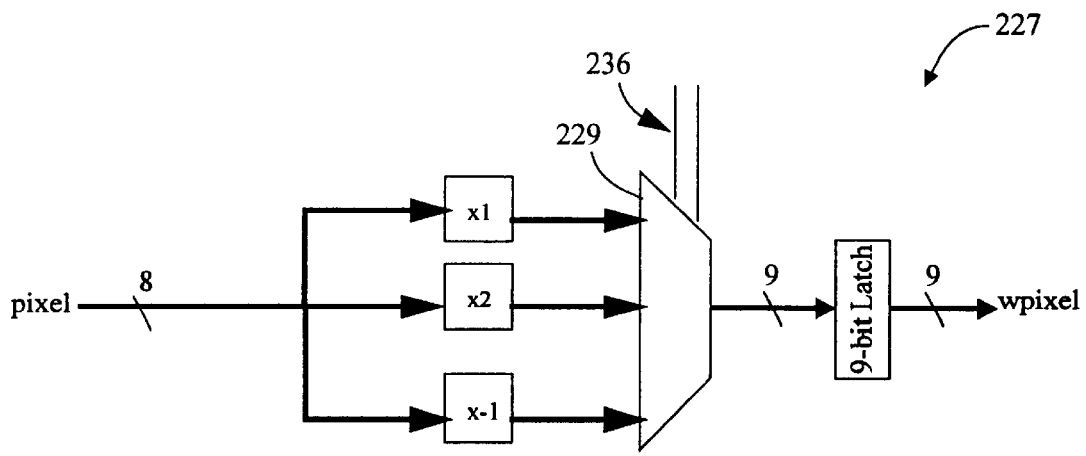
FIG. 48 is a schematic block diagram representation of the weight unit of FIG. 46.

Referring now to FIG. 48, there is shown a weight unit 227 in more detail. The weight unit forms the values '–1', '1' or '2' times the input value and selects one of these via a multiplexer 66 depending on the state of control signals 236 from weight generator 231. As the output may be of a larger magnitude than the input, extra data lines are required. The output of the multiplexer 66 is latched 237 before being output.

Referring again to FIG. 46, a summation unit 232 takes the outputs from the weight units and adds them together for outputing to a signature sequencer 262 after a programmed number of pixels have been processed. After outputing to the signature sequencer 262, the summation unit 232 is reset to zero.

A clear generator 233 generates a clear signal for the summation unit 232 after the number of pixels processed is equal to the length of the current segment.

Returning now to FIG. 42, the groups of four pixels, each of 24 bits, which are output on bus 320 are also fed to an edge signature generator 238. The edge signature generator 238 processes the input pixels to detect the occurrence of edges.

Figure 49:
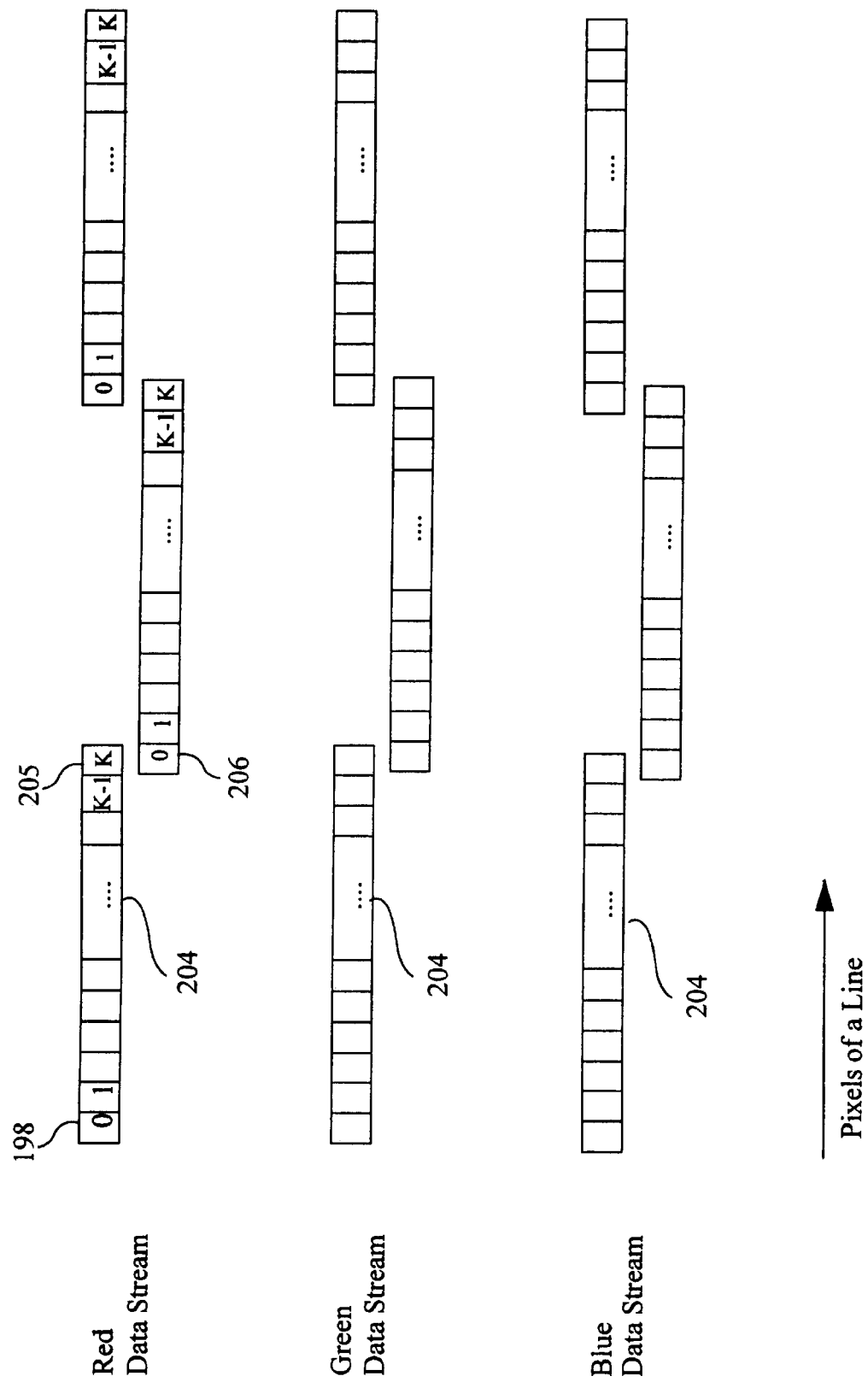
FIG. 49 illustrates the line break up for edge detection.
Figure 50:
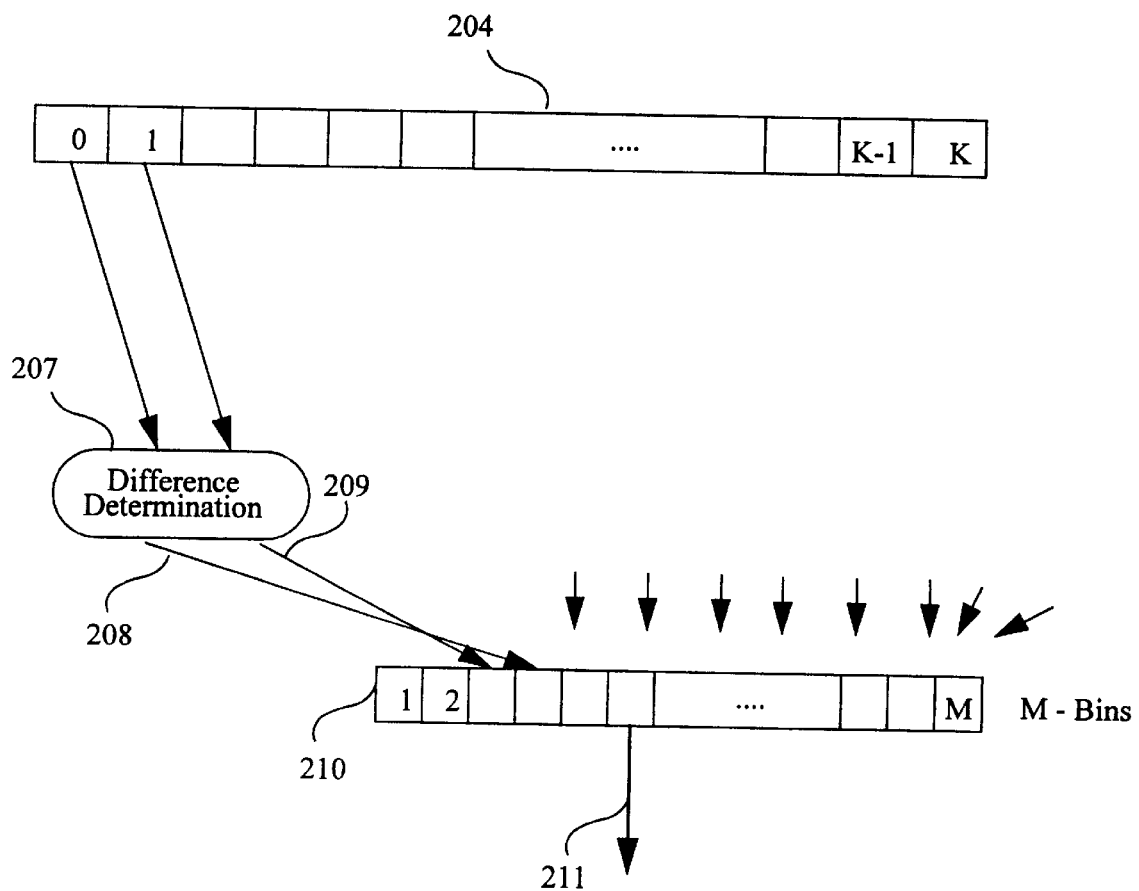
FIG. 50 illustrates the edge collection for a line segment.

FIG. 49 and FIG. 50 illustrate the method used which is called 'an edge detection method' and which is suitable for determining whether edges in an input image have moved, and for determining a priority value. The edge detection method will now be explained. The red, green and blue pixel input streams are each divided into line segments 204 of length K+1. The last pixel 205 of a particular line segment is included in the segment as well as being included as the first pixel 206 of the next line segment.

As seen in FIG. 50, for each individual line segment 204 of the input data stream, the value of the difference between adjacent pixels is determined 207. This difference value is used to produce two further values, conveniently called a negative slope value 208 and positive slope value 209. If the difference value is positive, then the positive slope value 209 is set to be equal to the difference value and the negative slope value 208 is set to equal zero. If the difference value is negative, then the positive slope value 209 is set to be equal to zero and the negative slope value 208 is set to equal the absolute value of the difference value.

This difference value between two adjacent pixels can be conveniently called an 'edge'. As there are K+1 pixels in a line segment 204, there will be K edges per line segment and 3*K edges for the red, green and blue portions of a line segment. Each edge produces two slope values. Hence, there will be 2*3*K values produced for each segment.

These slope values are assigned to one of M groups or 'bins' 210. The determination of which bin to assign the two slope values from each primary colour stream is determined by a second pseudo-random number sequence which can take the form of a ROM lookup table. This second sequence is also restarted at the start of each frame so that the bins 59 chosen for a given pixel do not change with changing frames. The mapping of slope values to bins is primary colour stream independent, such that a bin can contain red, green or blue slope values. Preferably the mapping to bins is such that the red, green and blue edge values go to different bins and the positive and negative slope values also go to different bins. Preferably, the number of bins is greater than the number of slope values produced by a single pixel (in this case, greater than six).

In a modification of the above process, only a subset of the edges might be assigned to the bins with the pattern of assignment being such that edges not assigned in a current line are assigned in the next line or the line after the next line.

Within each bin, the absolute values of the incoming edges are compared with a current maximum value stored in the bin, and the maximum of the two becomes the new current maximum value. At the end of a segment the maximum value stored in each bin can be read out via a bin signature output 211.

Figure 51:
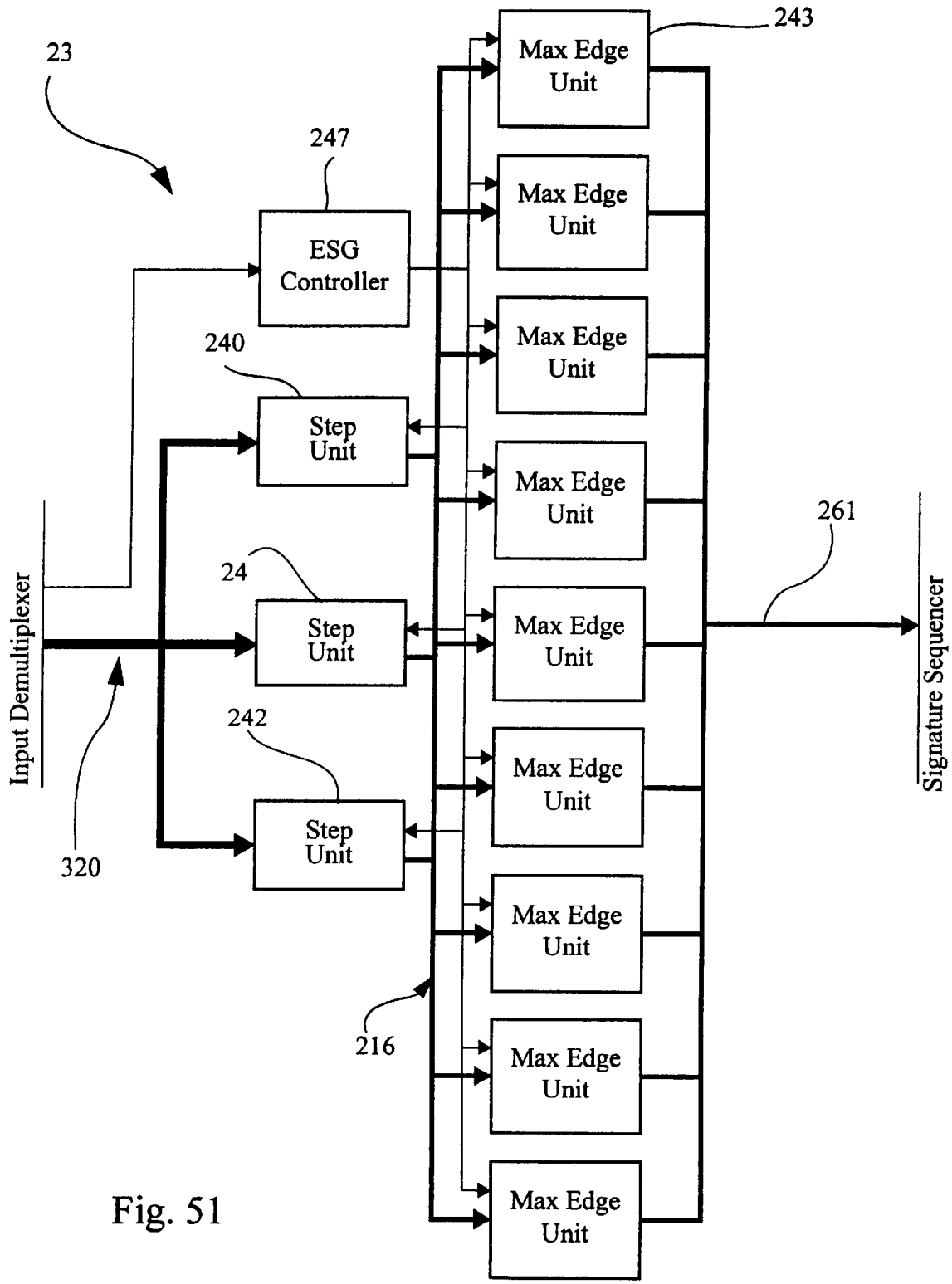
FIG. 51 is a schematic block diagram representation of the edge signature generator of FIG. 42.

Referring now to FIG. 51, there is shown, in more detail, the edge signature generator 238 which implements the edge detection method. Pixels are input at a rate of four pixels at a time from demultiplexer bus 320 to step units 240–242, with one step unit handling each colour. Control information, such as pixel clocking and vertical and horizontal time signals, is input to an edge signature generator (ESG) controller 247.

Figure 52:
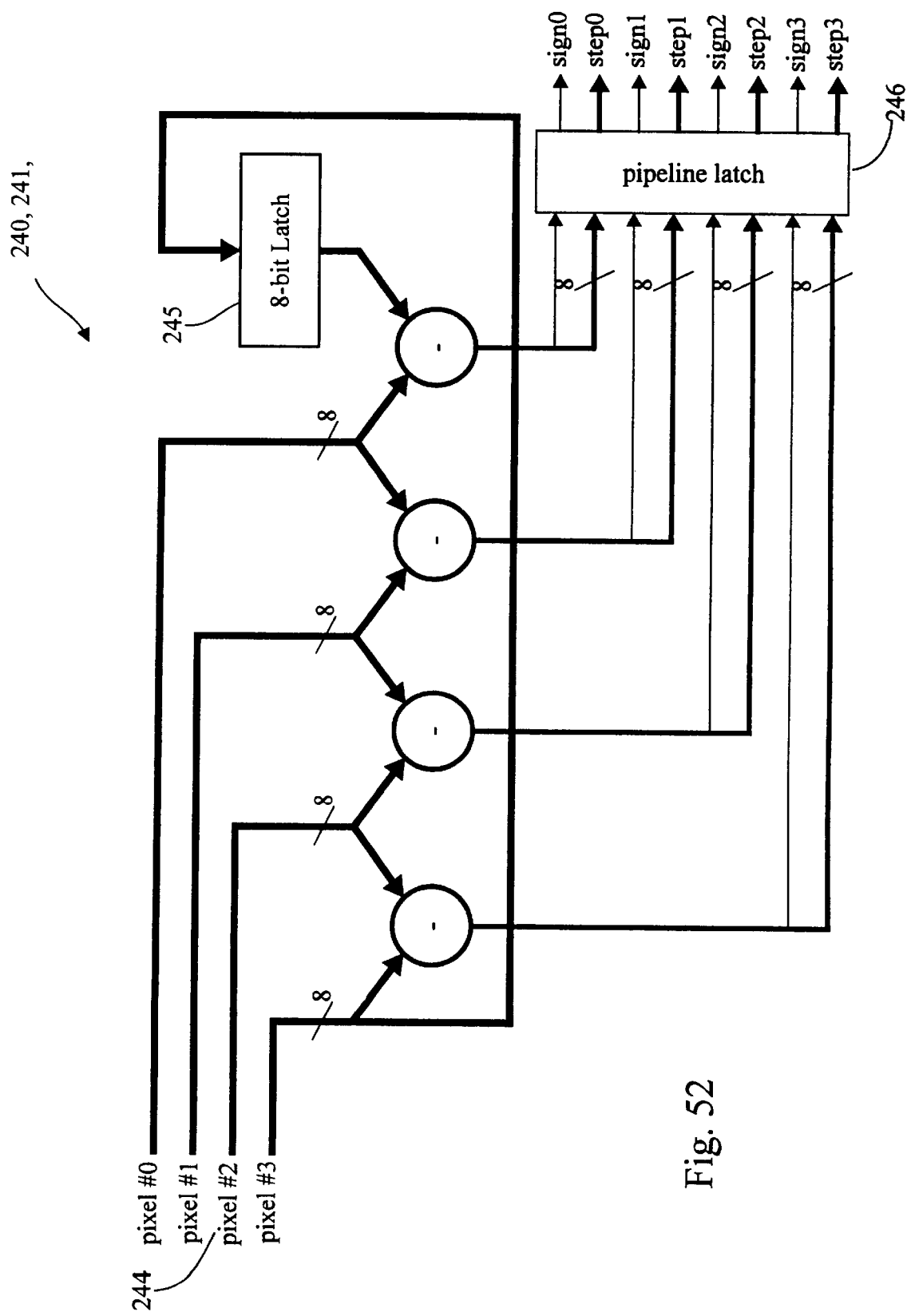
FIG. 52 is a schematic block diagram of one of the step units of FIG. 51.

Referring now to FIG. 52, there is shown, in more detail, one of the step units 240–242. The step units generate a sign bit and an absolute difference between each pixel pair for each colour. The input data 244 is four lots of 24-bit per pixel RGB data, along with pixel clock and vertical and horizontal synchronisation signals (not shown). As the input is in the form of four pixels at once, the edge method is implemented by saving the last pixel value from the previous group of pixels on a line in latch 245, in order to obtain a difference value with the first pixel of the current group of pixels and the last pixel in the last group of pixels. The absolute difference values and sign bits are latched 246 before they are then forwarded to a collection of maximum edge units 243 (FIG. 51).

Referring again to FIG. 51, the choice of which maximum edge unit 74 to forward the absolute difference value to is determined by an input 247 from the ESG controller 239 which chooses a maximum edge unit 243 in a pseudo-random order as mentioned previously. Each maximum edge unit 243 receives its edge value and compares it with a previously stored current maximum edge value.

Figure 53:
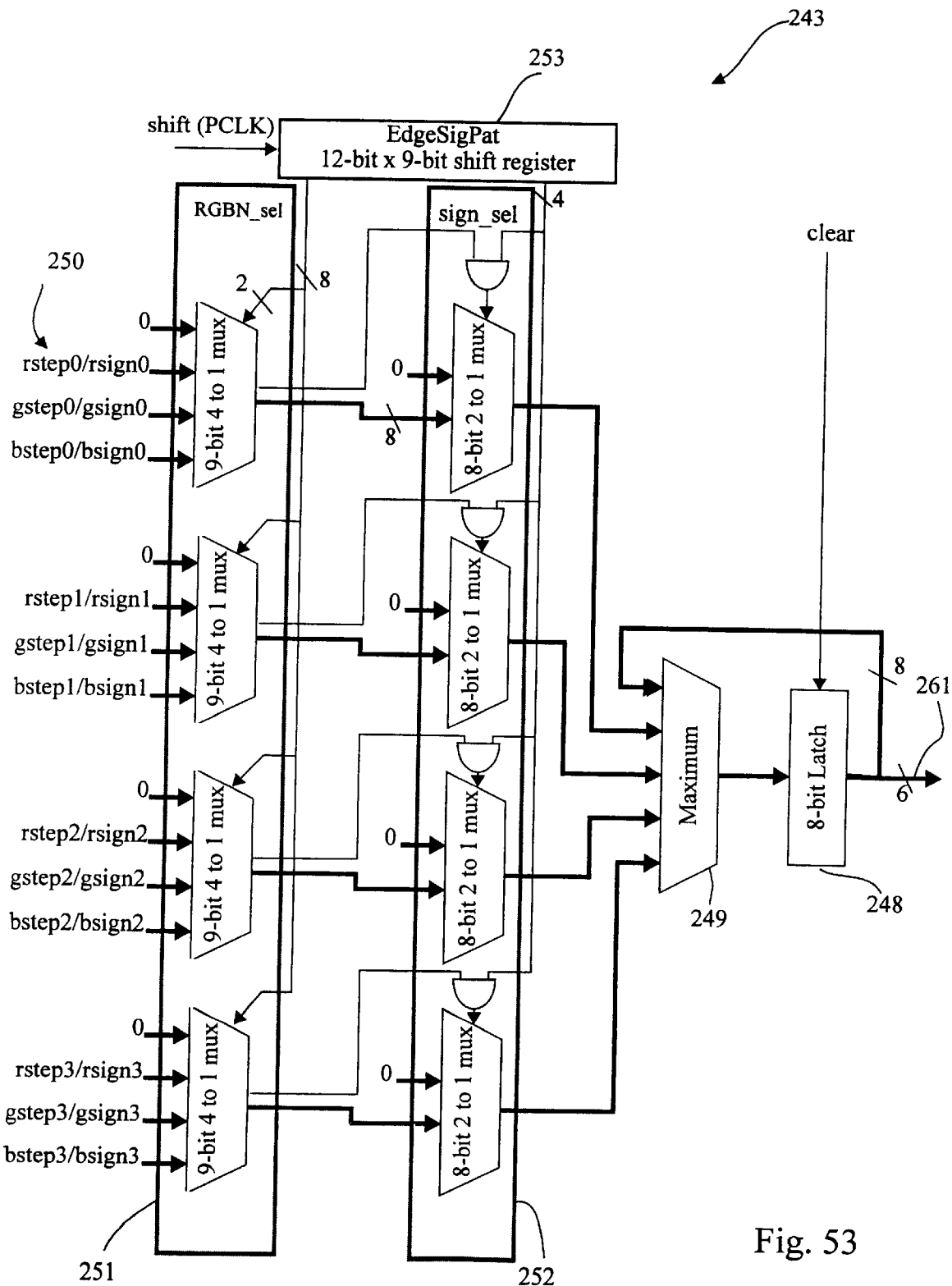
FIG. 53 is a schematic block diagram representation of one of the maximum edge units of FIG. 51.

Referring now to FIG. 53, there is shown the maximum edge unit 243 in more detail. The maximum edge unit 243 uses a maximum determination unit 249 to generate the maximum value of a set of four step values, and a previously saved maximum, which is saved in latch 248. After a predetermined number of pixel clock cycles (PCLK), the maximum value is dispatched to the bin output bus 261 and the latch 248 is reset to zero.

The input samples 250 are selected using three control bits per step and using two stages of multiplexers, including first stage 251 and second stage 252. The first stage 251 of multiplexers use two bits to select the magnitude of the red step, green step, blue step or no step input values. The second stage 252 of multiplexers use a third control bit 'ANDed' with the sign of the selected step to select either the first stage magnitude or zero.

Each maximum edge unit 243 requires twelve selection bits per pixel, eight for the first stage 251 and four for the second stage 252. That is for each of the demultiplexed pixel streams it is necessary to have two bits to select the R, G, B or no edge and one bit to select whether it is positive or negative. The existence of nine maximum edge units necessitates the generation of the control data to be as local as possible. Hence each maximum edge unit 243 contains an edge pattern register 253 of 12 bits, whose values are shift rotated on each fourth pixel clock.

Figure 54:
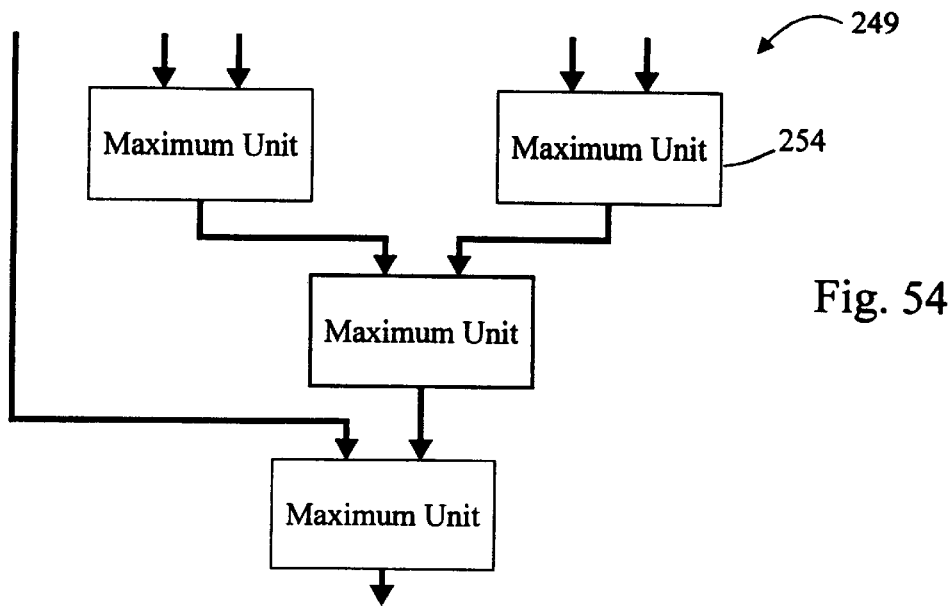
FIG. 54 is a schematic block diagram representation of the maximum determination unit of FIG. 53.
Figure 55:
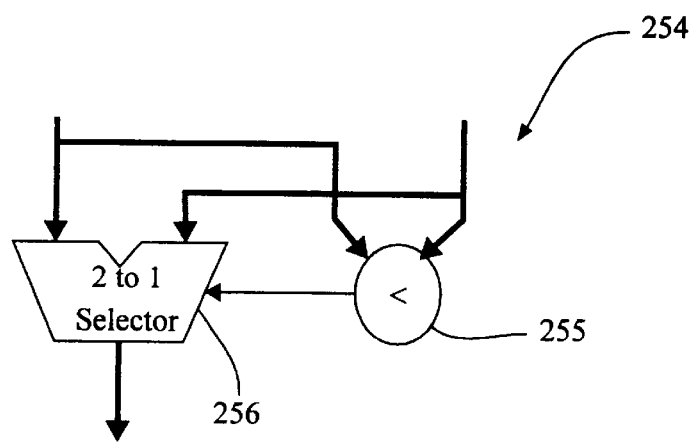
FIG. 55 is a schematic block diagram representation of a two input maximum unit of FIG. 54.

Referring now to FIG. 54, there is shown the maximum determination unit 249 in more detail. The maximum determination unit 249 determines the maximum of five inputs by determining the maximum of two inputs 254, multiple times. Referring now to FIG. 55, there is shown a two input maximum unit 254 in more detail and consists of a comparator 255 and a multiplexor 256, with the comparator 255 output being used to control the multiplexor 256 so as to produce the maximum of its two inputs.

Figure 56:
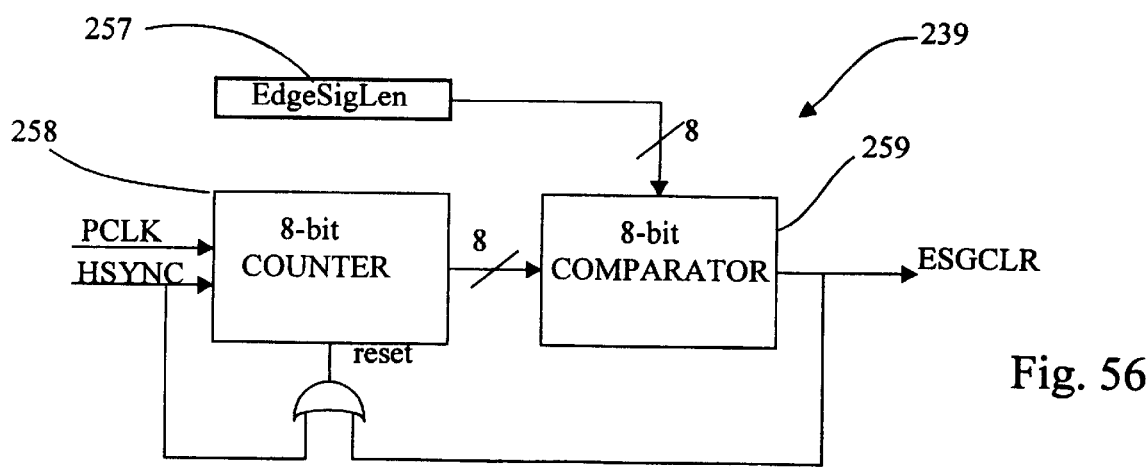
FIG. 56 is a schematic block diagram of the ESG controller of FIG. 51.

Referring now to FIG. 56, there is shown the ESG controller 239 of FIG. 51 in more detail. The ESG controller 239 generates the signals that regulate the data flow of the edge signature generator 238. The required control signals are clear signals to the output latches of the step units 240–242 and the maximum edge unit 243, and the selection signals to the multiplexers in the maximum edge unit 243. An edge segment length register 257 stores the predetermined length of each segment. An eight bit counter 258 counts up on each pixel clock (PCLK) and is compared 259 with the value in the edge segment length register 257. Once the values are equal, an ESG clear signal 260 is sent out in addition to the eight bit counter 258 being reset. The eight bit counter 258 is also reset on the occurrence of each new line (HSYNC).

Referring again to FIG. 51, as mentioned previously, after a predetermined number of cycles, the maximum value of each maximum edge unit 243 is made available to be output to the signature sequencer 262 via bin output bus 261, and the current maximum edge values for all the maximum edge units 243 are reset to zero.

Referring again to FIG. 42, the output values from the average signature generation unit 212 and the edge signature generator 238 are fed to a signature sequencer 262.

Figure 57:
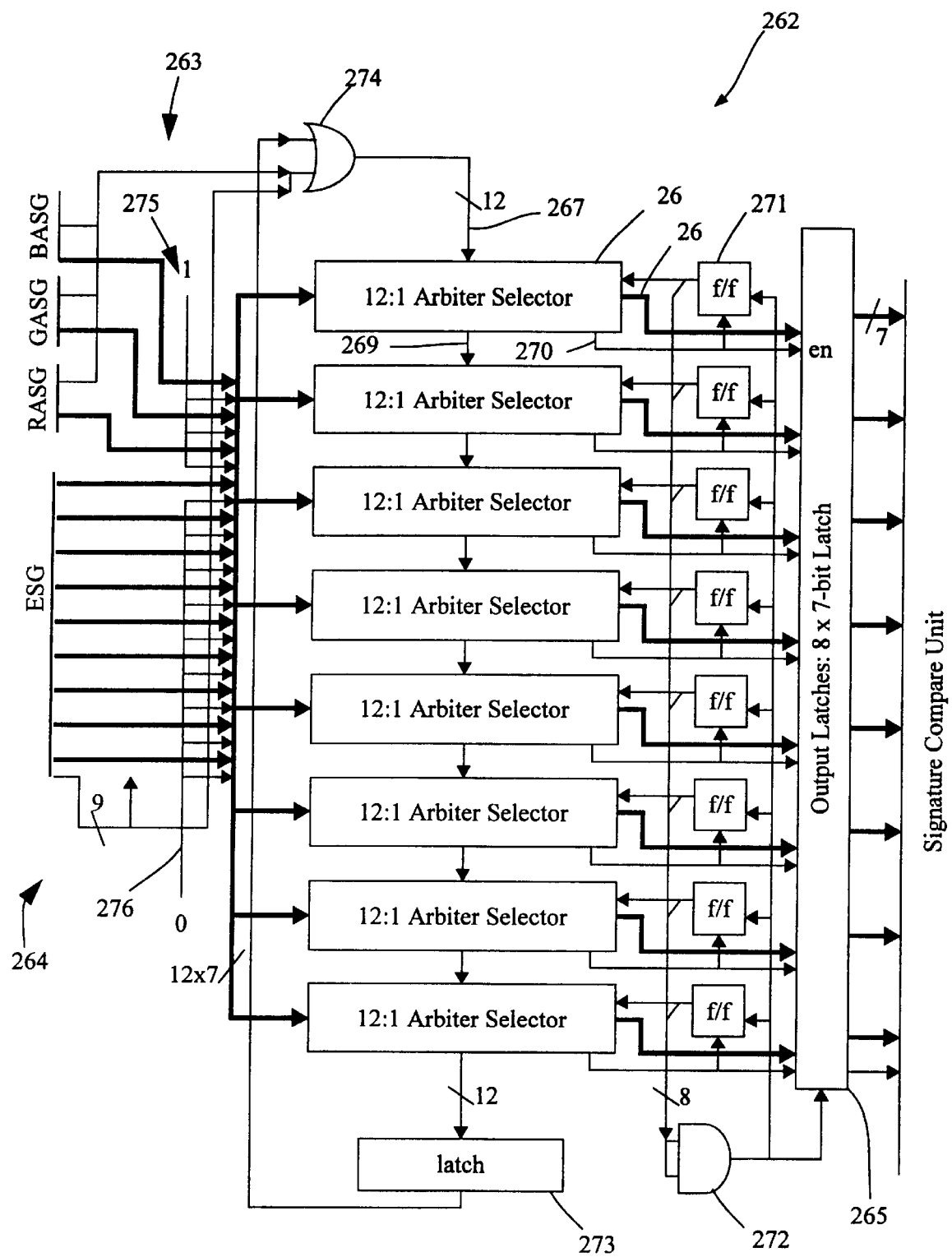
FIG. 57 is a schematic block diagram of the signature sequencer of FIG. 42.

Referring now to FIG. 57, there is shown, in more detail, the signature sequencer 262. The signature sequencer 262 takes three 6-bit average signature inputs 263 at the output rate of the average signature generation unit 212 and M (with M being, in this case 9) 6-bit edge signature inputs 264, at the output rate of the average signature generation unit 212, and selects eight of these signatures for packing into one 56-bit latch 265 thereby forming a sample which is output to the signature compare unit 289. The signature packing performed by the signature sequencer 262 has an ordering that is repeated frame to frame. For each signature which arrives a signature arrival identifier is forwarded to OR gate 105 in conjunction with the output from latch 273.

In addition to the signatures, a signature signification bit being either a 1 bit 275 or a 0 bit 276 is input with the signature to distinguish average signatures from edge signatures.

The twelve input signatures arrive independently, but each signature arrives at a constant rate. The signature sequencer 262 must pack the signatures from each frame into the same sequence. This way one 48-bit signature word sent to the signature compare unit 289 can be correctly compared to the corresponding word from a previous frame. Along with the 48 signature bits, 8 control bits are passed to signature compare unit 289 indicating the arrival of each of the 8 signatures.

The arbiter selector output 268 is fed to the 56-bit latch 265. The 56-bit latch 265, is formed from 8 separate 7-bit output latches which are loaded with the valid signatures latched at the inputs and an extra bit indicating the type of signature.

The 12 to 1 arbiter selector 266 is a 12 to 1, 7-bit selector which selects an input depending upon the values of its input control signals 267. The selection signals are output 269, with the select control corresponding to the input which was selected being cleared. An inhibit signal is provided amongst the input control signals 267, which allows for the passing of all select signals through unchanged, and a valid signal is asserted if an input is selected.

Referring now to FIG. 58 to FIG. 61 there will now be discussed the operation of the 12 to 1 arbiter selector 266.

Figure 58:
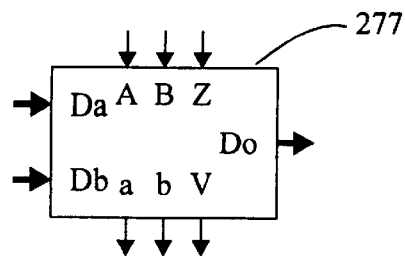
FIG. 58 is a schematic block diagram of a 2 to 1 arbiter selector.

Referring now to FIG. 58, there is shown a 2 to 1 arbiter selector 277 which takes two inputs being Da and Db and selects one of those inputs, outputting Do, under the control of selection inputs A and B. The selection outputs a,b correspond to the selection inputs with the bit corresponding to the input which was selected having been cleared.

An inhibit signal Z is used to inhibit the operation of the 2 to 1 arbiter selector 277 and the valid signal V is asserted if one of the inputs has been selected.

The truth table of the 2 to 1 arbiter selector 277 is shown in Table 1,:

TABLE 1

2 to 1 Arbiter Truth Table

| A | B | Z | Do | a | b | V |
|---|---|---|----|---|---|---|
| 0 | 0 | 0 | X  | 0 | 0 | 0 |
| 0 | 1 | 0 | Db | 0 | 0 | 1 |
| 1 | 0 | 0 | Da | 0 | 0 | 1 |
| 1 | 1 | 0 | Da | 0 | 1 | 1 |
| 0 | 0 | 1 | X  | 0 | 0 | 0 |
| 0 | 1 | 1 | X  | 0 | 1 | 0 |
| 1 | 0 | 1 | X  | 1 | 0 | 0 |
| 1 | 1 | 1 | X  | 1 | 1 | 0 |

The logic formula for the 2 to 1 arbiter selector 277 can be expressed by the following equations:

$$V = \bar{Z}(A+B)$$

$$a = Z \times A$$

$$b = B \times (A+Z)$$

$$Do = A \times Da + \bar{A}B \times Db$$

Figure 59:
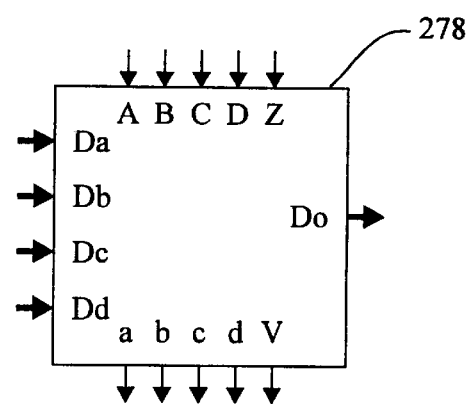
FIG. 59 is a schematic block diagram of the symbolic form of a 4 to 1 arbiter selector.

Referring now to FIG. 59 there is shown a 4 to 1 arbiter selector 278 having four inputs Da to Dd, four input selectors A–D, valid signal V, inhibit signal Z and one output Do. The 4 to 1 arbiter selector 278 operates in the same manner as the 2 to 1 arbiter selector 277 but selects amongst four inputs.

Figure 60:
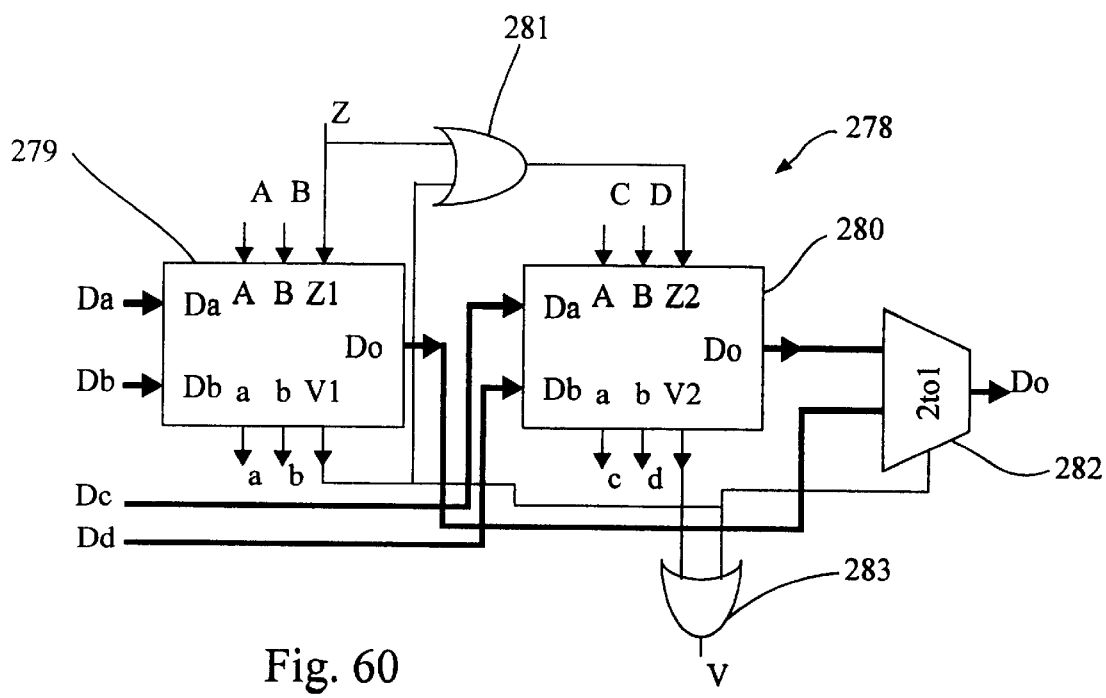
FIG. 60 is a schematic block diagram of the construction for a 4 to 1 arbiter selector.

Referring now to FIG. 60 there is shown the construction of the 4 to 1 arbiter selector 278 from two 2 to 1 arbiter selectors 279, 280. The first 2 to 1 arbiter selector 279 selects amongst the first two inputs Da and Db under the control of selection, inputs A and B. If the selection occurs then the valid signal V1 goes high, thereby deactivating the second 2 to 1 arbiter selector 280 via OR gate 112.

The second 2 to 1 arbiter selector 280 is used to select between the two inputs Dc and Dd under the control of inputs C and D.

The valid bit V1 is also used to select amongst the two arbiter selectors through means of multiplexer 113, in addition to forming an input to OR gate 114.

Figure 61:
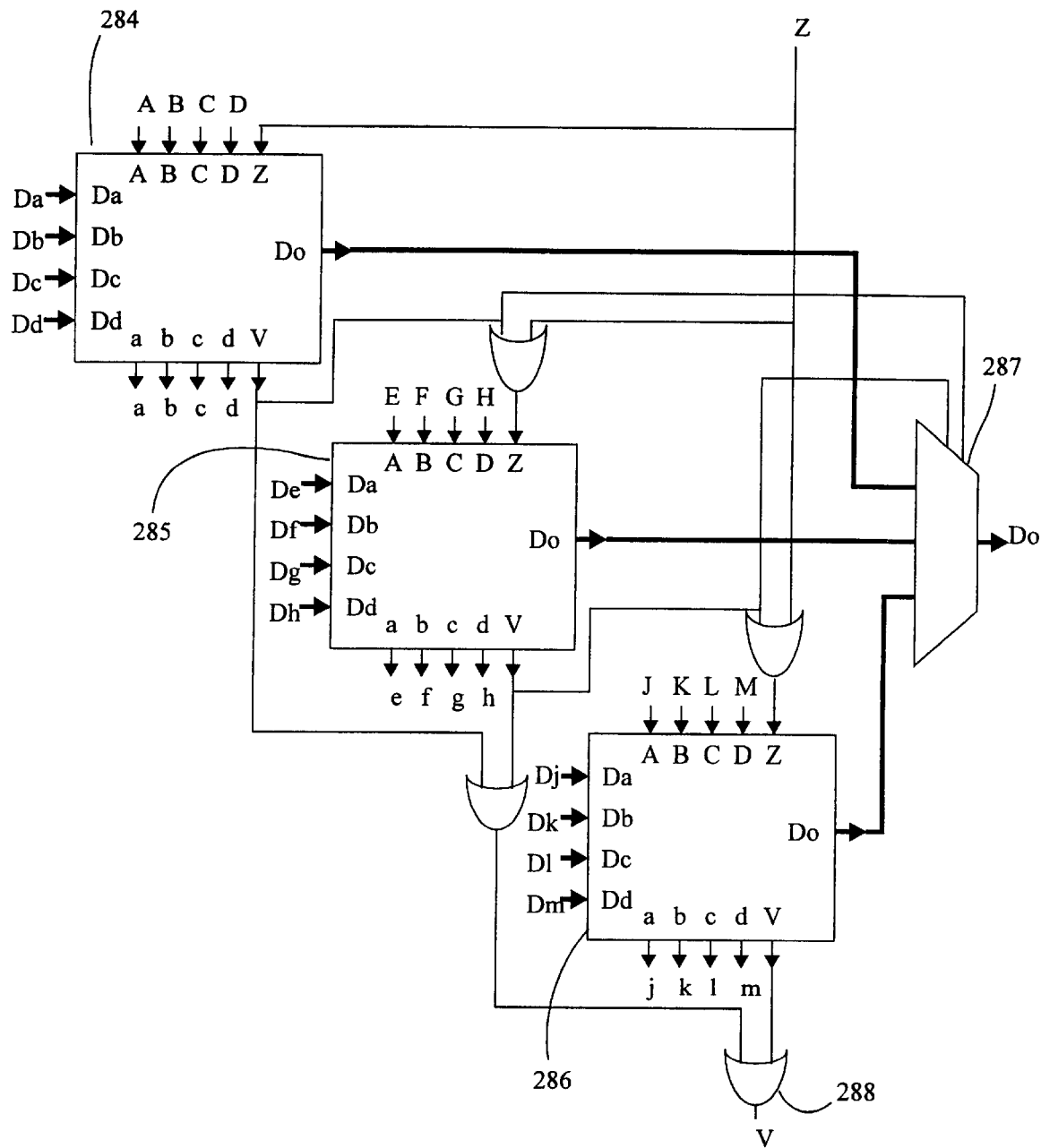
FIG. 61 is a schematic block diagram of the construction of a 12 to 1 arbiter selector of FIG. 57.

Referring now to FIG. 61 there is shown the construction of the 12 to 1 arbiter selector 266 from three 4 to 1 arbiter selectors 284, 285, 286, with each arbiter selector taking four of the inputs and four control signals. The outputs from each arbiter selector are fed to multiplexer 287 which selects one of the outputs depending on the valid output state of each arbiter selector. The valid outputs from each arbiter selector are fed to OR gate 119 to form the valid output of the 12 to 1 arbiter selector 266.

Referring again to FIG. 57, the 8 arbiter selectors are each fed the average signature inputs 263 and edge signature inputs 264 and choose the required outputs as determined by the state of input control signals 267.

The output of the 12 to 1 arbiter selector 266 is fed to 56-bit latch 265. The valid output 269 of the 12 to 1 arbiter selector 266 is used to enable 56-bit latch 265 and set a flip flop 271 to indicate that the 12 to 1 arbiter selector 266 has selected and latched its data. The output of the flip flop 271 is fed to the inhibit signal of the 12 to 1 arbiter selector 266 to stop it from selecting further input signatures. Additionally, the output is fed, with the outputs of the seven other flip-flops to AND gate 103 whose output in turn causes 56-bit latch 265 to output its data and all the flip flops to be reset.

A latch 273 is used to latch signatures that have not been selected in the current round by the arbiter selectors. These signals are then fed with the signals signifying the arrival of new signatures, input from the average signature generator and edge signature generator to an OR gate 105 to form the new set of input control signals 267 to the arbiter selectors.

Referring again to FIG. 42, it can be seen that the signature compare unit 289 takes, as its input, a current stream of signatures from the signature sequencer 262 in addition to corresponding signatures from a previous frame, input from edge signature inputs 264 and outputs priority values on motion detector to line dispatcher bus 69, in addition to storing the current signature stream in signature store 291 via signature store controller 290.

Figure 62:
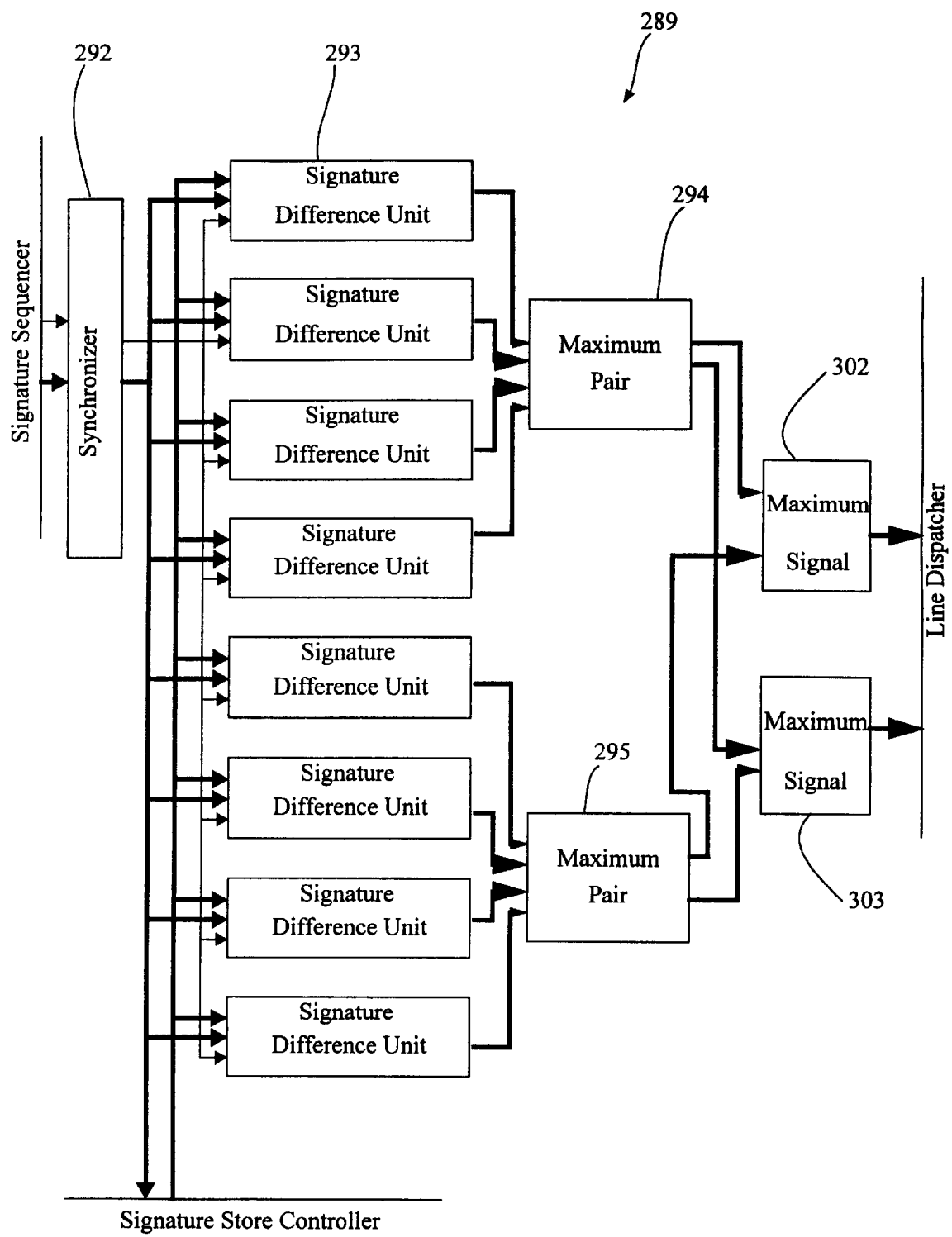
FIG. 62 is a schematic block diagram of the signature compare unit of FIG. 42.

Referring now to FIG. 62, there is shown the signature compare unit 289 in more detail. The signature compare unit 289 includes a synchronizer 292 which asynchronously latches incoming control and data signals from the signature sequencer 262 so that the rest of the signature compare unit 289 can work at the clock rate of the signature store controller 290. Of course, if the two clock rates are the same, the requirement for the synchronizer 292 is eliminated.

The signature streams are 56 bits wide, comprising 8 6-bit signatures in addition to an extra bit for each signature to indicate whether the signature is of an average or edge type. One signature is sent to each of eight signature difference units 293, in addition to being stored in the signature store 291 via signature store controller 290. Also forwarded to the signature difference units 293 are previous signatures from a previous frame read in from the signature store controller 290. The signature difference units 293 takes the absolute value of the difference between its two input signals and outputs this value to a maximum pair unit 294.

Figure 63:
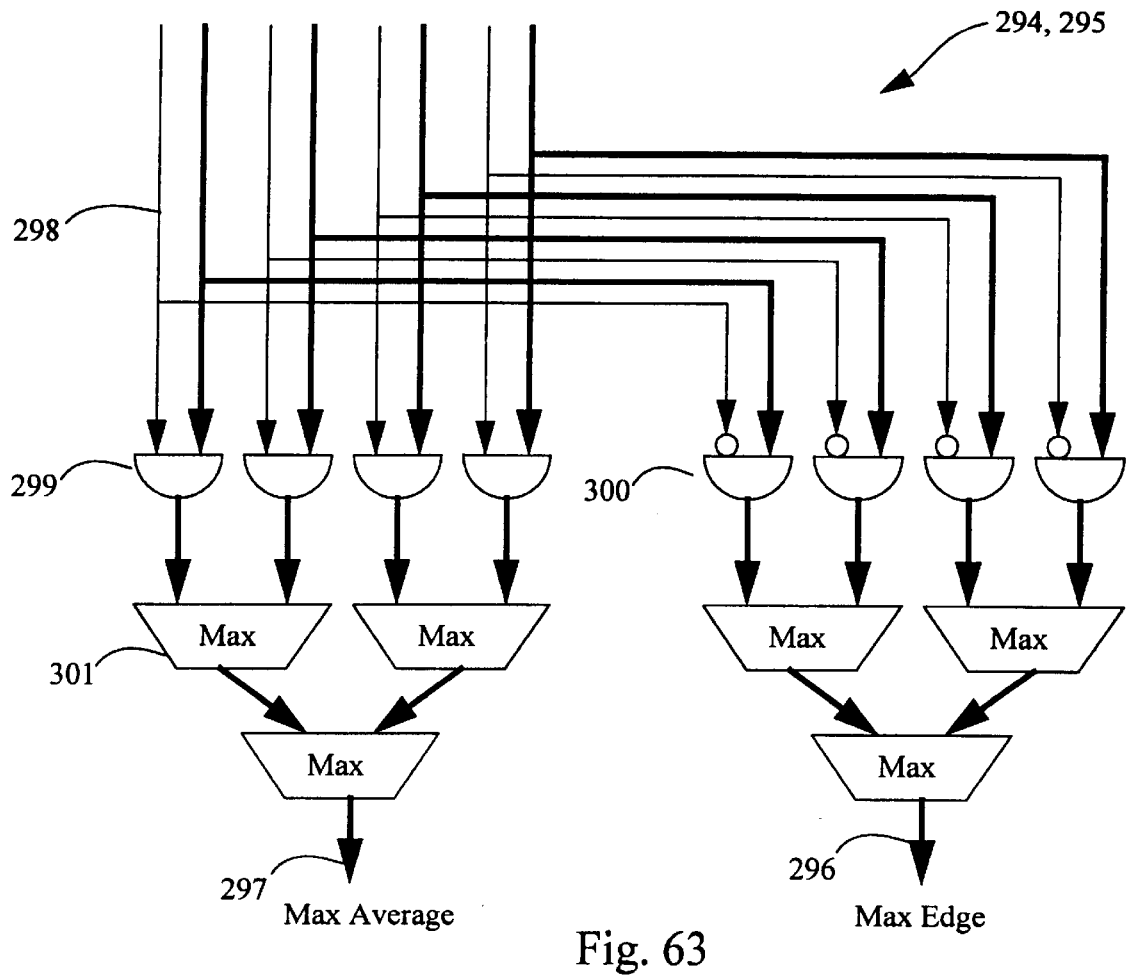
FIG. 63 is a schematic block diagram of the maximum pair unit of FIG. 62.

Referring now to FIG. 63, there is shown the maximum pair unit 294 in more detail. The maximum pair unit determines a maximum edge difference 296 and a maximum average difference 297 amongst the signature difference units. As each signature input to the maximum pair unit 294 contains a type bit 298, the two different types of signatures are extracted by means of AND gates e.g. 299, 300. Further processing by cascading two input maximum units 301 results in the maximum edge difference 296 and maximum average difference 297.

Referring again to FIG. 62, the output from the maximum pair unit 294 is fed, with the output from the other maximum pair unit 294, to one of two maximum signal units 294, 295. The maximum signal units are used to determine the maximum difference value for each line.

Figure 64:
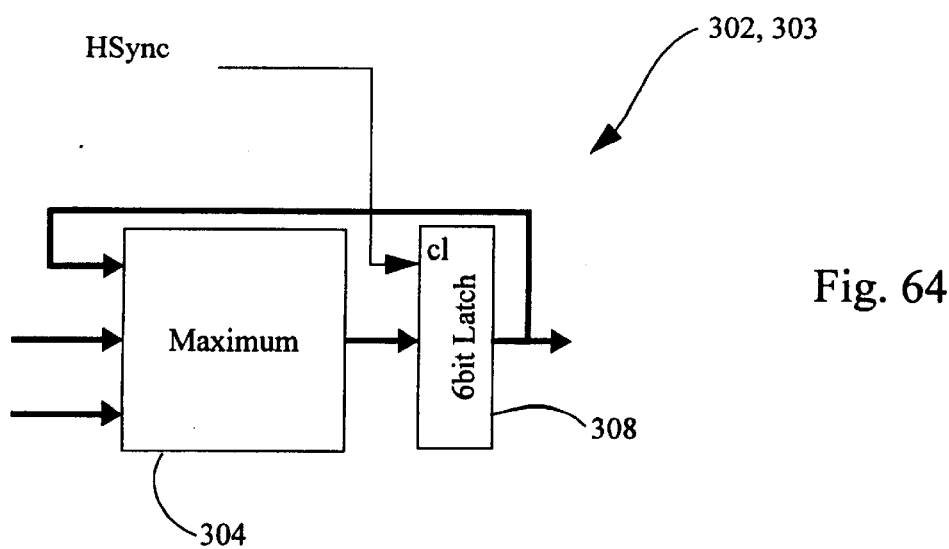
FIG. 64 is a schematic block diagram of the maximum signal unit of FIG. 62.

Referring now to FIG. 64, there is shown one of the maximum signal units 294, 295 in more detail. The maximum signal unit includes a 3 input maximum unit 304 which is similar to that described in FIG. 53 in addition to a latch 308. The 3 input maximum unit 304 and latch 308 determine a maximum priority value for each line with the output of latch being fed back as one of the inputs of the 3 input maximum unit 304. The latch 308 is cleared by the Hsync signal at the end of each line.

After a scanline of signature has been compared the maximum difference for each type are output to the line dispatcher unit 12, and the output latches of the respective maximum signal unit 302, 303 are cleared.

Figure 65:
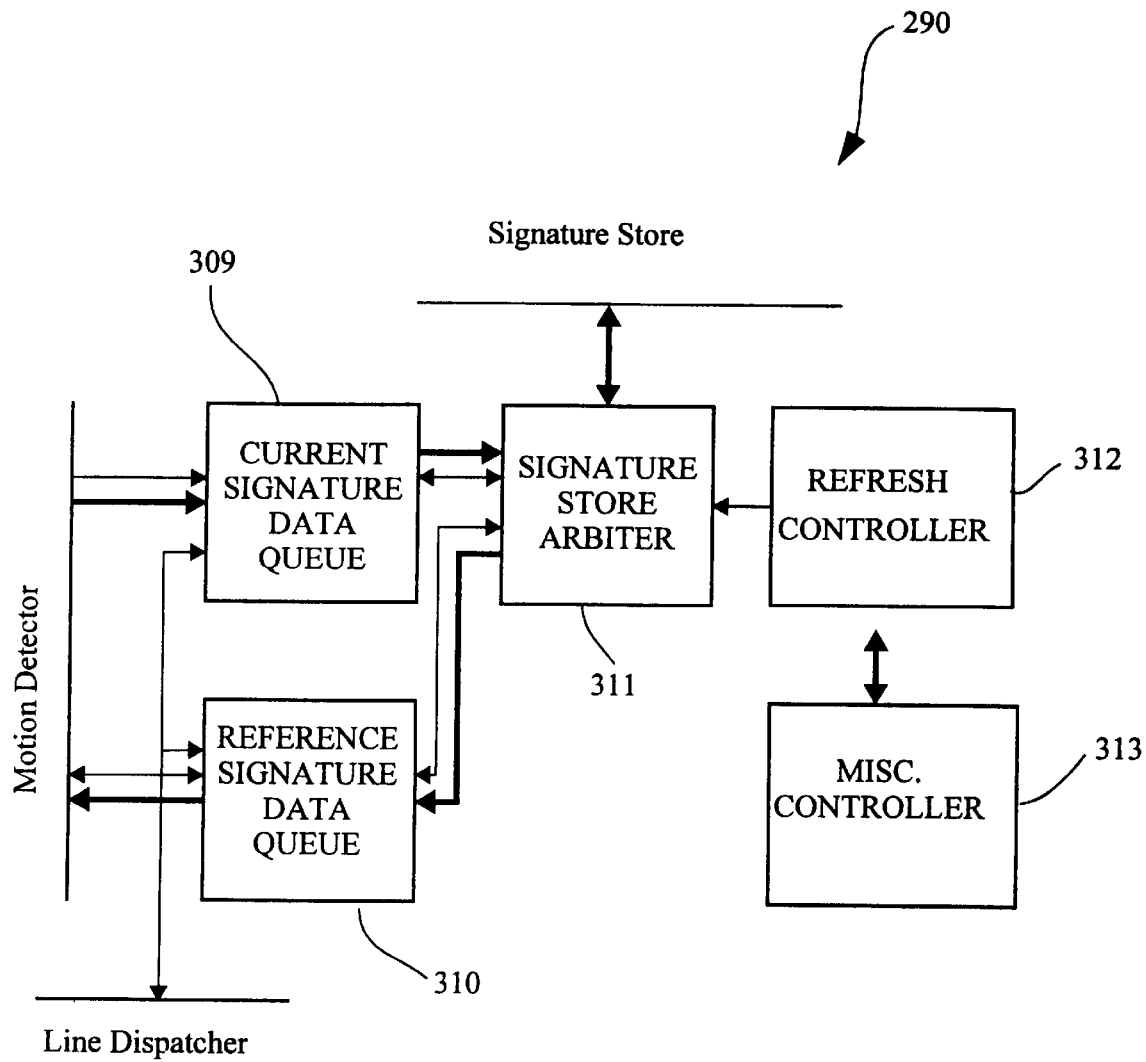
FIG. 65 is a schematic block diagram of the signature store controller of FIG. 42.

Referring now to FIG. 65, there is shown the signature store controller 290 in more detail. The signature store controller 290 is responsible for coordinating all access to the signature store 291 which is a DRAM array for storing previous frames' signatures. The signature store controller 290 consists of a current signature data queue 309, reference signature data queue 310, a signature store arbiter 311, a refresh controller 312 and a miscellaneous controller 313.

The signature store arbiter 311 is responsible for coordinating the contending requests for access to the signature store 291. Each of the contending modules, including current signature data queue 309, reference signature data queue 310, a signature store arbiter 311 and a refresh controller 312 assert a request signal when they require an access. The signature store arbiter 311 services the request, deasserts the request signal and asserts an acknowledge signal.

The current signature data queue 309 queues the current signatures that are written to the signature store 291 by the signature compare unit 289.

The reference signature data queue 310 queues the reference signatures that are read from the signature store 291 by the signature compare unit 289. The miscellaneous controller 313 generates the clock signals necessary to drive the signature store controller 290 and signature store 291.

The "line update priorities" from the motion detection unit 15 are processed by the line dispatcher unit 12 to assess which groups of lines have changed since the image currently being displayed by FLCD display 5.

The line dispatcher unit 12 also maintains a set of "region descriptors", each of which controls the update to the FLCD display 5 of a set of contiguous lines. The line update priorities are used to decide when to add and delete update regions as well as to define some relevant region properties, such as interlace pattern.

Whenever an active region has been defined, the line dispatcher unit 12 notifies the frame store controller 7 to switch the frame store 6 double buffers, so that the most recent video data is available for dispatch to the FLCD display 5 in addition to notifying the motion detection unit 15 to also switch its corresponding signature double buffers. Hence, the motion detection unit 15 and frame store 6 double buffers are switched in unison when new motion has been detected.

Figure 66:
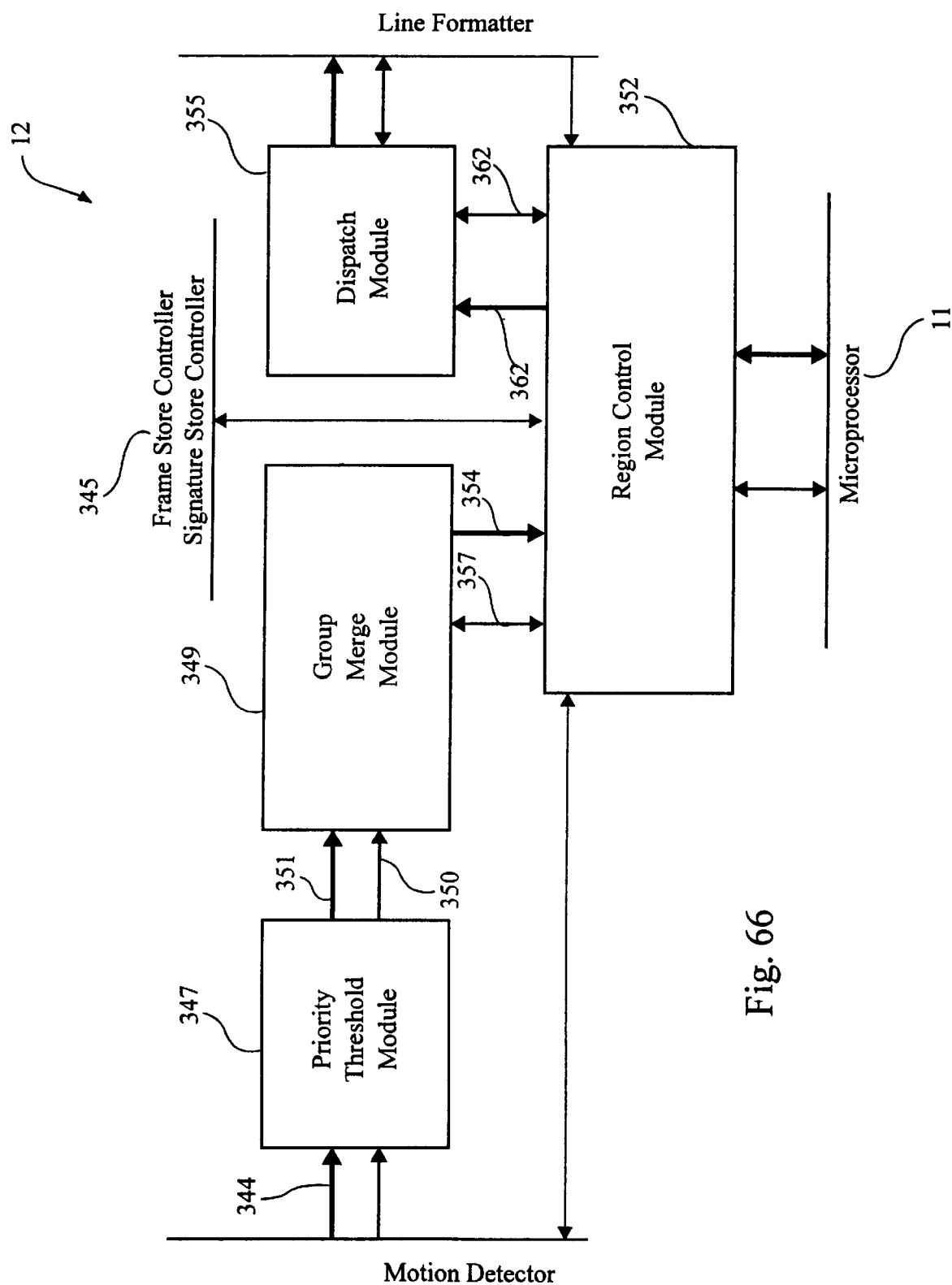
FIG. 66 is a schematic block diagram representation of the line dispatcher of FIG. 2.

Referring now to FIG. 66 there is shown the line dispatcher unit 12 in more detail. It consists of a priority threshold module (PTM) 347, group merge module (GMM) 349, region control module (RCM) 352 and dispatch module (DM) 355.

The priority threshold module 347 receives line priorities 344 from the motion detector 15, combines these line priorities into group priorities, and sends to the group merge module 349, any groups whose priority is greater than a predetermined noise threshold. The GMM 349 receives group priorities from the PTM 347 and forms regions from the new group priorities and the stored history of previous group priorities. It then determines which regions should be dispatched and sends these regions to the region control module 352. The RCM 352 receives regions from the GMM 349 and passes these regions to the initialization and control microprocessor 11 (FIG. 2) to store in a motion list. At the start of a dispatch cycle, the microprocessor 12 transfers the contents of the motion list to a dispatch list. During a dispatch cycle, the RCM receives regions from the microprocessor and passes these regions to the Dispatch Module (DM) 355. The DM receives regions from the dispatch list and sends the set of lines in each region to the line formatter 71 to be updated on the FLCD display 5. The order in which the constituent lines of a region are sent to the line formatter is determined by the microprocessor 11. The DM may also receive regions directly generated by the microprocessor, corresponding to a set of lines used to refresh the FLCD display 5.

Figure 67:
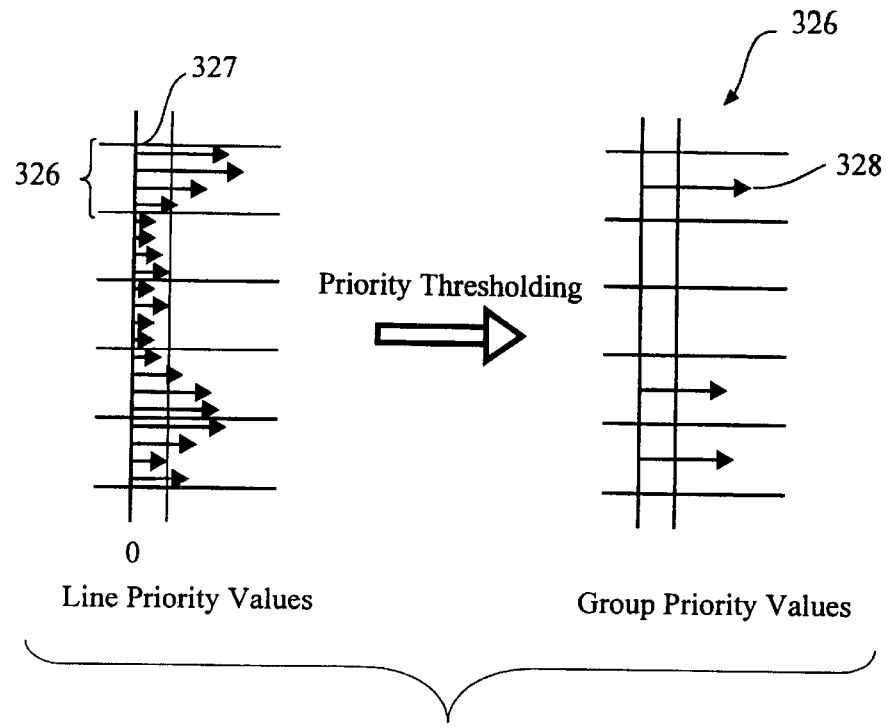
FIG. 67 illustrates the process of determining motion within groups of lines of an input image.

Referring now to FIG. 67, the process of group merging is shown. The presence of noise on the output of the analogue to digital conversion unit 10 will cause small variations in the line priorities received from the motion detection unit 15. The line dispatcher unit 12 is required to threshold the line priorities from the motion detection unit 15 before using them to select lines to be dispatched.

Line priorities from the motion detection unit 15 are examined in units of 'groups' with a group 326 being of programmable length (being 4, 8, 16 or 32 lines). For the purpose of explanation, the length of each group will be taken to be four lines. A value corresponding to an edge and average priorities for each line are compared with a set of corresponding programmable thresholds 327. The resulting detection group priority 328 is either zero (if none of the input line priorities was greater than the corresponding threshold), or the maximum of the priorities of the lines in that detection group. If the detection group priority 328 is greater than zero, then it is said that motion has occurred in that detection group.

A secondary function of the line dispatcher unit 12 is to detect regions of long-lived motion (that is movie regions) and to dispatch each complete movie region as an atomic unit to ensure that the movie is not "torn" due to updating some parts of the movie region and not others. This secondary function is achieved by storing attributes for each group of lines in an array, and by merging adjacent (or nearly adjacent) groups with certain attributes.

Each group has three attributes: Motion attribute, Movie attribute and Still attribute.

A group's motion attribute is set if motion has occurred on that group in the current dispatch cycle.

A group's movie attribute is set if motion has occurred in that group in the current dispatch cycle or a prior dispatch cycle. The movie attribute has an associated number (called the "time-alive") which records a multiple of the number of dispatch cycles (not necessarily consecutive) for which there has been motion on that group. The time-alive attribute saturates at a programmable maximum value.

A group's still attribute is set if there has been an absence of motion in that group for a number of consecutive dispatch cycles. The still attribute has an associated number (called the "time-dead") which records a multiple of the number of consecutive dispatch cycles for which there has been no motion on that group. The time-dead attribute saturates at a programmable maximum value.

If a group has both the movie attribute set, and the still attribute set, and the group's time-dead is greater than or equal to the group's time-alive, then the group's movie attribute is reset and the time-alive is reset to zero. The group's still attribute and time-dead are not changed, but will be reset the next time motion is detected for the group.

Any groups that are within a programmable spacing of one another, and have the movie attribute set, and also have either the motion attribute set or the difference between time-alive and time-dead greater than a programmable threshold, are then merged to form regions. These regions are then expanded by adding a programmable number of groups to form the start and end of a region.

Figure 68:
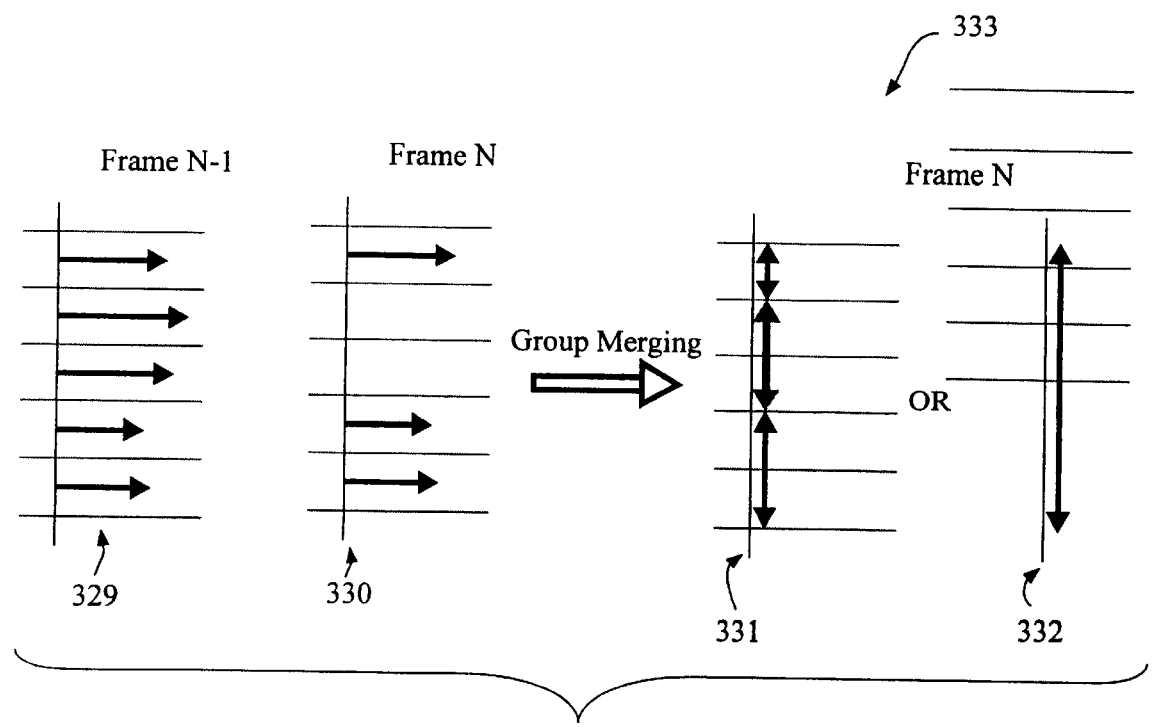
FIG. 68 illustrates the process of merging groups of lines into regions.

Referring now to FIG. 68, there is shown an example of the region formation process, whereby motion within groups is analysed over multiple frames 329, 330, so as to form regions 331, 332 with the actual regions formed being dependant on the predetermined programmable parameter values.

The regions are stored in a motion list within the initialization and control microprocessor 11. At the start of a new dispatch cycle, regions are transferred from the motion list to a dispatch list in preparation for dispatch to the line formatter 71.

All the lines for the selected regions in the dispatch list are sent to the line formatter 71 in either a sequential or an interleaved order. Each region may be interleaved in isolation before moving on to the next region, or the complete set of regions may be interleaved in sequence. The interleave factor can be set to a number between 1 and 127 for each region.

Figure 69:
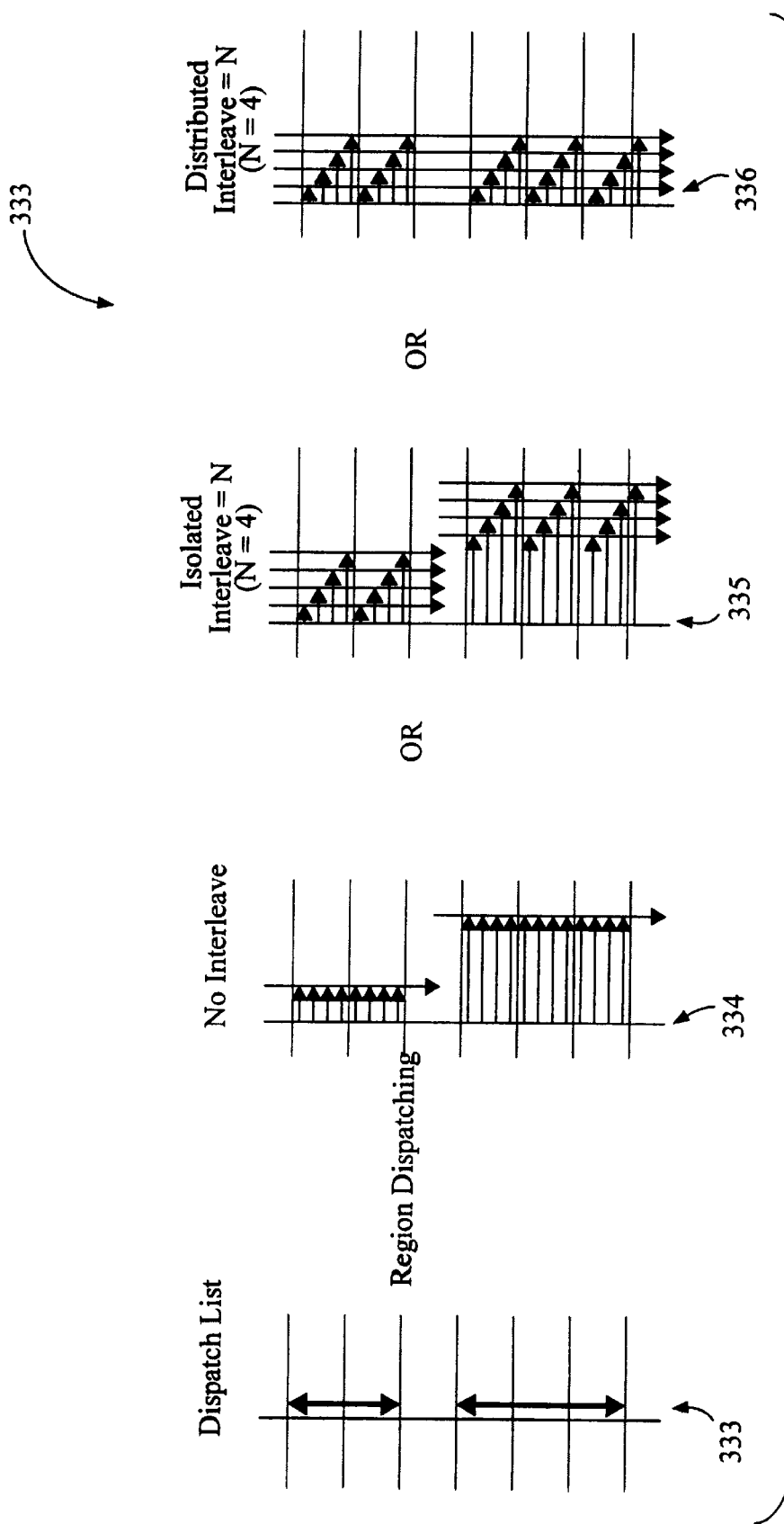
FIG. 69 illustrates the various methods of dispatching lines for display.

Referring now to FIG. 69, there is shown the different methods of dispatching lines to the line formatter 71. Given a set of regions 333, the corresponding lines can be dispatched on a line by line basis with no interleaving 334, or they can be dispatched in two different interleaving patterns being isolated interleaving 335 and distributed interleaving 336. In isolated interleaving 335 each region is dispatched in an interleaved fashion, with a first region being totally dispatched before any subsequent region is dispatched. In distributed interleaving 336 portions of each region are dispatched in an interleaved fashion.

The writing to and reading from the buffers is controlled by the line dispatcher unit 12 on a group-by-group basis. As mentioned previously, to enable the old data for lines in a frame to be dispatched while the new data for those lines is stored, two buffers are used. The writing to and reading from the read and write frame buffers is controlled by the line dispatcher unit 12 on a group-by-group basis.

Figure 70:
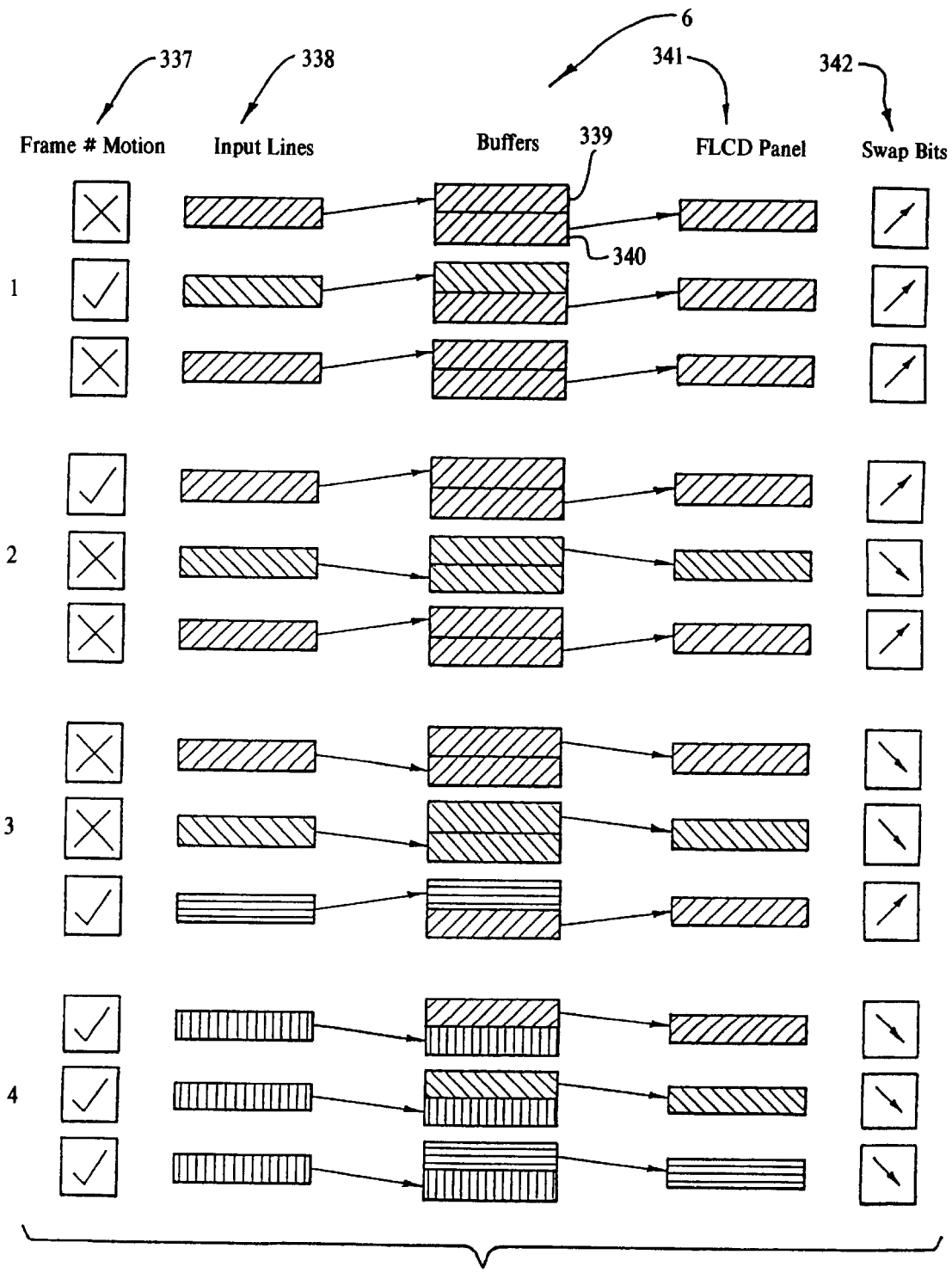
FIG. 70 illustrates the interaction with the line dispatcher unit with a double buffered frame buffer.

Referring now to FIG. 70, there is shown the allocation of lines to read and write buffers for a set of four incoming frames numbered 1 to 4. The illustration includes a motion indicator 337, an indicator of the input line contents 338, the frame buffer contents including current write buffer contents 339 and current read buffer contents 340, current FLCD panel contents 40 and swap bit indicator 342. For clarity of illustration, only three lines are shown for each frame are shown.

The incoming lines for frame #1 are written into the buffers according to the swap bit settings. This means that the incoming lines will be written to buffer 0 (339), and the outgoing lines will be read from buffer 1 (340). The second line of frame #1 is selected for dispatch in the next dispatch cycle, causing the second swap bit to again be toggled during the dispatch cycle boundary at the end of frame #1.

The incoming lines for frame #2 are written into the buffers according to the swap bit settings. Lines 1 and 3 are written to buffer 0, and line 2 is written to buffer 1. At the same time, the line selected from the previous frame (line 2 from frame #1) is read from buffer 0 and dispatched to the FLCD display 5. The first line of frame #2 is selected for dispatch in the next dispatch cycle, causing the first swap bit to be toggled during the dispatch cycle boundary at the end of frame #2.

In the third frame, line 3 is written to buffer 0 and lines 1 and 2 are written to buffer 1. At the same time, the line selected from the previous frame (line 1 from frame #2) is read from buffer 0 and dispatched to the FLCD display 5. The third line of frame #3 is selected for dispatch in the next dispatch cycle, causing the third swap bit to be toggled during the dispatch cycle boundary at the end of frame #3.

In the fourth frame, all three lines are written to buffer 1. At the same time, the line selected from the previous frame (line 3 of frame #3) is read from buffer 0 and dispatched to the FLCD display 5.

It should therefore be noted that the incoming frame can always be stored in the buffers without overwriting the data that is currently displayed on the FLCD display 5.

Figure 71:
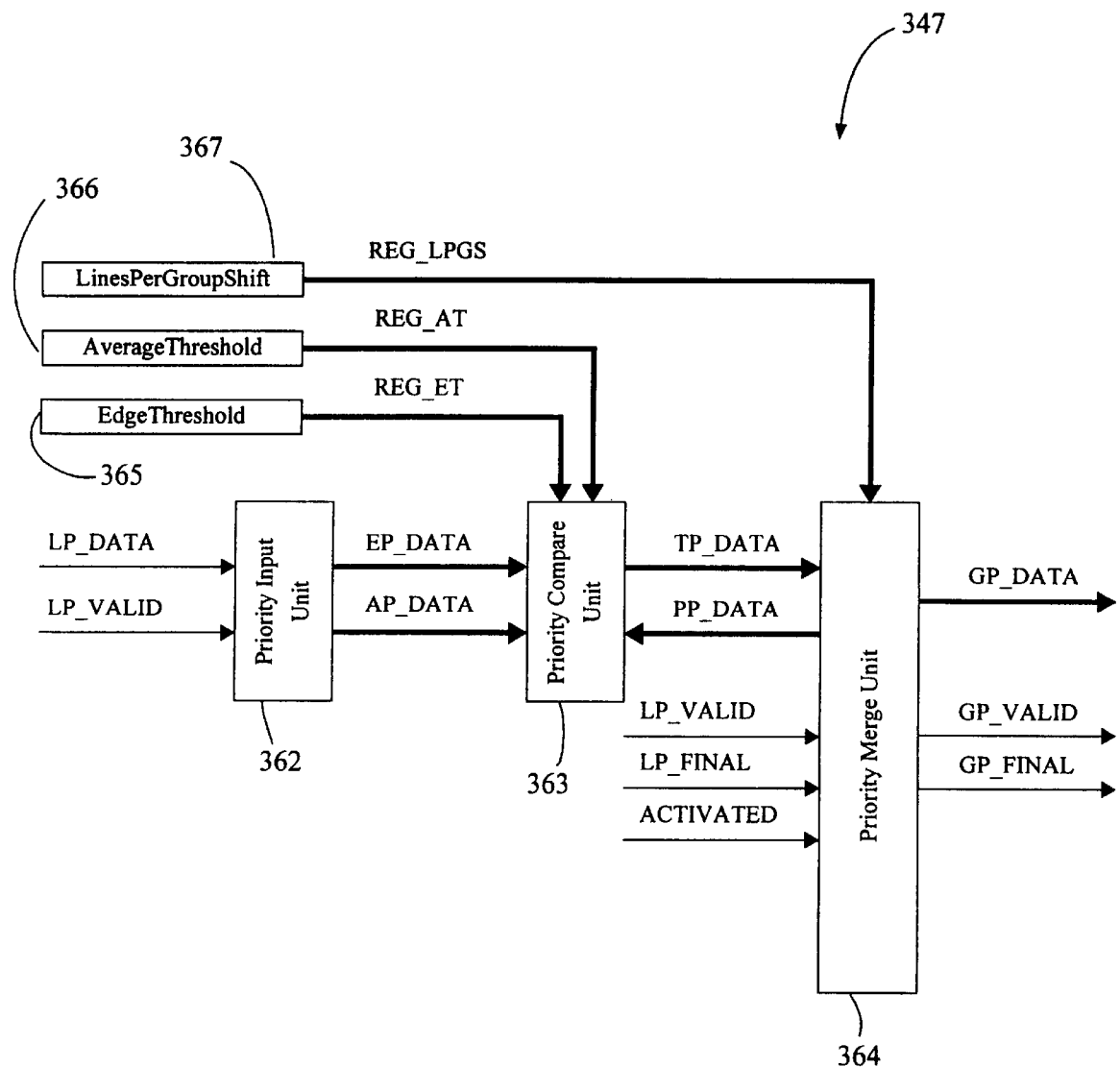
FIG. 71 is a schematic block diagram of the priority threshold module of FIG. 66.

Referring now to FIG. 71, there is shown the Priority Threshold Module (PTM) 347 which includes a priority input unit 362, a priority compare unit 363 and a priority merge unit 364.

The priority input unit 362 latches incoming line priorities (LP_DATA) from the motion detector and combines these to form group priorities. The incoming line priorities are in the form of edge priority values (EP_DATA) and average priority values (AP_DATA), forwarding them to the priority compare unit 363.

The priority compare unit 363, takes these inputs and outputs on TP_DATA to the priority merge unit 364, the largest of:

(1) zero;
(2) the edge priority values, if the edge priority values are greater than the value stored in a edge threshold register 365;
(3) the average priority values, if the average priority values are greater than the value stored in an average thershold register 366; and
(4) the current group priority value (PP_DATA).

Figure 72:
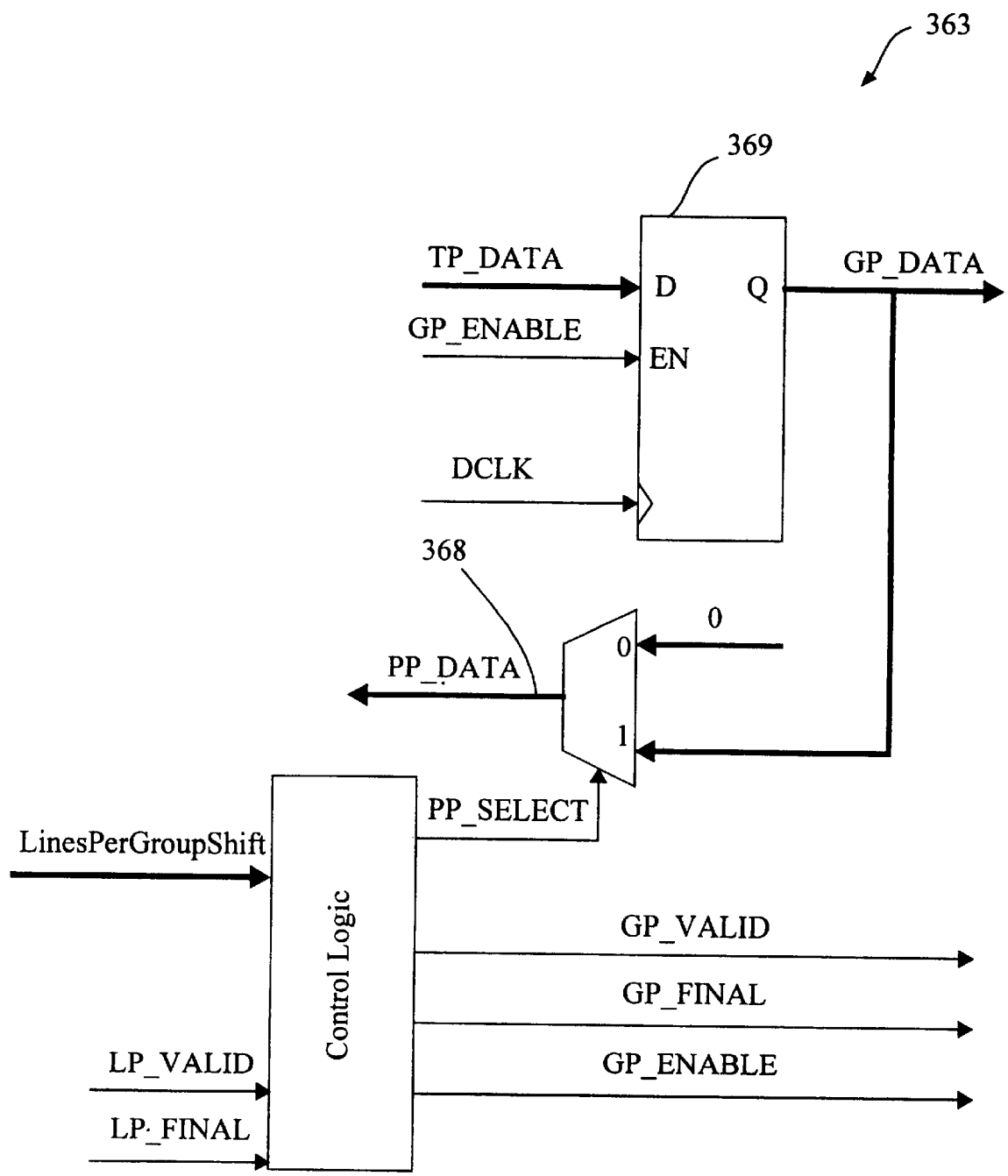
FIG. 72 is a schematic block diagram of the priority merge unit of FIG. 66.

Referring now to FIG. 72, there is shown, in more detail, the priority merge unit 364. The priority merge unit 364 initially zeros its PP_DATA data output 368 in readiness for the first line of a group. The value determined by the priority compare unit 363 is received by latch 369 (TP_DATA) and transferred to PP_DATA and GP_DATA for each line in the group. At the end of each group, the GP_VALID and GP_FINAL signals are generated and output along with the current group data (GP_DATA) and forwarded to the group merge module 349 (FIG. 66).

Figure 73:
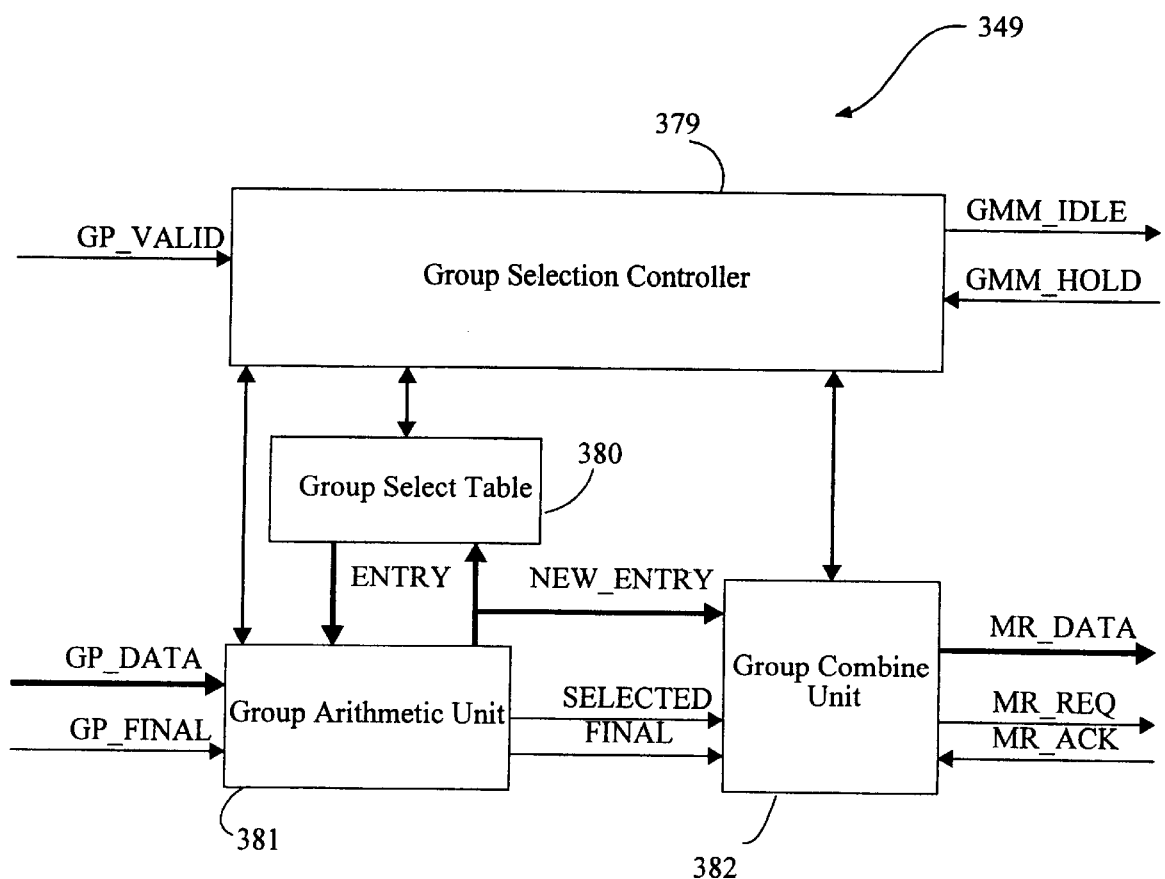
FIG. 73 is a schematic block diagram of the group merge module of FIG. 66.

Referring now to FIG. 73 the Group Merge Module (GMM) 349, is shown in more detail. The GMM 349 accepts the current group priority value and addresses from the PTM 347 and, in conjunction with previous group priorities, determines if the group should be combined into a region for forwarding to the RCM 352. The group merge module 349 consists of a group selection controller 379, a group selection table 380, a group arithmetic unit 381 and a group combining unit 382.

As mentioned previously, each group has three attributes which are stored in group selection table 380 and used in the creation of regions. The group selection table 380 consists of a 256 word RAM with each word consisting of 16 bits, and is used to store the attributes of each group being:

(1) MOTION: Set if motion has occurred on the group in the current dispatch cycle;.
(2) MOVIE: Set if motion has occurred on the group is the current dispatch cycle or a prior dispatch cycle;
(3) TIME_ALIVE: A 6 bit number being a multiple of the number of dispatch cycles (not necessarily consecutive) for which there has been motion on the group;
(4) STILL: Set if there has been an absence of motion on the group for a number of consecutive dispatch cycles;
(5) TIME_DEAD: 6 bit number being a multiple of the number of consecutive dispatch cycles for which there has been no motion on the group; and
(6) SPARE: Undefined.

The group arithmetic unit 381 uses the entry in the group selection table 380 and the priority of the incoming group to calculate NEW_ENTRY information to be stored in the group selection table 380. The new entry is calculated according to the following Pseudo Code:

```
if(GP_DATA>0) {
    MOTION = 1;
    MOVIE = 1;
    TIME_ALIVE = MIN(MovieMaximum, TIME_ALIVE[5:0] +
            MovieIncrement);
    STILL = 0;
    TIME_DEAD[5:0] = 0;
}
else {
    MOTION = 0;
    STILL = 1;
    TIME_DEAD = MIN(StillMaximum,TIME_DEAD +
    StillIncrement);
}
if (MOVIE && STILL) {
    if (TIME_DEAD >=TIME_ALIVE) {
        MOVIE = 0;
        TIME_ALIVE = 0;
    }
}
```

The group aritlunetic unit 381 also determines whether a group should be selected for update or not, generating a SELECTED signal for the group combining unit 382 according to the following criteria:

```
if (MOVIE &&
    (MOTION ||((TIME_ALIVE - TIME_DEAD)>SelectThreshold))) {
        SELECTED = 1;
}
else {
        SELECTED = 0;
}
```

Figure 74:
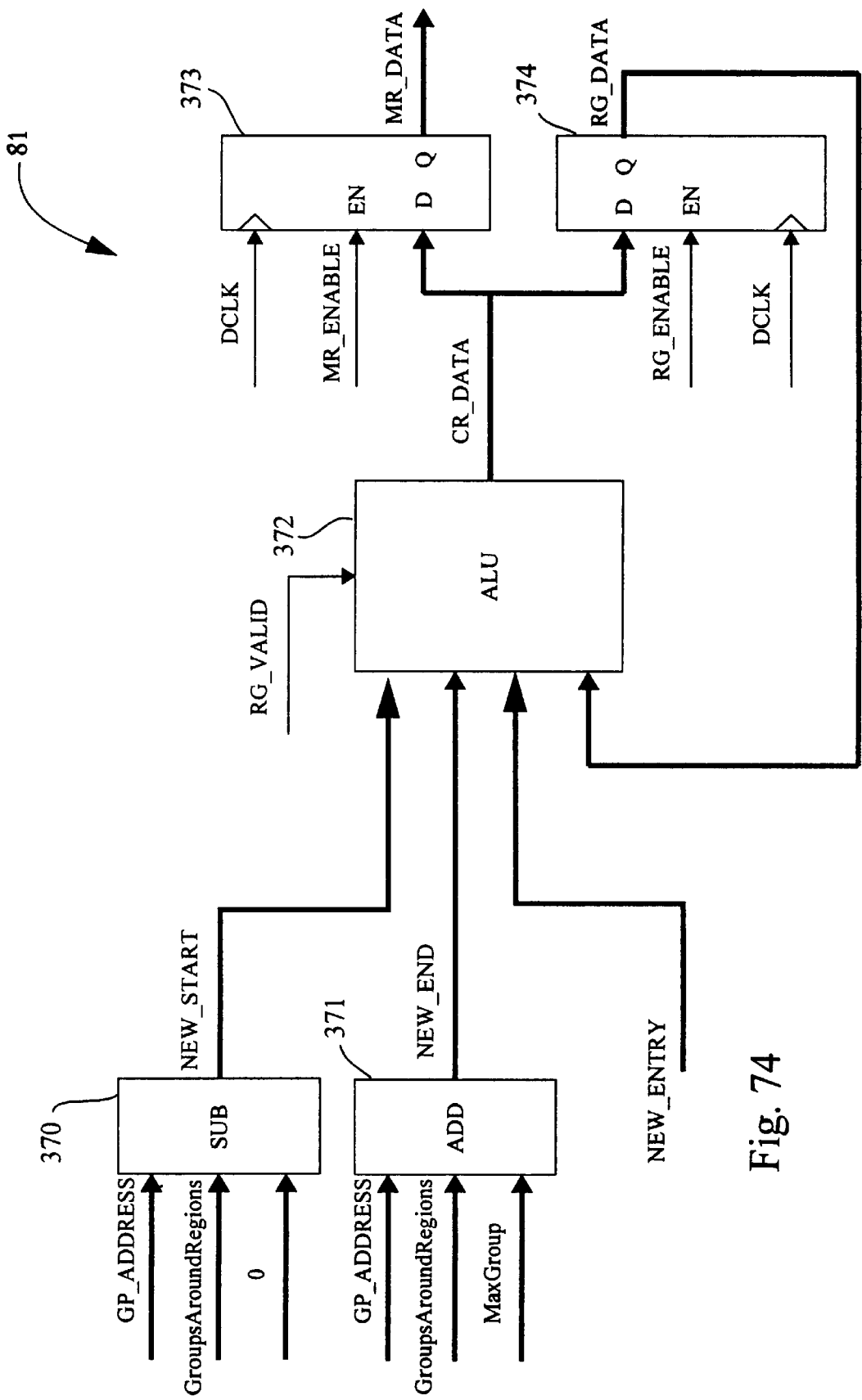
FIG. 74 is a schematic block diagram of the group combined unit of FIG. 73.

Referring now to FIG. 74, there is shown the group combining unit 382, which combines selected groups into regions and passes these regions to the region control module 352. The group combining unit 382 utilizes a number of internal registers (not shown) which store the value of the desired 'GroupsBetweenRegions' and 'GroupsAroundRegions'. Selected groups are combined if they are within (GroupsBetweenRegions+2*GroupsAroundRegions) of each other. If GroupsBetweenRegions is zero, then no groups are merged (i.e. each region contains one group only). After all possible groups for one region have been combined, the region is then expanded by adding GroupsAroundRegions groups to the start and end of the region.

A region (RG_DATA, CR_DATA) consists of the following information:

START: The region start group address;
END: The region end group address;
PRIORITY: The maximum of each GP_DATA of each group within a region;
MOTION: Set if any of the region's selected groups MOTION attributes are set;
TIME_DIFF: The maximum of the absolute difference between TIME_ALIVE and TIME_DEAD for the selected groups of a region;
MOVIE: Set if any of the region's selected group MOVIE attributes are set; and
STILL: Set if any of the region's selected group STILL attributes are set.

The group combining unit 382 utilises a number of internal signal groups. These signal groups are formed as follows:

NEW_START is formed by subtraction unit 370 by first subtracting GroupsAroundRegions from GP_ADDRESS and taking the maximum of the resultant and zero; and NEW_END is formed by addition unit 371 by taking the addition of GP_ADDRESS and GroupsAroundRegions and comparing it to the value MaxGroupInFrame.

The values for NEW_START, NEW_END and NEW_ENTRY are fed to an arithmetic logic unit (ALU) 71 in addition to the previous region's information (RG_DATA). Together these values form a new current region (CR_DATA). Regions will include attributes calculated from the group attributes of the selected groups comprising the region (before expansion by GroupsAroundRegions) The new current region can then replace the old region (RG_DATA) on the occurrence of a RG_ENABLE and the data can be driven out (MR_DATA) to region control module 352 on the occurrence of an MR_ENABLE.

Referring again to FIG. 73, the group selection controller 379 coordinates the operation of the group arithmetic unit 381, group selection table 380 and group combining unit 382. Once the group merge module 349 has formed a region, it is output to the initialization and control microprocessor 11 via region control module 352.

The initialization and control microprocessor 11 has two lists, namely a current input region list and a current output region list. The initialization and control microprocessor 11, receives regions from the GMM 349 and stores these regions in a current input region list. When received regions overlap with previously received regions already stored in the current region list, the initialization and control microprocessor 11 amalgamates the two overlapping regions to form one contiguous region which is stored in the current input region list. Regions are stored by incremental line orderings. The initialization and control microprocessor 11 also contains a current output region list for dispatching regions to the DM 355.

Figure 75:
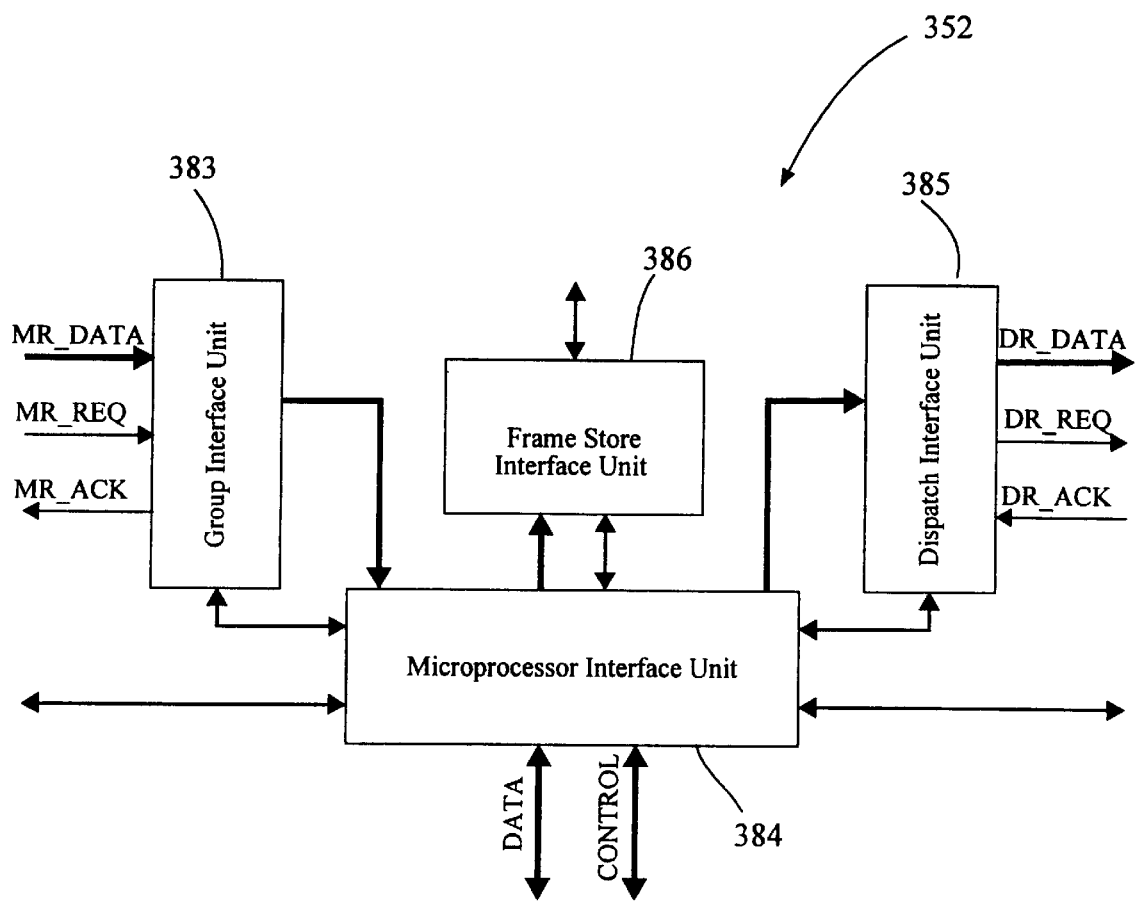
FIG. 75 is a schematic block diagram of the region control module of FIG. 66.

Referring now to FIG. 75 there is shown the schematic block diagram of the region control module 352. The region control module 352 acts as a microprocessor interface and is responsible for receiving regions from the group merge module 349 and forwarding them to the initialization and control microprocessor 11, in addition to receiving regions from the initialization and control microprocessor 11 and forwarding them for dispatch to the dispatch module 355. The region control module 352 consists of a group interface unit 383, a microprocessor interface unit 384, a dispatch interface unit 385 and a frame store interface unit 386.

The group interface unit 383 acts as a double buffer for regions received from the group merge module 349. This is to ensure that the interrupt latency of the initialization and control microprocessor 11 does not cause overrun errors in the group merge module 349.

The dispatch interface unit 385 acts as a double buffer for regions sent to the dispatch module 355. This is to ensure that the interrupt latency of the microprocessor 55 does not cause the line formatter 71 to become idle in the middle of a dispatch cycle.

The frame store interface unit 386 handles the interface between the frame store controller 7 and the line dispatcher unit 12.

The microprocessor interface unit 384 allows the initialization and control microprocessor 11 to receive regions from the group merge module 349 and to dispatch regions to the dispatch module 355. It also gives the initialization and control microprocessor 11 access to and control over a number of signals to and from the group merge module 349, dispatch module 355, motion detection unit 15 and frame store controller 7.

Referring again to FIG. 66, the dispatch module 355 receives regions from the region control module 352 and generates dispatch addresses for the line formatter 71. This is achieved by taking the start and end addresses which are stored in each region and an interleave factor for the region to be dispatched, forwarded from the initialization and control microprocessor 11, and then generating a sequence of line addresses for the region. The dispatch module 355 operates under the control of the microprocessor via the dispatch module 355, with its actions being dependent on the nature of the current dispatch cycle. All the lines for the selected regions in the dispatch list are sent to the line formatter 71 in either a sequential or an interleaved order. Each region may be interleaved in isolation before moving on to the next region, or the complete set of regions may be interleaved as a group. The interleave factor can be set to a number between 1 and 127 for each region. All the lines for the selected regions in the dispatch list are sent to the line formatter 71 in either a sequential or an interleaved order. Each region may be interleaved in isolation before moving on to the next region, or the complete set of regions may be interleaved as a group. The interleave factor can be set to a number between 1 and 127 for each region.

Regions are stored in a motion list in the initialization and control microprocessor 11. At the start of a new dispatch cycle, regions are transferred from the motion list to a dispatch list in preparation for dispatch to the line formatter 71. The dispatch list also being stored within the initialization and control microprocessor 11.

The actual methodology used to dispatch lines to the screen is therefore totally programmable within the initialization and control microprocessor 11, thereby maximizing the systems flexibility. In the simplest case, the regions transferred to the dispatch list will be identical to the regions on the motion list from which they were derived. There are other more complex cases possible, and one such example will now be described with reference to FIG. 76.

In this dispatch method the initialization and control microprocessor 11 usually relies on a number of different modes, the modes being as follows:

No Update Mode: When no lines have been selected for update, the initialization and control microprocessor 11 does not need to dispatch any lines to the FLCD display 5.

Partial Update Mode: When a region has been selected for update, then the initialization and control microprocessor 11 will instigate a dispatch cycle that will dispatch that set of lines to the FLCD display 5. The set of lines which were not selected for dispatch will retain their old data.

Background Refresh Mode: When a particular line is written to the FLCD display 5, the action of writing that line may degrade the storage capabilities of all other lines on the FLCD display 5. Therefore, all other lines that have previously been written to the FLCD display 5 are periodically re-written (or refreshed), to ensure that the degradation of the storage capabilities does not reach the point where it would impair the visual quality of the displayed lines.

Figure 76:
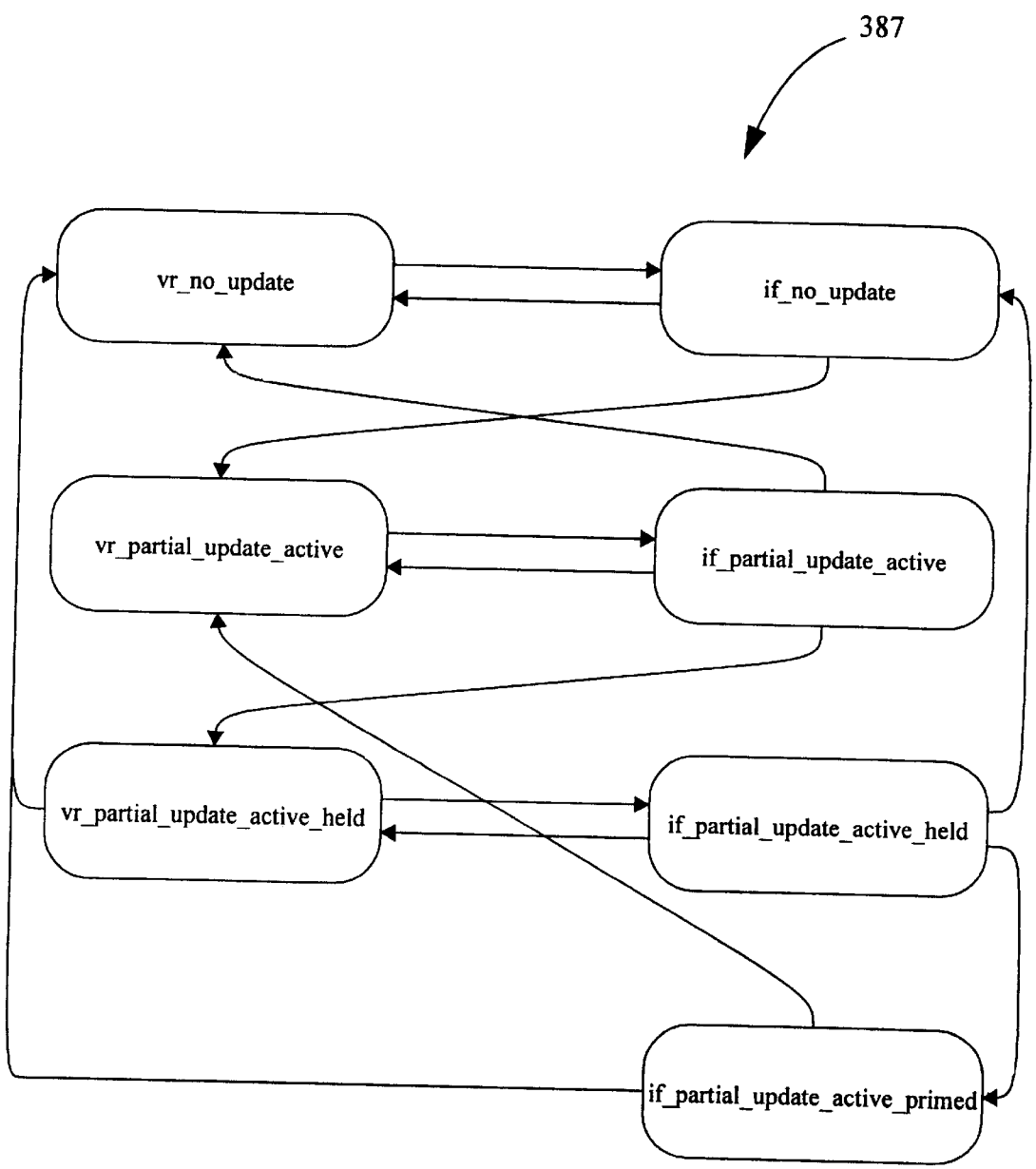
FIG. 76 illustrates a state machine implemented by the microprocessor to control updating of the display.

Additionally, the dispatch method is implemented in the form of a state machine as shown in FIG. 76.

A vr_no_update state is entered at the start of the vertical retrace period which is denoted by both the initialization and control microprocessor 11, render and signature queues becoming idle An if_no_update_state is entered when no lines have been selected for dispatch, and either the render or signature queue becomes busy (signalling the end of the vertical retrace period). If a set of lines has been selected for dispatch at the start of the next vertical retrace period, then a vr_partial_update active state will be entered at the start of the next vertical retrace period. If no lines have been selected for dispatch at the start of the next vertical retrace period, then the vr_no_update state will be entered at the start of the next vertical retrace period.

A vr_partial_update_active state is entered when a set of lines has been selected for dispatch. Note that no data is written to either the frame buffer or the signature buffer during the vertical retrace period. A if_partial_update_ active state is always to be entered at the end of the vertical retrace period.

The if_partial_update_active state is entered when a set of lines has been selected for dispatch. If the dispatch is completed before the start of the next vertical retrace period, either the vr_no_update state or the vr_partial_update_ active state will be entered at the start of the next vertical retrace period. If the dispatch is not completed before the start of the next vertical retrace period, then a vr_partial_ update_active_held state will be entered at the start of the next vertical retrace period.

The vr_partial_update_active_held state is entered at the start of the vertical retrace period when a dispatch has been started, but has not been completed. If the dispatch is completed before the end of the vertical retrace period, then the vr_no_update state will be entered at the end of the vertical retrace period. If the dispatch is not completed before the end of the vertical retrace period, then the if_partial_update_active_held state will be entered at the end of the vertical retrace period.

The if_artial_update_active_held state is entered at the end of the vertical retrace period when a dispatch has been started in a previous frame, but has not been completed. If the dispatch is completed before the start of the next vertical retrace period, then either the if_no_update state or the if_partial_update_active_primed states will be entered when the dispatch is completed. If the dispatch is not completed before the start of the next vertical retrace period, then the vr_partial_update_active_held state will be entered at the start of the next vertical retrace period.

A if_partial_update_active_primed state is entered when a dispatch is completed in the middle of a frame, and a set of lines has been selected for dispatch. If the dispatch is completed before the start of the next vertical retrace period, then the vr_no_update state will be entered at the start of the next vertical retrace period. If the dispatch is not completed before the start of the next vertical retrace period, then the vr_partial_update_active state will be entered at the start of the next vertical retrace period.

The foregoing describes a colour display system capable of taking input intended for a full colour display, capable of displaying an image at a high refresh rate, and displaying the image on a display having a reduced number of displayable colours and a lower refresh rate.

The foregoing also describes only a number of embodiments of the present invention and modifications, obvious to those skilled in the art, can be made thereto without departing from the scope of the present invention.

We claim:

1. A display system for displaying a continuous tone image on a display device having a plurality of pixels arranged in a plurality of lines, each pixel being capable of displaying a finite number of different colours, said system comprising:

analogue input means adapted to receive an analogue input signal representing a continuous tone image to be displayed;

converter means adapted to receive analogue colour information from said analogue input signal and to produce a corresponding digital representation of said analogue colour information for each pixel to be displayed;

halftoning means adapted to receive said digital representation from said converter means and to produce a corresponding halftoned current output pixel value for each one of said plurality of pixels of the display device;

frame store means adapted to store said current output pixel values from said halftoning means;

line update means adapted to receive said digital representation for at least one said line and to divide said one line into a plurality of groups of pixels and to produce a corresponding signature for each of said groups, said corresponding signatures being stored in a signature storage means, said line update means being configured to compare said corresponding signature with a previous corresponding signature from said signature storage means so as to determine if the corresponding said group requires changing on said display device; and frame store controlling means adapted to receive information from said line update means as to whether a group of pixels requires changing and for causing said frame store means to write out at least the corresponding said current output pixel values to said display device.

2. A display system as defined in claim 1, further comprising parameter storage means adapted to store model specific parameters for use by the display system.

3. A display system as defined in claim 2, wherein said analogue input means further comprises said parameter storage means.

4. A display system as defined in claim 1, further comprising timing means adapted for image synchronization in the display system.

5. A display system as defined in claim 4, wherein said analogue input means further comprises said timing means.

6. A display system as defined in claim 1, wherein said analogue colour information includes separate channels of red, green and blue information, respectively.

7. A display system as defined in claim 1, wherein said output pixel values include separate values for red, green, blue and white output levels.

8. A display system as defined in claim 1, wherein said analogue input means further comprises control separation means adapted to separate display control formation from said analogue colour information.

9. A display system as claimed in claim 1, wherein each said group of pixel values comprises values intended to display a line of pixels on said display device.

10. A display system according to claim 1, wherein said corresponding signature comprises a weighted summation of pixel values within said group.

11. A display system according to claim 10, wherein a predetermined difference is required between said corresponding signature and said previous corresponding signature in order to require changing of the corresponding group of pixels.

12. A display system as claimed in claim 1, wherein said halftoning means is configured to error diffuse each of said plurality of pixels to determine a corresponding said current output pixel value, and said signature comparison determines a signature for each said group of pixels by calculating a weighted summation of said pixels within said group and compares a current signature with a previous signature for the corresponding group to determine an amount of change, said changing of output pixels occurring when the amount of change between said signatures exceeds a predetermined value.

13. A display system as claimed in claim 1, wherein at least said corresponding output pixel values comprise halftoned output pixel values corresponding to at least said one line.

14. A method of displaying an image having a plurality of pixels arranged in a plurality of lines, said method comprising the steps of:

inputting colour information of each of a plurality of pixels in an analogue format;

converting the colour information from the analogue format to a corresponding digital format for each said pixel;

halftoning said digital information of each said pixel using a plurality of said pixels to produce output colour information;

dividing each line of said image into a plurality of groups of said pixels and determining a corresponding signature for each of said groups, each said signature being calculated from said pixels within said group;

determining those portions of the colour information that have changed by comparing a current signature of said groups with a previous signature of the corresponding group; and outputting said output colour information corresponding to at least those groups where it has been determined that said colour information has changed.

15. A method as defined in claim 14, wherein said determining step further comprises the step of comparing said output colour information with previously stored output colour information to determine if said colour information has changed.

16. A method as defined in claim 15, further comprising the step of storing said output colour information so that it becomes said previously stored output colour information.

17. A method as defined in claim 14, wherein colour and intensity information is input in the inputting step, colour and intensity information is converted in the converting step, colour and intensity information is produced in the halftoning step, colour and intensity information is determined in the determining step, and colour and intensity information is output in the outputting step.

18. A method as defined in claim 17, wherein the determining step further comprises the step of comparing said output colour and intensity information with previously stored output colour and intensity information to determine if said colour and intensity information is changed.

19. A method as defined in claim 18, further comprising the step of storing said output colour and intensity information so that it becomes said previously stored output colour and intensity information.

20. An arrangement for displaying video images, said arrangement comprising:

signal means for providing a video input signal having colour and intensity information contained therein capable of producing a variable intensity continuous tone image using colours obtained in a first set having a first plurality of different colours;

a display device capable of displaying colours in a second set having a substantially limited second plurality of different colours, and display converting means for receiving said input signal and manipulating said colour and intensity information using halftoning and signature comparison of groups of pixels, said groups comprising subdivisions of individual display lines, to provide converted colour and intensity information which, when input to said display device provides a substantially continuous tone, variable intensity image using said second set of different colours.

21. An arrangement as defined in claim 20, wherein said display device is a ferroelectric liquid crystal display having 16 displayable colours selected from a digital combination of red, green, blue and white.

22. An arrangement as defined in claim 21, wherein said signal is in a digital format and provides a digital representation of said colours and intensity in said first set.

23. An arrangement as defined in claim 20, wherein said input signal is in an analogue format in which said display converting means comprises:

analogue input means adapted to receive said analogue input signal representing a variable intensity continuous tone image to be displayed; and converter means adapted to receive analogue colour and intensity information from said analogue input signal and to produce a corresponding digital representation of said analogue colour and intensity information.

24. An arrangement as defined in claim 23, wherein said display converting means further comprises:

halftoning means adapted to receive the digital representation from said converting means and to produce a corresponding halftoned current output pixel value, for each one of a plurality of pixels of said display device, from said digital representation of said analogue colour information;

frame store means adapted to store said current output pixel values from said halftoning means;

line update means adapted to receive said output pixel values from said halftoning means and to further receive corresponding previous output pixel values from said frame store means and to determine by signature comparison if a group of pixels values have changed so as to require changing on said display device; and frame store controlling means adapted to receive information from said line update means as to whether a group of pixels requires changing and for causing said frame store means to write out said current output pixel values corresponding to at least said group of pixels to said display device.

25. An arrangement according to claim 24, wherein said halftoning means is configured to error diffuse a plurality of pixels of an image to determine said current output pixel value, and wherein said signature comparison determines a signature for each said group of pixels, said groups comprising subdivisions of individual display lines, by calculating a weighted summation of said pixels within said group and comparing a current signature with a previous signature for the corresponding group to determine an amount of change, said changing of output pixels occurring when the amount of change of said signatures exceeds a predetermined value.

26. An arrangement as defined in claim 20, wherein said signal is in a digital format and provides a digital representation of said colours and intensity in said first set.

27. An arrangement as defined in claim 26, wherein said display converting means further comprises:

halftoning means adapted to receive said digital representation from said converting means and to produce a corresponding halftoned current output pixel value, for each one of a plurality of pixels of said display device, from said digital representation of said colour and intensity information;

frame store means adapted to store said current output pixel values from said halftoning means;

line update means adapted to receive said output pixel values from said halftoning means and to further receive corresponding previous output pixel values from said frame store means and to determine by signature comparison if a group of pixels values have changed so as to require changing on said display device; and frame store controlling means for receiving information from said line update means as to whether a group of pixels requires changing and for causing said frame store means to write out said current output pixel values corresponding to at least said group of pixels to said display device.

28. An arrangement according to claim 27, wherein said halftoning means is configured to error diffuse a plurality of pixels of an image to determine said current output pixel value, and said signature comparison determines a signature for each said group of pixels, said groups comprising subdivisions of individual display lines, by calculating a weighted summation of said pixels within said group and compares a current signature with a previous signature for the corresponding group to determine an amount of change, said changing of output pixels occurring when the amount of change of said signatures exceeds a predetermined value.

29. An arrangement for displaying video images, said arrangement comprising:

signal means for providing a video input signal having colour information contained therein capable of producing a continuous tone image using colours obtained in a first set having a first plurality of colours;

a display device capable of displaying colours in a second set having a substantially limited second plurality of colours; and display converting means for receiving said input signal and manipulating said colour information using halftoning and signature comparison of groups of pixels to provide converted colour information which, when input to said display device, provides a substantially continuous tone image using said second set of colours, wherein said input signal is in an analogue format and said display converting means includes:

analogue input means adapted to receive said analogue input signal representing a continuous tone image to be displayed;

converter means adapted to receive analogue colour information from said analogue input signal and to produce a corresponding digital representation of said analogue colour information, halftoning means adapted to receive the digital representation from said converting means and to produce a corresponding halftoned current output pixel value, for each one of a plurality of pixels of said display device, from said digital representation of said analogue colour information;

frame store means adapted to store said current output pixel values from said halftoning means;

line update means adapted to receive said output pixel values from said halftoning means and to further receive corresponding previous output pixel values from said frame store means and to determine by signature comparison if a group of pixels values have changed so as to require changing on said display device; and frame store controlling means adapted to receive information from said line update means as to whether a group of pixels requires changing and for causing said frame store means to write out said current output pixel values corresponding to at least said group of pixels to said display device, wherein said halftoning means is configured to error diffuse a plurality of pixels of an image to determine said current output pixel value, and said signature comparison determines a signature for each said group of pixels by calculating a weighted summation of said pixels within said group and comparing a current signature with a previous signature for the corresponding group to determine an amount of change, said changing of output pixels occurring when the amount of change of said signatures exceeds a predetermined value.

30. An arrangement for displaying video images, said arrangement comprising:

signal means for providing a video input signal having colour information contained therein capable of producing a continuous tone image using colours obtained in a first set having a first plurality of colours;

a display device capable of displaying colours in a second set having a substantially limited second plurality of colours, and display converting means for receiving said input signal and manipulating said colour information using halftoning and signature comparison of groups of pixels to provide converted colour information which, when input to said display device provides a substantially continuous tone image using said second set of colours, wherein said signal is in a digital format and provides a digital representation of said colours in said first set, wherein said display converting means includes:

halftoning means adapted to receive said digital representation from said converting means to produce a corresponding halftoned current output pixel value, for each one of said plurality of pixels of said display device, from said digital representation of said colour information;

frame store means adapted to store said current output pixel values from said halftoning means;

line update means adapted to receive said output pixel values from said halftoning means and to further receive corresponding previous output pixel values from said frame store means and to determine by signature comparison if a group of pixels values have changed so as to require changing on said display device; and frame store controlling means for receiving information from said line update means as to whether a group of pixels requires changing and for causing said frame store means to write out said current output pixel values corresponding to at least said group of pixels to said display device, wherein said halftoning means is configured to error diffuse a plurality of pixels of an image to determine said current output pixel value, and said signature comparison determines a signature of each said group of pixels by calculating a weighted summation of said pixels within said group and comparing a current signature with a previous signature for the corresponding group to determine an amount of change, said changing of output pixels occurring when the amount of change of said signatures exceeds a predetermined value.

* * * * *

UNITED STATES PATENT AND TRADEMARK OFFICE
CERTIFICATE OF CORRECTION

PATENT NO. : 5,844,532

DATED : December 1, 1998

INVENTOR(S) : Silverbrook et al.    Page 1 of 3

It is certified that error appears in the above-identified patent and that said Letters Patent is hereby corrected as shown below:

On the title page, item
[56] REFERENCES CITED:

FOREIGN PATENT DOCUMENTS, "01519744" should read
--0519744--.

[57] ABSTRACT:

Line 2, "(e.g. VDU)" should be deleted.

COLUMN 6:

Line 22, "width" should read --with--.

COLUMN 9:

Line 9, "levels. The" should read --levels, the--.
Line 10, "$2^{24}$" should read --224--.

UNITED STATES PATENT AND TRADEMARK OFFICE
CERTIFICATE OF CORRECTION

PATENT NO. : 5,844,532

DATED : December 1, 1998

INVENTOR(S) : Silverbrook et al.

It is certified that error appears in the above-identified patent and that said Letters Patent is hereby corrected as shown below:

COLUMN 14:

Line 22, "preform" should read --perform--.
Line 61, "Hechbert's" should read --Heckbert's--.

COLUMN 21:

Line 21, "the are" should read --there are--.

COLUMN 25:

Line 29, "sychronizer" (both occurrences) should read --synchronizer--.
Line 37, "(16 deep)" should read --(16 bit deep--.

COLUMN 37

Line 64, "arithlunetic" should read --arithmetic--.

UNITED STATES PATENT AND TRADEMARK OFFICE
CERTIFICATE OF CORRECTION

PATENT NO. : 5,844,532

DATED : December 1, 1998

INVENTOR(S) : Silverbrook et al.

It is certified that error appears in the above-identified patent and that said Letters Patent is hereby corrected as shown below:

COLUMN 40:

Line 41, "if no__update__state" should read --if__no__update state--.

COLUMN 41:

Line 7, "artial__" should read --partial__--.
Line 33, "art, can" should read --art, that can--.

COLUMN 42:

Line 23, "formation" should read --information--.

Signed and Sealed this

Twelfth Day of October, 1999

Attest:

Q. TODD DICKINSON

*Attesting Officer*     *Acting Commissioner of Patents and Trademarks*